US009607478B2

(12) United States Patent
Munakata et al.

(10) Patent No.: US 9,607,478 B2
(45) Date of Patent: Mar. 28, 2017

(54) GAMING MACHINE RUNNING COMMON GAME

(75) Inventors: Hiroki Munakata, Tokyo (JP); Kenta Sugano, Tokyo (JP); Daisyun Okamoto, Tokyo (JP); Masumi Fujisawa, Tokyo (JP); Takehisa Itagaki, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 0 days.

(21) Appl. No.: 13/291,837

(22) Filed: Nov. 8, 2011

(65) Prior Publication Data

US 2012/0115611 A1 May 10, 2012

(30) Foreign Application Priority Data

Nov. 10, 2010 (JP) ................................ 2010-252354

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ................................ *G07F 17/3276* (2013.01)

(58) Field of Classification Search

CPC .......... A63F 2300/8023; A63F 2300/80; A63F 2300/302; A63F 2300/30

USPC ............................................... 463/16, 20, 42

See application file for complete search history.

(56) References Cited

U.S. PATENT DOCUMENTS

| | | | | |
|---|---|---|---|---|
| 6,184,868 | B1 * | 2/2001 | Shahoian et al. | 345/161 |
| 6,285,351 | B1 * | 9/2001 | Chang et al. | 345/156 |
| 6,589,117 | B1 | 7/2003 | Moritome et al. | |
| 7,121,944 | B2 * | 10/2006 | Gauselmann | 463/30 |
| 2006/0009283 | A1 | 1/2006 | Englman et al. | |
| 2008/0102916 | A1 * | 5/2008 | Kovacs et al. | 463/16 |
| 2008/0113813 | A1 | 5/2008 | Wright et al. | |
| 2009/0203421 | A1 | 8/2009 | Yoshizawa | |
| 2009/0253486 | A1 * | 10/2009 | Nagano | 463/20 |

(Continued)

FOREIGN PATENT DOCUMENTS

| | | | |
|---|---|---|---|
| CN | 1698920 | A | 11/2005 |
| CN | 101191926 | A | 6/2008 |

(Continued)

OTHER PUBLICATIONS

Office Action dated Jun. 24, 2015 in Australian patent application No. 2011247857.

*Primary Examiner* — Milap Shah
*Assistant Examiner* — Jason Pinheiro
(74) *Attorney, Agent, or Firm* — Sheppard, Mullin, Richter & Hampton LLP

(57) ABSTRACT

A plurality of gaming terminals provided in a parallel manner, a plurality of upper displays which are provided in a parallel manner independently from the gaming terminals and form a single common effect display screen, a plurality of display controllers controlling image display on the respective upper displays, and a center controller controlling the display controllers are provided. The center controller controls the display controllers so that the upper displays perform image display as one common effect display screen.

10 Claims, 51 Drawing Sheets

(56) References Cited

U.S. PATENT DOCUMENTS

| | | | | |
|---|---|---|---|---|
| 2011/0034239 | A1* | 2/2011 | Collette | G07F 17/32 463/26 |
| 2011/0070940 | A1* | 3/2011 | Jaffe et al. | 463/20 |

FOREIGN PATENT DOCUMENTS

| | | | |
|---|---|---|---|
| JP | H11226261 | A | 8/1999 |
| JP | 2003260166 | A | 9/2003 |
| JP | 2006042846 | | 2/2006 |
| JP | 2008012074 | A | 1/2008 |
| JP | 2008532660 | | 8/2008 |
| JP | 2009066160 | | 4/2009 |
| JP | 2009183676 | | 8/2009 |
| JP | 2010004988 | | 1/2010 |
| WO | WO 2004025592 | A1 * | 3/2004 |
| WO | WO 2006121896 | A2 * | 11/2006 |
| WO | WO 2007045020 | Al | 4/2007 |

* cited by examiner

FIG.9

LEVER POSITION DETERMINING TABLE

| LEVER POSITIONS | DETECTED MAGNETIC FORCES |
|---|---|
| STARTING POINT | ND78 |
| FIRST POSITION | ND84 |
| SECOND POSITION | ND90 |
| THIRD POSITION | ND96 |
| FOURTH POSITION | ND102 |
| ... | ... |
| ENDING POINT | ND126 |

FIG.13

BASE GAME SYMBOL TABLE

| | | FIRST COLUMN | SECOND COLUMN | THIRD COLUMN | FOURTH COLUMN | FIFTH COLUMN |
|---|---|---|---|---|---|---|
| CODE NUMBERS | RANDOM NUMBERS | SYMBOLS | SYMBOLS | SYMBOLS | SYMBOLS | SYMBOLS |
| 0 | 0-3277 | J | SPECIFIC SYMBOL | A | Q | J |
| 1 | 3278-6555 | Q | A | J | J | A |
| 2 | 6556-9833 | ANGELFISH | Q | ANGELFISH | ANGELFISH | ANGELFISH |
| 3 | 9834-13111 | J | CLOWNFISH | TUNA | Q | J |
| 4 | 13112-16389 | Q | TUNA | COELACANTH | K | A |
| 5 | 16390-19667 | COELACANTH | SPECIFIC SYMBOL | ANGELFISH | ANGELFISH | ANGELFISH |
| 6 | 19668-22945 | A | ANGELFISH | SPECIFIC SYMBOL | A | COELACANTH |
| 7 | 22946-26223 | CLOWNFISH | CLOWNFISH | A | K | SPECIFIC SYMBOL |
| 8 | 26224-29501 | TUNA | K | J | CLOWNFISH | K |
| 9 | 29502-32779 | CLOWNFISH | COELACANTH | CLOWNFISH | Q | CLOWNFISH |
| 10 | 32780-36057 | A | SPECIFIC SYMBOL | A | CLOWNFISH | Q |
| 11 | 36058-39335 | Q | A | Q | TUNA | ANGELFISH |
| 12 | 39336-42613 | TUNA | CLOWNFISH | CLOWNFISH | SPECIFIC SYMBOL | K |
| 13 | 42614-45891 | COELACANTH | CLOWNFISH | K | K | CLOWNFISH |
| 14 | 45892-49169 | K | J | ANGELFISH | TUNA | TUNA |
| 15 | 49170-52447 | A | TUNA | Q | CLOWNFISH | J |
| 16 | 52448-55725 | CLOWNFISH | TUNA | SPECIFIC SYMBOL | A | SPECIFIC SYMBOL |
| 17 | 55726-59003 | J | ANGELFISH | A | CLOWNFISH | CLOWNFISH |
| 18 | 59004-62281 | Q | SPECIFIC SYMBOL | CLOWNFISH | ANGELFISH | TUNA |
| 19 | 62282-65535 | ANGELFISH | SPECIFIC SYMBOL | TUNA | COELACANTH | Q |

RANGE OF RANDOM NUMBERS:0-65535

FIG.14

BASE GAME QUALIFICATION TIME AWARDING TABLE

| | NUMBER OF ACTIVATED PAYLINES | | | | |
|---|---|---|---|---|---|
| PAYOUT RATES | 1 | 2 | 3 | 5 | 10 |
| 1 | 6 | 1 | 1 | 1 | 1 |
| 2 | 0 | 4 | 2 | 1 | 1 |
| 3 | 0 | 1 | 3 | 1 | 1 |
| 4 | 0 | 0 | 1 | 1 | 1 |
| 5 | 0 | 0 | 0 | 4 | 2 |
| 6 | 0 | 0 | 0 | 0 | 1 |
| 7 | 0 | 0 | 0 | 0 | 1 |
| 8 | 0 | 0 | 0 | 0 | 1 |
| 9 | 0 | 0 | 0 | 0 | 1 |
| 10 | 0 | 0 | 0 | 0 | 1 |

FIG.15

COMMON GAME QUALIFICATION TIME MANAGEMENT TABLE

| | GAMING TERMINAL | | | | | |
|---|---|---|---|---|---|---|
| PAYOUT RATES | 10a | 10b | 10c | 10d | 10e | 10f |
| 1 | 6 | 30 | 0 | 6 | 41 | 1 |
| 2 | 12 | 2 | 0 | 0 | 20 | 1 |
| 3 | 18 | 1 | 0 | 0 | 3 | 3 |
| 4 | 6 | 0 | 0 | 0 | 6 | 4 |
| 5 | 0 | 0 | 0 | 0 | 2 | 2 |
| 6 | 0 | 0 | 0 | 0 | 7 | 14 |
| 7 | 0 | 0 | 0 | 0 | 9 | 10 |
| 8 | 0 | 0 | 0 | 0 | 12 | 2 |
| 9 | 0 | 0 | 0 | 0 | 2 | 0 |
| 10 | 0 | 0 | 0 | 0 | 6 | 0 |
| ... | ... | ... | ... | ... | ... | ... |

FIG.16

MAXIMUM QUALIFICATION TIME TABLE

| PAYOUT RATES | UPPER LIMIT OF ACCUMULATION |
|---|---|
| 1 | 45 |
| 2 | 44 |
| 3 | 43 |
| 4 | 42 |
| 5 | 41 |
| 6 | 40 |
| 7 | 39 |
| 8 | 38 |
| 9 | 37 |
| 10 | 36 |
| ··· | ··· |
| 98 | 2 |
| 99 | 2 |

FIG.17

ACCUMULATION CALCULATION TABLE

| PAYOUT RATES | ··· | 5 | 4 | 3 | 2 | 1 |
|---|---|---|---|---|---|---|
| BEFORE-AWARDED COMMON GAME QUALIFICATION TIME | ··· | 0 | 6 | 18 | 12 | 6 |
| TO-BE-AWARDED COMMON GAME QUALIFICATION TIME | ··· | 0 | 1 | 3 | 2 | 1 |
| AWARDED COMMON GAME QUALIFICATION TIME | ··· | 0 | 7 | 21 | 14 | 7 |
| ACCUMULATION $Y_N$ OF AWARDED COMMON GAME QUALIFICATION TIME | ··· | 0 | 7 | 28 | 42 | 49 |
| ACCUMULATION UPPER LIMIT $X_N$ OF QUALIFICATION TIMES | ··· | 41 | 42 | 43 | 44 | 45 |
| CALCULATED ACCUMULATION $Y_N$ (WHEN $Y_N > X_N$, $Y_N = X_N$ AND $Y_{N+1} = Y_{N+1} + Y_N - X_N$) | ··· | 0 | 7 | 30 | 44 | 45 |
| COMMON GAME QUALIFICATION TIME $Z_N = Y_N - Y_{N+1}$ | ··· | 0 | 7 | 23 | 14 | 1 |

FIG.20

INDEPENDENT SPECIAL GAME QUALIFICATION TIME AWARDING TABLE

| | NUMBER OF ACTIVATED PAYLINES | | | | |
|---|---|---|---|---|---|
| PAYOUT RATES | 1 | 2 | 3 | 5 | 10 |
| 1 | 29 | 0 | 0 | 0 | 0 |
| 2 | 5 | 30 | 0 | 0 | 0 |
| 3 | 0 | 4 | 29 | 0 | 0 |
| 4 | 0 | 0 | 3 | 0 | 0 |
| 5 | 0 | 0 | 0 | 30 | 0 |
| 6 | 0 | 0 | 0 | 0 | 0 |
| 7 | 0 | 0 | 0 | 0 | 0 |
| 8 | 0 | 0 | 0 | 0 | 0 |
| 9 | 0 | 0 | 0 | 0 | 0 |
| 10 | 0 | 0 | 0 | 0 | 27 |

FIG.22

BONUS TYPE TABLE

| BONUS TYPES | UNIT PAYOUT AMOUNTS | RANKS |
|---|---|---|
| BLUE MARLIN | 10000 | 1 |
| BLUE FIN TUNA | 5000 | 2 |
| DOLPHIN FISH | 4000 | 2 |
| NAPOLEON FISH | 3000 | 2 |
| YELLOW FIN TUNA | 2000 | 3 |
| WAHOO | 1500 | 3 |
| BLACK SEABASS | 1500 | 3 |
| HALIBUT | 1000 | 4 |
| ... | ... | ... |

FIG.23

INDEPENDENT SPECIAL GAME PROBABILITY TABLE

| RANDOM NUMBERS | WINNING BONUS TYPES |
|---|---|
| 0-9 | BLUE MARLIN |
| 10-19 | BLUE FIN TUNA |
| 20-22 | DOLPHIN FISH |
| 23-25 | NAPOLEON FISH, BLACK SEABASS |
| 26-48 | YELLOW FIN TUNA, HALIBUT |
| 49-116 | WAHOO, BLACK SEABASS |
| 117-210 | BLACK SEABASS, HALIBUT |
| 211-293 | WAHOO, BLACK SEABASS, HALIBUT |
| ... | ... |

RANGE OF RANDOM NUMBERS: 0-65535

FIG.25

MYSTERY BONUS START RANDOM DETERMINATION TABLE

| | NUMBER OF ACTIVATED PAYLINES | | | | |
|---|---|---|---|---|---|
| MYSTERY BONUS | 1 | 2 | 3 | 5 | 10 |
| OCCURRENCE | 0-1 | 0-2 | 0-3 | 0-4 | 0-5 |
| EFFECT ONLY | 2-5 | 3-8 | 4-11 | 5-14 | 6-17 |
| NON-OCCURRENCE | 6-299 | 9-299 | 12-299 | 15-299 | 18-299 |

RANGE OF RANDOM NUMBERS: 0-299

FIG.26

MYSTERY BONUS PROBABILITY TABLE

| RANDOM NUMBERS | WINNING BONUS TYPES |
|---|---|
| 0-1 | BLUE MARLIN |
| 2-5 | BLUE FIN TUNA |
| 6-11 | DOLPHIN FISH |
| 12-19 | NAPOLEON FISH |
| 20-29 | YELLOW FIN TUNA |
| 30-40 | WAHOO |
| 41-53 | BLACK SEABASS |
| 54-67 | HALIBUT |
| ... | ... |

RANGE OF RANDOM NUMBERS:0-5000

FIG.28

COMMON GAME START RANDOM DETERMINATION TABLE

| | |
|---|---|
| OCCURRENCE | 0-1 |
| EFFECT ONLY | 2-3 |
| NON-OCCURRENCE | 4-1214 |

RANGE OF RANDOM NUMBERS:0-1214

FIG.29

COMMON GAME TYPE RANDOM DETERMINATION TABLE

| | |
|---|---|
| FIRST COMMON GAME | 0-31 |
| SECOND COMMON GAME | 32-63 |
| THIRD COMMON GAME | 64-83 |
| FIRST COMMON GAME + THIRD COMMON GAME | 84-91 |
| SECOND COMMON GAME + THIRD COMMON GAME | 92-99 |

RANGE OF RANDOM NUMBERS: 0-99

FIG.33

FIRST COMMON GAME PROBABILITY TABLE

| RANDOM NUMBERS | WINNING BONUS TYPES |
|---|---|
| 0-9 | BLUE MARLIN, BLACK SEABASS, HALIBUT |
| 10-19 | BLUE FIN TUNA,WAHOO, HALIBUT |
| 20-22 | DOLPHIN FISH, BLACK SEABASS, HALIBUT |
| 23-25 | NAPOLEON FISH, BLACK SEABASS, HALIBUT |
| 26-48 | YELLOW FIN TUNA, WAHOO, HALIBUT, HALIBUT |
| 49-116 | WAHOO, BLACK SEABASS, HALIBUT, HALIBUT |
| 117-210 | BLACK SEABASS, HALIBUT, HALIBUT |
| 211-293 | WAHOO, WAHOO, BLACK SEABASS, HALIBUT |
| ... | ... |

RANGE OF RANDOM NUMBERS:0-65535

FIG.38

THIRD COMMON GAME PROBABILITY TABLE

| RANDOM NUMBERS | WINNING BONUS TYPES |
|---|---|
| 0-19 | BLUE MARLIN |
| 20-76 | BLUE FIN TUNA |
| 77-399 | DOLPHIN FISH |

RANGE OF RANDOM NUMBERS: 0-399

FIG.39

MOVEMENT PATTERN TABLE

| IDENTIFICATION INFORMATION | MOVEMENT PATTERNS |
|---|---|
| 0001 | HIGH DEGREE OF VIBRATION |
| 0002 | HIGH DEGREE OF ROTATION |
| 0003 | HIGH DEGREE OF VIBRATION, HIGH DEGREE OF ROTATION |
| ... | ... |

FIG.40

DISPLAY PATTERN TABLE

| IDENTIFICATION INFORMATION | DISPLAY PATTERNS |
|---|---|
| 0001 | LARGE FISH TOOK BAIT |
| 0002 | FISH IS BEING LIFTED |
| 0003 | LARGE FISH IS BEING LIFTED |
| ... | ... |

FIG.47

BASE GAME QUALIFICATION TIME AWARDING TABLE

| | NUMBER OF ACTIVATED PAYLINES | | | | |
|---|---|---|---|---|---|
| PAYOUT RATES | 1 | 2 | 3 | 5 | 10 |
| 1 | 5 | 0 | 0 | 0 | 0 |
| 2 | 0 | 5 | 0 | 0 | 0 |
| 3 | 0 | 0 | 5 | 0 | 0 |
| 4 | 0 | 0 | 0 | 0 | 0 |
| 5 | 0 | 0 | 0 | 5 | 0 |
| 6 | 0 | 0 | 0 | 0 | 0 |
| 7 | 0 | 0 | 0 | 0 | 0 |
| 8 | 0 | 0 | 0 | 0 | 0 |
| 9 | 0 | 0 | 0 | 0 | 0 |
| 10 | 0 | 0 | 0 | 0 | 5 |

FIG.50

BAIT CHANGE PROBABILITY TABLE

| | WINNING BONUS TYPES | | |
|---|---|---|---|
| RANDOM NUMBERS | EARTHWORM | LURE | PRAWN |
| 0-9 | SMALL1 × 3,SMALL2 × 3, SMALL3 × 3 | MEDIUM1 × 2,MEDIUM2 × 2, MEDIUM3 × 2 | LARGE1,LARGE2,LARGE3 |
| 10-19 | SMALL1 × 3,SMALL2 × 3 | MEDIUM1 × 2,MEDIUM2 × 2 | LARGE1,LARGE2 |
| 20-22 | SMALL1 × 3,SMALL3 × 3 | MEDIUM1 × 2,MEDIUM3 × 2 | LARGE1,LARGE3 |
| 23-25 | SMALL2 × 3,SMALL3 × 3 | MEDIUM2 × 2,MEDIUM3 × 2 | LARGE2,LARGE3 |
| 26-48 | ... | ... | ... |

RANGE OF RANDOM NUMBERS:0-65535

GAMING MACHINE RUNNING COMMON GAME

CROSS REFERENCE TO RELATED APPLICATION

The present application claims priority from Japanese Patent Application No. 2010-252354, which was filed on Nov. 10, 2010, the disclosure of which is herein incorporated by reference in its entirety.

BACKGROUND OF THE INVENTION

1. Field of the Invention

The present invention relates to a gaming machine running a common game.

2. Description of Related Art

A conventional gaming machine includes a plurality of gaming terminals, terminal controllers provided for the respective gaming terminals to cause each gaming terminal to execute a game, and a center controller controlling the terminal controllers. Such a conventional gaming machine is disclosed in, for example, the specification of Published U.S. Application No. 2006/0009283.

Each terminal controller individually runs a game for the associated gaming terminal, and awards a payout based on the game. The center controller provides a common game, in which two or more players compete against one another for various jackpots, such as a progressive jackpot and a mystery jackpot, through the gaming terminals. Thus, how to run a common game at each gaming terminal has traditionally been an important element of improving the entertainment characteristic in the gaming machine having the plurality of gaming terminals.

The object of the present invention is to provide a gaming machine having a function of running a common game capable of realizing a high entertainment characteristic, and a playing method of the gaming machine.

SUMMARY OF THE INVENTION

A gaming machine of the present invention includes: a plurality of gaming terminals provided in a parallel manner; a plurality of upper displays which are provided in a parallel manner independently from the gaming terminals so as to form a single common effect display screen; a plurality of display controllers which control image display on the respective upper displays; and a center controller which controls the display controllers, the center controller controlling the display controllers so that the upper displays perform image display as the single common effect display screen.

According to the arrangement above, the upper displays provided in a parallel manner and independent from the gaming terminals form a single common effect display screen. This allows players at the respective gaming terminals to play a game in a unified manner, thereby enhancing the entertainment characteristics.

According to the present invention, the above-described gaming machine may include an illuminance sensor which is provided in at least one of the upper displays to detect the brightness of disturbance light applied to said at least one of the upper displays, the center controller changing the brightness of said at least one upper display based on the brightness of the disturbance light detected by the illuminance sensor.

This arrangement makes it possible to change the brightness of the upper display in accordance with the brightness of the disturbance light applied to the upper display. Since the visibility of the common effect display screen is improved for the players, the entertainment characteristics are maintained.

A gaming machine of the present invention includes: a plurality of gaming terminals which are provided in a parallel manner and each includes a movable unit which is movable, a movement pattern storage device which stores a plurality of movement patterns of the movable unit in association with sets of identification information for identifying the movement patterns, and a terminal controller programmed to execute a step (a1); a plurality of upper displays which are provided in a parallel manner independently from the gaming terminals so as to form a single common effect display screen on which a plurality of individual images corresponding to the respective terminals are displayed; a plurality of display controllers which control image display on the respective upper displays; and a center controller which includes a display pattern storage unit which stores the sets of identification information in association with a plurality of display patterns of the individual images and is programmed to execute steps (b1) to (b3).

The terminal controller executes the step (a1) of, based on a movement pattern command including a set of identification information transmitted from the center controller, moving the movable unit based on the movement pattern corresponding to the set of identification information, and the center controller executes the steps (b1) of controlling the display controllers so that the upper displays perform effect display as the single common effect display screen, (b2) of running a common game in which the gaming terminals are synchronized with one another, and (b3) of displaying an individual image with a display pattern corresponding to a running state of the common game, and transmitting, to the gaming terminal corresponding to that individual image, the movement pattern command including the set of identification information corresponding to the display pattern.

According to the arrangement above, a display pattern of an individual image corresponding to a gaming terminal on a common effect display screen formed by a plurality of upper displays is associated with a movement pattern of a movable unit of a gaming terminal, with the result that the individual image is displayed with the display pattern corresponding to the running state of the common game, and the movable unit is moved with the movement pattern corresponding to the running state of the common game. This allows the player to recognize the state in the common game by image display and the movement of the movable unit, thereby improving the entertainment characteristics of the common game.

The above-described gaming machine of the present invention is arranged so that, the center controller displays, on the common effect display screen, the individual image with a display pattern corresponding to the movement of the movable unit which moves based on the movement pattern.

According to this arrangement, because the movement pattern of the movable unit and the display pattern of the individual image cooperate in a unified manner, the entertainment characteristics of the common game is improved.

A gaming machine of the present invention includes: a plurality of gaming terminals which are provided in a parallel manner and each includes a terminal display on which a plurality of symbols are provided, a movable unit which accepts an input from an outside and is movable, and a terminal controller which is programmed to execute steps (c1) and (c2); and a center controller which is programmed to execute steps (d1) and (d2).

The terminal controller executes the steps (c1) of moving the movable unit based on a movement pattern command transmitted from the center controller and (c2) of, in response to an input to the movable unit, running a basic game of rearranging the symbols, independently from the other gaming terminals, and the center controller executes the steps (d1) of running a common game in which the gaming terminals are synchronized with one another and (d2) transmitting the movement pattern command based on a running state of the common game.

According to the arrangement above, in a basic game which is run independently in a gaming terminal and is different from the common game, the player can rearrange the symbols by making an input to the movable unit. As such, the movable unit which receives an input in the basic game can function as a component of notifying the running state of the common game. This adds an accent to the games, and hence the entertainment characteristics are improved.

A gaming machine of the present invention includes: a plurality of gaming terminals which are provided in a parallel manner and each includes (i) a movable unit including a lever that a player is able to grip, a first motor which is provided in the lever and vibrates the lever, a second motor which is provided in the lever and biases the lever in a predetermined rotation direction, and a light emission unit provided at an upper part of the lever, and (ii) a terminal controller programmed to execute a step (e1); and a center controller programmed to execute steps (f1) and (f2).

The terminal controller executes the step (e1) of controlling the driving of at least one of the first motor and the second motor based on a movement pattern command transmitted from the center controller so as to move the lever, and causing the light emission unit to emit light, and the center controller executes the steps (f1) of running a common game in which the gaming terminals are synchronized with one another, and (f2) transmitting the movement pattern command based on a running state of the common game.

According to the arrangement above, the movable unit has the lever that the player can grip, and the lever vibrates and rotates in accordance with the running state of the common game. This allows the player gripping the lever to recognize the running state by the movement thereof, thereby improving the entertainment characteristics. Furthermore, since the light emission unit provided at the upper part of the lever emits light when the lever is being moved, the player can recognize whether the lever moves, by the lighting condition of the light emission unit.

The present invention provides a function of running a common game capable of realizing a high entertainment characteristic.

BRIEF DESCRIPTION OF THE DRAWINGS

FIG. 9 illustrates a lever position determining table.

FIG. 13 illustrates a base game symbol table.

FIG. 14 illustrates a base game qualification time awarding table.

FIG. 15 illustrates a common game qualification time management table.

FIG. 16 illustrates a maximum qualification time table.

FIG. 17 illustrates an accumulation calculation table.

FIG. 20 illustrates an independent special game qualification time awarding table.

FIG. 22 illustrates a bonus type table.

FIG. 23 illustrates an independent special game probability table.

FIG. 25 illustrates a mystery bonus start random determination table.

FIG. 26 illustrates a mystery bonus probability table.

FIG. 28 illustrates a common game start random determination table.

FIG. 29 illustrates a common game type random determination table.

FIG. 33 illustrates a first common game probability table.

FIG. 38 illustrates a third common game probability table.

FIG. 39 illustrates a movement pattern table.

FIG. 40 illustrates a display pattern table.

FIG. 47 illustrates a modification of the base game qualification time awarding table.

FIG. 50 illustrates bait change probability table.

DESCRIPTION OF THE PREFERRED EMBODIMENTS

The following will describe an embodiment of the present invention with reference to the figures.

(Gaming Machine Overview)

A gaming machine includes a plurality of gaming terminals and a center controller data-communicably connected to the gaming terminals. Each gaming terminal runs independently of the other gaming terminals a unit game using symbol columns, and runs a common game in sync with the other gaming terminals.

Figure 1:
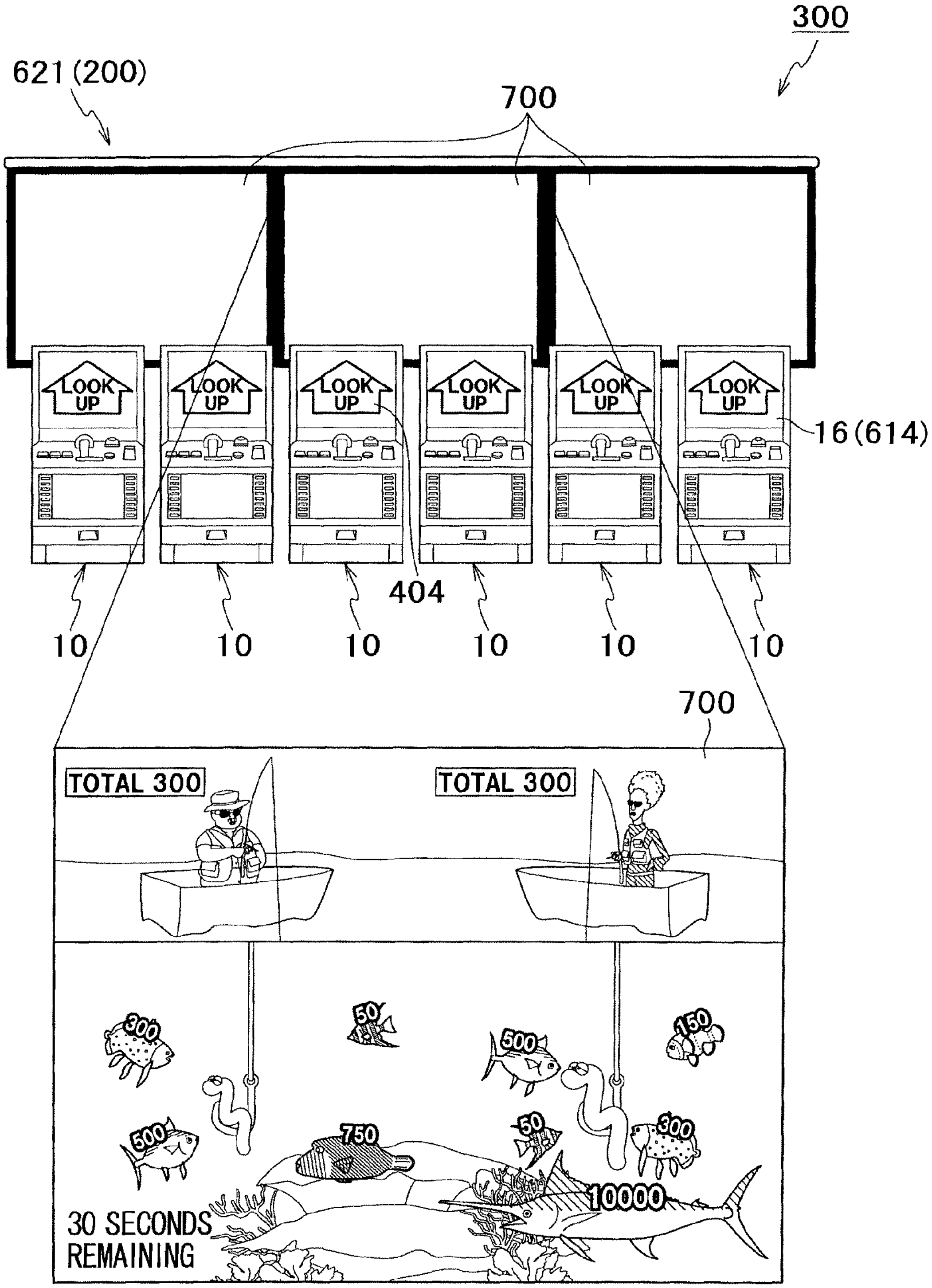
FIG. 1 illustrates the outline of a gaming machine.
Figure 2:
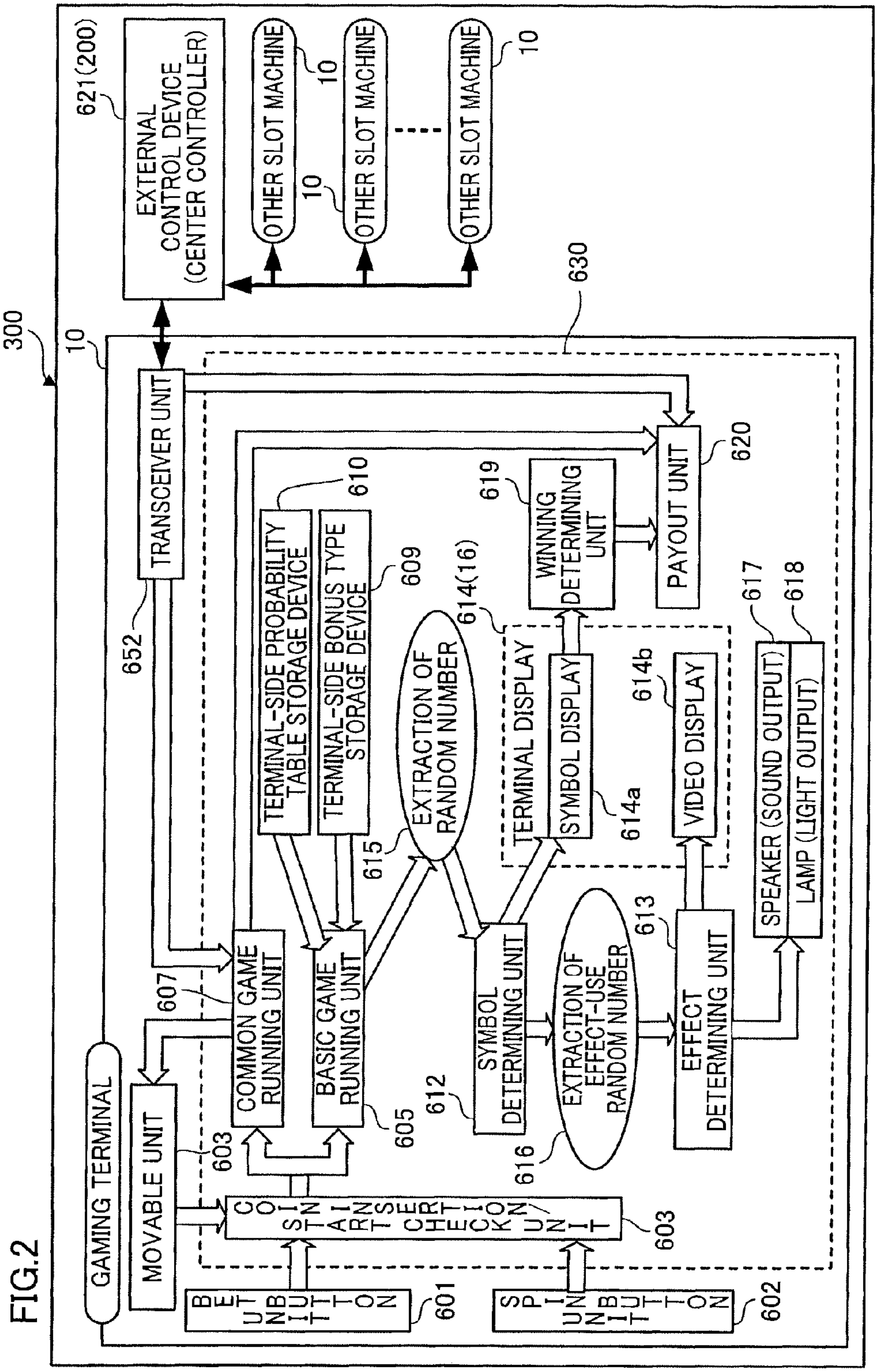
FIG. 2 is a block diagram of a gaming terminal.
Figure 3:
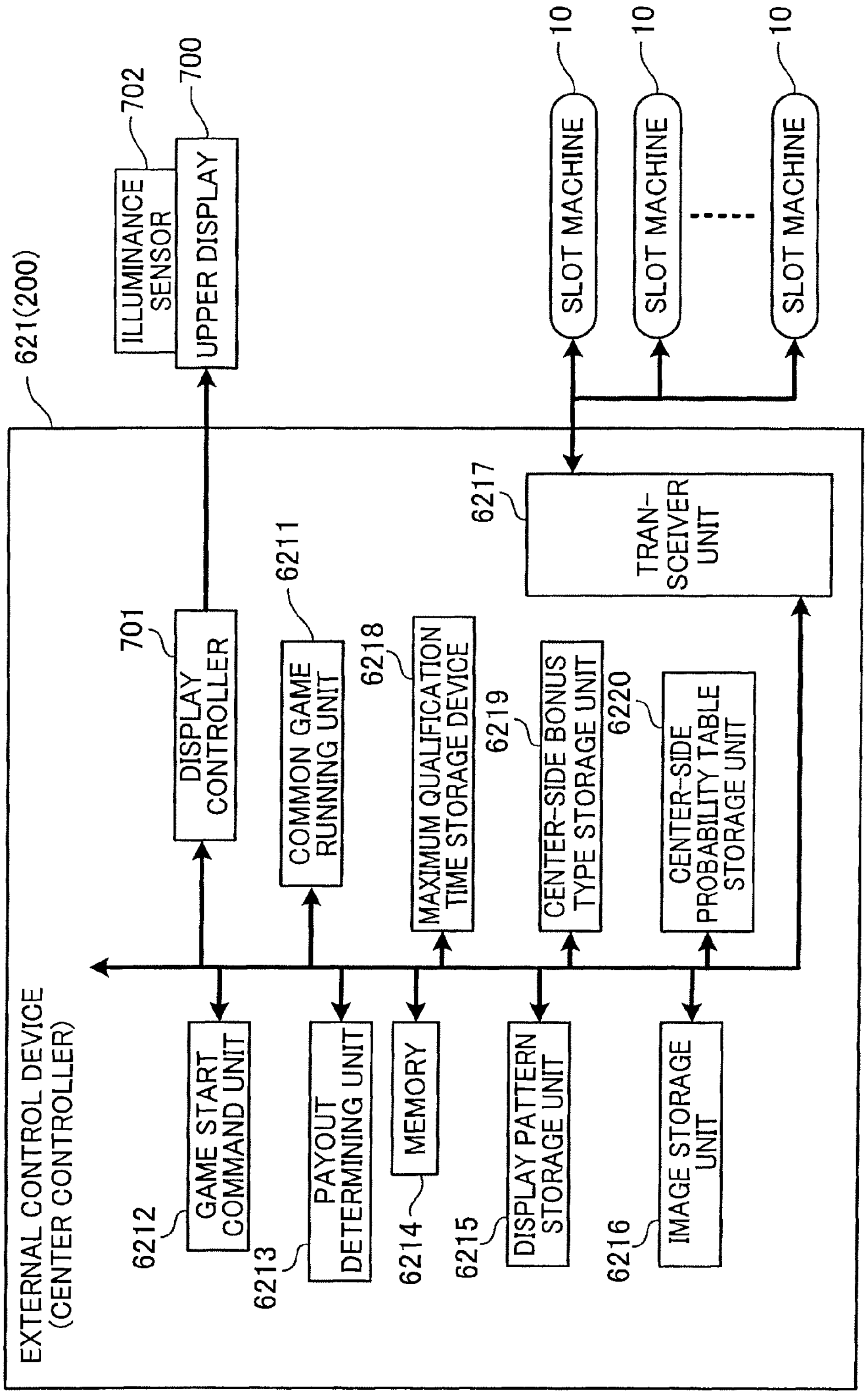
FIG. 3 is block diagram of a center controller.

More specifically, as shown in FIG. 1 to FIG. 3, the gaming machine 300 of the present embodiment has a multi-player type structure, where gaming terminals 10 are connected in a parallel manner and in communication with a center controller 200. The gaming machine 300 is structured so that each gaming terminal 10 is able to individually run a unit game such as a slot game, independently of the other slot machines 10. In the unit game, symbols 501 are rearranged on the terminal display 614 (terminal image display panel 16) of the gaming terminal 10.

(Functional Block of Gaming Machine 300: Gaming Terminal 10)

The gaming machine 300 having the above structure includes gaming terminals 10 and the external controller 621 (center controller 200) data-communicably connected to the gaming terminals 10, as illustrated in FIGS. 1 to 3. The external controller 621 is data-communicably connected to the gaming terminals 10 which are provided in a parallel manner.

The gaming terminal 10 includes a bet button unit 601, a spin button unit 602, a movable unit 603, a terminal display 614, a movement pattern storage device 608, a terminal-side bonus type storage device 609, and a terminal-side probability table storage device 610. The gaming terminal also includes a terminal controller 630 which controls these units and devices. Note that the bet button unit 601, the spin button unit 602, and the movable unit 603 each are a kind of an input device. Further the gaming terminal 10 includes a transceiver unit 652 which enables data communication with the external controller 621.

The bet button unit 601 has a function of accepting a player's operation for entering a bet amount The spin button unit 602 and the movable unit 603 have a function of receiving a start of a game such as basic game through a player's operation; i.e., start operation. The terminal display 614 has a function of displaying, in the form of a still image, various symbols 501, numerical values, marks, or the like, and displaying moving pictures such as an effect movie.

The movable unit 603 can receive an input from the outside as described above, and can be moved in accordance with a plurality of movement patterns by the terminal controller 630. More specifically, the movable unit 603 includes a lever 6031 that the player can grip, a first motor 6032 which is provided in the lever 6031 to vibrate the lever, a second motor 6033 which is provided in the lever 6031 to bias the lever 6031 in a predetermined rotation direction, and a light emission unit 6034 provided at an upper part of the lever 6031. The movement patterns of the movable unit 603 are stored in the movement pattern storage device 608 to be associated with sets of identification information by which each movement pattern is identified.

The terminal-side bonus type storage device 609 stores bonus types and unit payout amounts of the terminal bonus games, in association with one another. The terminal-side probability table storage device 610 stores a probability table in which combinations of the terminal bonus games are associated with the probabilities of the combinations.

The terminal controller 630 includes: a coin insertion/start-check unit 603; a basic game running unit 605; a common game running unit 653; a random number sampling unit 615; a symbol determining unit 612; an effect-use random number sampling unit 616; an effect determining unit 613; a speaker unit 617; a lamp unit 618; a winning determining unit 619; a payout unit 620.

The coin insertion/start-check unit 603 determines which one of the base game, the bonus game, the common game, and the like is to be started, and determines whether the determined one of the base game, the bonus game, the common game, and the like is startable, based on signals output from the bet button unit 601, the spin button unit 602, and the movable unit 603, and a signal or the like from the center controller 200.

The basic game running unit 605 has a function of running a base game on condition that the bet button unit 601 is operated. The basic game running unit 605 determines whether to run a terminal bonus game, based on a combination of rearranged symbols 501 resulted from the base game.

Further, the basic game running unit 605 has a function of outputting the state of the basic game to the center controller 200, via the transceiver unit 652. That is, the basic game running unit 605 outputs the running status information to the center controller 200.

The common game running unit 653 has a function of running the common game, based on a game start command from the center controller 200.

The symbol determining unit 612 has: a function of determining symbols 501 to be rearranged, by using a random number given by the random number sampling unit 615; a function of rearranging selected symbols 501 on the symbol display region 614*a* of the terminal display 614; and a function of outputting information of the symbols 501 rearranged, to the winning determining unit 619.

More specifically, the symbol determining unit 612 has functions of: selecting the symbol column image 500 according to the game (basic game or common game); scroll displaying the symbol column image 500 selected on the terminal display 614; and stopping the scroll display to rearrange the symbols 501 determined.

The effect-use random number sampling unit 616 has functions of, when receiving the effect instruction signal from the symbol determining unit 612, sampling an effect-use random number; and outputting the effect-use random number to the effect determining unit. The effect determining unit has: a function of determining an effect by using the effect-use random number; a function of outputting, to a video display region 614*b* of the terminal display 614, video information in the effect thus determined; and a function of outputting audio information and illumination information of the effect to the speaker unit 617 and the lamp unit 618, respectively.

The winning determining unit 619 has a function of determining whether a winning is achieved when rearrangement information of the symbols 501, which is a display state rearranged on the terminal display 614, is obtained, a function of calculating a payout amount based on a winning combination when it is determined that a winning is achieved, and a function of outputting a payout signal based on the payout amount to the payout unit 620. The payout unit 620 has a function of awarding the player a game value in the form of a coin, a medal, credit, or the like, based on a payout signal from the winning determining unit 619 or the center controller.

The transceiver unit 652 has functions of: outputting the running state of the basic game, points calculated in the common game, or the like to the center controller 200, along with the identification information of each gaming terminal 10; and receiving the game start command from the center controller 200, and the common game symbol column image 500*b*, or the like.

(Functional Block of Gaming Machine 300: External Controller)

The gaming terminal 10 structured as above is connected to the external controller 621. This external controller 621 has a function of remotely operating and monitoring the operation state of each gaming terminal 10 and processes such as changes in various game setting values. Further, the external controller 621 has a function of running the common game in a plurality of gaming terminals 10 simultaneously.

More specifically, as shown in FIG. 3, the external controller 621 includes a common game running unit 6211, a game start command unit 6212, a payout determining unit 6213, a memory 6214, a transceiver unit 6217, a plurality of upper displays 700, display controllers 701, an illuminance sensor 702, a display pattern storage unit 6215, an image storage unit 6216, a center-side bonus type storage unit 6219, and a center-side probability table storage unit 6220.

The common game running unit 6211 has functions of determining whether to start the common game, based on the state of the basic game obtained from the terminal controller 630, and synchronizing the common game run in each of the gaming terminals 10. The game start command unit 6212 has a function of outputting the game start command to the gaming terminal 10. The memory 6214 stores, for each gaming terminal 10, common game qualification times in association with respective payout rates. The transceiver unit 6217 has a function of allowing data exchange among the gaming terminals 10.

The upper displays 700 are provided in a parallel manner, and are controlled by the associated display controllers 701 so that the upper displays 700 form a single common effect display screen. The common effect display screen is arranged to display a plurality of individual images corresponding to the respective gaming terminals 10. Furthermore, the common effect display screen is arranged to display a common game start effect image. The common game start effect image is stored in the image storage unit 6216. The display controller 701 is controlled by the common game running unit 6211. The illuminance sensor 702 detects the brightness of the disturbance light on the upper display 700.

The display pattern storage unit 6215 stores sets of identification information in association with a plurality of display patterns of the individual image. Furthermore, the center-side bonus type storage unit 6219 stores bonus types and unit payout amounts of the common game in association with one another. The center-side probability table storage unit 6220 stores a probability table in which combinations of bonus types are associated with the probabilities of these combinations.

More specifically, the gaming machine 300 arranged as above has the following first to fourteenth features.

That is to say, the gaming machine 300 has a first feature of including a plurality of gaming terminals 10 provided in a parallel manner, a plurality of upper displays 700 which are provided in a parallel manner independently from the gaming terminals 10 and form a single common effect display screen, a plurality of display controllers 701 which control the display on the respective upper displays 700, and in which a center controller 200 which controls the display controllers 701, and the center controller 200 controls the display controllers to cause the upper displays 700 to function as a single common effect display screen.

According to the arrangement above, the upper displays 700 which are provided in a parallel manner independently from the gaming terminals 10 form a single common effect display screen. This allows players at the respective gaming terminals 10 to play a game in a unified manner, thereby enhancing the entertainment characteristics.

In addition to the above, the gaming machine 300 having the first feature may include an illuminance sensor 702 which is provided in at least one of the upper displays 700 to detect the brightness of disturbance light applied to said at least one of the upper displays 700, the center controller 200 changing the brightness of said at least one upper display based on the brightness of the disturbance light detected by the illuminance sensor 702.

This arrangement makes it possible to change the brightness of the upper display 700 in accordance with the brightness of the disturbance light applied to the upper display 700. Since the visibility of the common effect display screen is improved for the players, the entertainment characteristics are maintained.

In addition to the above, the gaming machine 300 has a second feature of including a plurality of gaming terminals 10 which are provided in a parallel manner and each includes a movable unit 603 which is movable, a movement pattern storage device 608 which stores a plurality of movement patterns of the movable unit 603 in association with sets of identification information for identifying the movement patterns, and a terminal controller 630; a plurality of upper displays 700 which are provided in a parallel manner independently from the gaming terminals 10 so as to form a single common effect display screen on which a plurality of individual images corresponding to the respective terminals 10 are displayed; a plurality of display controllers 701 which control image display on the respective upper displays 700; and a center controller 200 which includes a display pattern storage unit 6215 which stores the sets of identification information in association with a plurality of display patterns of the individual images, the terminal controller executing, by using the functions of components such as the basic game running unit 605 and the common game running unit 607 and based on a movement pattern command including a set of identification information transmitted from the center controller, moving the movable unit based on the movement pattern corresponding to the set of identification information, and the center controller executing, based on the functions of components such as the common game running unit 6211, the steps of controlling the display controllers so that the upper displays perform effect display as the single common effect display screen, of running a common game in which the gaming terminals are synchronized with one another, and of displaying an individual image with a display pattern corresponding to a running state of the common game, and transmitting, to the gaming terminal corresponding to that individual image, the movement pattern command including the set of identification information corresponding to the display pattern.

According to the arrangement above, a display pattern of an individual image corresponding to a gaming terminal 10 on a common effect display screen formed by a plurality of upper displays 700 is associated with a movement pattern of a movable unit 603 of a gaming terminal 10, with the result that the individual image is displayed with the display pattern corresponding to the running state of the common game, and the movable unit 603 is moved with the movement pattern corresponding to the running state of the common game. This allows the player to recognize the state in the common game by image display and the movement of the movable unit 603, thereby improving the entertainment characteristics of the common game.

In addition to the above, the gaming machine 300 having the second feature may be arranged so that the center controller 200 displays, on the common effect display screen, the individual image with a display pattern corresponding to the movement of the movable unit 603 which moves based on the movement pattern.

According to this arrangement, because the movement pattern of the movable unit 603 and the display pattern of the individual image cooperate in a unified manner, the entertainment characteristics of the common game is improved.

In addition to the above, the gaming machine 300 has a third feature of including: a plurality of gaming terminals 10 which are provided in a parallel manner and each includes a terminal display 614 on which a plurality of symbols 501 are provided, a movable unit 603 which accepts an input from an outside and is movable, and a terminal controller 630; and a center controller 200, the terminal controller 630 executing, by the functions of components such as the basic game running unit 605 and the common game running unit 607, the steps of moving the movable unit based on a movement pattern command transmitted from the center controller 200 and of, in response to an input to the movable unit 603, running a basic game of rearranging the symbols 501, independently from the other gaming terminals 10, and the center controller 200 executing, by using the functions of components such as the common game running unit 6211, the steps of running a common game in which the gaming terminals 10 are synchronized with one another and transmitting the movement pattern command based on a running state of the common game.

According to the arrangement above, in a basic game which is run independently in a gaming terminal 10 and is different from the common game, the player can rearrange the symbols 501 by making an input to the movable unit 603. As such, the movable unit 603 which receives an input in the basic game can function as a component of notifying the running state of the common game. This adds an accent to the games, and hence the entertainment characteristics are improved.

In addition to the above, the gaming machine 300 has a fourth feature of including: a plurality of gaming terminals 10 which are provided in a parallel manner and each includes (i) a movable unit 603 including a lever 6031 that a player is able to grip, a first motor 6032 which is provided in the lever 6031 and vibrates the lever 6031, a second motor 6033 which is provided in the lever 6031 and biases the lever 6031 in a predetermined rotation direction, and a light emission unit 6034 provided at an upper part of the lever 6031, and (ii) a terminal controller 630; and a center controller 200, the terminal controller 630 executing, by using the functions of components such as the basic game running unit 605 and the common game running unit 607, the step of controlling the driving of at least one of the first motor 6032 and the second motor 6033 based on a movement pattern command transmitted from the center controller 200 so as to move the lever 6031, and causing the light emission unit 6034 to emit light, and the center controller 200 executing, by using functions of components such as the common game running unit 6211, the steps of running a common game in which the gaming terminals 10 are synchronized with one another, and transmitting the movement pattern command based on a running state of the common game.

According to the arrangement above, the movable unit 603 has the lever 6031 that the player can grip, and the lever 6031 vibrates and rotates in accordance with the running state of the common game. This allows the player gripping the lever 6031 to recognize the running state by the movement thereof, thereby improving the entertainment characteristics. Furthermore, since the light emission unit 6034 provided at the upper part of the lever 6031 emits light when the lever 6031 is being moved, the player can recognize whether the lever 6031 moves, by the lighting condition of the light emission unit 6034.

In addition to the above, the gaming machine 300 has the fifth feature of including: a plurality of gaming terminals 10 each having a terminal display 614 on which a plurality of symbols 501 are provided and a terminal controller 630; a plurality of upper displays 700 which are provided in a parallel manner independently from the gaming terminals 10 so as to form a single common effect display screen which is constituted by gaming terminal areas 703 corresponding to the respective gaming terminals 10; and a center controller 200 which includes an image storage unit storing a common game start effect image displayed on the common effect display screen, the terminal controller executing, by using the functions of components such as the basic game running unit 605 and the common game running unit 607, the steps of: running a basic game in which a plurality of symbols 501 are rearranged, independently from the other gaming terminals 10; and displaying an effect image on the terminal display 614 based on a common game start effect image display command transmitted from the center controller 200, and the center controller 200 executing, by using the functions of components such as the common game running unit 6211, the steps of: when a predetermined common game condition is established, running a common game in which at least one of the gaming terminals 10 are synchronized with one another; and (b2) displaying the common game start effect image on the common effect display screen and transmitting a common game start effect image display command to the gaming terminals 10 so that the common game start effect image divided for the respective gaming terminal areas 703 is displayed on the terminal display 614 of each of the gaming terminals 10 corresponding to the gaming terminal areas 703.

According to this arrangement, the content identical with the common game start effect image displayed on the common effect display screen formed by the upper displays 700 is displayed on a virtual screen formed by the terminal displays 614 of the respective gaming terminals 10. This makes it possible to clearly notify the players at the respective gaming terminals 10 of the start of the common game. Furthermore, since the content identical with the image on the common effect display screen is divided and displayed on the gaming terminals 10, the feeling of "unity" of the gaming terminals 10 is improved and therefore the entertainment characteristics are improved.

In addition to the above, the gaming machine 300 has the sixth feature of including: a plurality of gaming terminals 10 each having a terminal display 614 on which a plurality of symbols 501 are provided and a terminal controller 630; and a center controller 200, the terminal controller 630 executing, by using the functions of components such as the basic game running unit 605 and the common game running unit 607, the step of: running a basic game in which a plurality of symbols 501 are rearranged, independently from the other gaming terminals 10, and the center controller 200 executing, by using the functions of components such as the common game running unit 6211, the steps of: based on the basic game, determining whether any one of the gaming terminals 10 satisfies a predetermined common game qualification condition; when any one of the gaming terminal 10 satisfies the common game qualification condition, awarding a common game qualification to that one of the gaming terminals 10; determining whether a predetermined common game condition is established at predetermined intervals; and when the common game condition is established, selecting a common game in which the gaming terminals 10 each having the common game qualification are synchronized with one another, from a plurality of common games and running that common game.

According to the arrangement above, When a common game starts, only the gaming terminals 10 having received the common game qualification can join the common game. The common game qualification is given based on a basic game. This motivates the players to continue the playing of the basic game, thereby improving the entertainment characteristics.

In addition to the above, the gaming machine 300 has the seventh feature of including: a plurality of gaming terminals 10 each having a terminal display 614 on which a plurality of symbols 501 are provided and a terminal controller 630; and a center controller 200 having a memory 6214, the terminal controller 630 executing, by using the functions of components such as the basic game running unit 605 and the common game running unit 607, the steps of: based on betting, running a basic game in which a plurality of symbols 501 are rearranged, independently from the other gaming terminals 10; transmitting bet amount information of the betting to the center controller 200; and awarding a payout based on payout amount information transmitted from the center controller 200, and the center controller 200 executing the steps of: based on the bet amount information, determining at least one common game qualification time and at least one payout rate of said at least one common game qualification time at each unit time; accumulatively storing, in the memory, said at least one common game qualification time in association with said at least one payout rate, for each of the gaming terminals 10; determining whether a predetermined common game condition is established at predetermined intervals, and subtracting the unit time from one of said at least one common game qualification time which is stored in the memory and associated with the highest one of said at least one payout rate of each of the gaming terminals 10; (f4) when the common game condition is established, selecting a common game in which the gaming terminals 10 having said at least one common game qualification time are synchronized with one another from a plurality of common games, and running the selected common game; (f5) based on a result of the common game, determining a unit payout amount and selecting a gaming terminal 10 to which a payout is awarded; and (f6) awarding, to the selected gaming terminal 10, payout amount information calculated by multiplying, by the unit payout amount, the highest one of said at least one payout rate associated with one of said at least one common game qualification time that the selected gaming terminal 10 has.

According to the arrangement above, only the gaming terminals 10 to which the common game qualification time is given are allowed to join a common game. The common game qualification time is awarded based on a bet amount on a basic game, and the payout rate by which the unit payout amount is multiplied when a payout is awarded as a result of a common game is determined in each unit time. This motivates the players to continue the playing of the basic game with a high bet amount, thereby improving the entertainment characteristics. In addition to the above, because the payout rate associated with the common game qualification time of the gaming terminal 10 is decreased each time a predetermined time passes, it is possible to increase the profit of the administrator of the gaming machine 300.

In addition to the above, the gaming machine 300 having the seventh feature may be arranged so that, provided that the lowest one of said at least one payout rate is a payout rate N, the center controller 200 includes a maximum qualification time storage device 6218 which stores the payout rate N in association with an upper limit $X_N$ of accumulation of said at least one common game qualification time of the payout rate N or higher, and the center controller further executes the steps of: as a result of accumulative storing of the common game qualification time, calculating accumulation $Y_N$ of said at least one common game qualification time having the payout rate N or higher; when the accumulation $Y_N$ exceeds the upper limit $X_N$, adding $Y_N-X_N$ to $Y_{N+1}$ and updating $Y_N$ to $X_N$; incrementing the payout rate N by one and repeating the steps above until the payout rate N reaches the highest one of said at least one payout rate; and calculating a common game qualification time $Z_N$ of each of said at least one payout rate to be stored in the memory by an equation of $Z_N=Y_N-Y_{N+1}$.

According to the arrangement above, only the gaming terminals 10 having obtained the common game qualification time can join a common game. The common game qualification time is awarded according to a bet amount in a basic game, and a payout rate by which the unit payout amount is multiplied when a payout is awarded as a result of a common game is determined for each unit time. This motivates the players to continue the playing of the basic game with a high bet amount, thereby improving the entertainment characteristics. In addition to the above, because the payout rate associated with the common game qualification time of the gaming terminal 10 is decreased each time a predetermined time passes and the upper limit of the common game qualification time is determined, it is possible to increase the profit of the administrator of the gaming machine 300.

In addition to the above, the gaming machine 300 has the eighth feature of including: a plurality of gaming terminals 10 each having a terminal controller 630; and a center controller 200 which has a center-side bonus type storage unit 6219 in which bonus types and unit payout amounts are stored in association with one another, the terminal controller executing, by using the functions of components such as the basic game running unit 605 and the common game running unit 607, a step of: running a basic game independently from the other gaming terminals 10, and the center controller 200 executing, by using the functions of components such as the common game running unit 6211, steps of:

determining whether a predetermined common game condition is established; when the common game condition is established, running any one of: a first common game in which a participating gaming terminal 10 is able to win a bonus type more than once and a payout based on a unit payout amount corresponding to the bonus type that the gaming terminal 10 wins is awarded to the gaming terminal 10; a second common game in which a participating gaming terminal 10 is able to win a bonus type more than once and a payout based on the number of winnings is awarded to the gaming terminal 10; and a third common game in which one of the participating gaming terminals 10 is able to win one of the predetermined bonus types and a payout is awarded to the gaming terminal 10 which wins said one of the bonus types; and if the first or second common game is run, determining whether to run the third common game, and if yes, running the third common game, after the first or second common game.

According to the arrangement above, it is possible to run a first common game in which the gaming terminals 10 participating the game are able to win a bonus type more than once and a payout based on the unit payout amount corresponding to the bonus type that the gaming terminal 10 wins is awarded to the gaming terminal 10, a second common game in which the gaming terminal 10 participating the game are able to win a bonus type more than once and a payout based on the number of times of winning is awarded to the gaming terminal 10, and a third common game in which one of the gaming terminals 10 participating in the game is able to win one of predetermined bonus types and a payout is awarded to the gaming terminal 10 which wins that bonus type. This expands a variety of common games to which a plurality of gaming terminals 10 participate. Furthermore, because the third common game may be run after the first and second common games, the player expects a larger payout. The entertainment characteristics are improved as a result.

The gaming machine 300 having the eight feature may be arranged so that the gaming machine 300 further includes: a plurality of upper displays 700 which are provided in a parallel manner independently from the gaming terminals 10 so as to form a single common effect display screen on which a plurality of individual images corresponding to the respective terminals 10 are displayed, each of the gaming terminals 10 further including: a terminal display 614 on which a plurality of symbols 501 are provided, the terminal controller 630 further executing a step of: displaying an effect image on the terminal display 614 based on a common game start effect image display command transmitted from the center controller 200, the center controller 200 further including: an image storage unit which stores a common game start effect image displayed on the common effect display screen, and the center controller further executing a step of: when the common game starts, displaying the common game start effect image on the common effect display screen and transmitting the common game start effect image display command to the gaming terminals 10 to display the common game start effect image divided for respective gaming terminal areas 703 on the terminal display of each of the gaming terminals corresponding to the gaming terminal areas 703.

According to this arrangement, the content identical with the common game start effect image displayed on the common effect display screen constituted by the upper displays 700 is displayed on a virtual screen constituted by the terminal displays 614 of the respective gaming terminals 10. This makes it possible to clearly notify the players at the respective gaming terminals 10 of the start of the common game. Furthermore, since the content identical with the image on the common effect display screen is divided and displayed on the gaming terminals 10, the feeling of "unity" of the gaming terminals 10 is enhanced and therefore the entertainment characteristics are improved.

In addition to the above, the gaming machine 300 having the eighth feature may be arranged so that a plurality of upper displays 700 which are provided in a parallel manner independently from the gaming terminals 10 so as to form a single common effect display screen on which a plurality of individual images corresponding to the respective terminals 10 are displayed is further included, and the center controller 200 further executes steps of: in the common game, displaying a fishing bait image as the individual image on the common effect display screen; and enlarging the displayed fishing bait image when, among the bonus types, a bonus type corresponding to a unit payout amount not lower than a predetermined amount is won.

According to the arrangement above, it is possible to notify that the bonus type that the player wins is associated with a predetermined amount or more, by the fishing bait image which is an individual image. This increases the player's expectations and improves the entertainment characteristics.

The gaming machine 300 having the eighth feature may be arranged so that the gaming machine 300 further includes: a plurality of upper displays 700 which are provided in a parallel manner independently from the gaming terminals 10 so as to form a single common effect display screen on which a plurality of individual images corresponding to the respective terminals 10 are displayed, the center-side bonus type storage unit 6219 storing the bonus types in association with fish images and ranks corresponding to the unit payout amounts, and the center controller 200 executing a step of: in the common game, displaying, as the individual image, the fish image corresponding to the bonus type having been won on the common effect display screen, with a size corresponding to the rank of the bonus type.

According to the arrangement above, the bonus type that the player wins is notified by a fish image and the unit payout amount thereof is notified by the size of the fish image. This increases the player's expectations and improves the entertainment characteristics.

In addition to the above, the gaming machine 300 has the ninth feature of including: a plurality of gaming terminals 10 each having a terminal controller 630; and a center controller 200 which includes a center-side bonus type storage unit 6219 storing bonus types in association with unit payout amounts and a center-side probability table storage unit 6220 storing a probability table in which combinations of the bonus types are associated with probabilities of the combinations, the terminal controller 630 executing, by using the functions of components such as the basic game running unit 605 and the common game running unit 607, the steps of: running a basic game independently from the other gaming terminals 10; and awarding a payout based on payout information transmitted from the center controller 200, and the center controller 200 executing, by using the functions of components such as the common game running unit 6211, the steps of: determining whether a predetermined common game condition is established; if the common game condition is established, running a common game for a predetermined time; based on the probabilities stored in the probability table, determining a combination of the bonus type for each of the gaming terminals 10 participating in the common game; determining a bonus payout amount based on the combination of the bonus types determined for each of the gaming terminals; determining the rank of the bonus payout amount for each of the participating gaming terminals 10 and determining a ranking payout amount based on the rank; and transmitting payout information including the bonus payout amount and the ranking payout amount to the terminal controller 630.

According to the arrangement above, the gaming terminals 10 participating the common game may receive the total sum of the bonus payout amount corresponding to the bonus type that the player wins and the ranking payout amount based on the rank of the bonus payout amount. This increases the player's expectations and improves the entertainment characteristics.

In addition to the above, the gaming machine 300 has the tenth feature of including: a plurality of gaming terminals 10 each having a terminal controller 630; and a center controller 200 which includes a center-side bonus type storage unit 6219 storing bonus types in association with unit payout amounts and a center-side probability table storage unit 6220 storing a probability table in which combinations of the bonus types are associated with probabilities of winning the bonus types, the terminal controller 630 executing, by using the functions of components such as the basic game running unit 605 and the common game running unit 607, steps of: running a basic game independently from the other gaming terminals 10; and awarding a payout based on payout information transmitted from the center controller 200, and the center controller 200 executing, by using the functions of components such as the common game running unit 6211, steps of: determining whether a predetermined common game condition is established; if the common game condition is established, running a common game for a predetermined time; in the common game, repeatedly determining which one of the bonus types is awarded for each of the gaming terminals 10 participating in the common game, based on the probabilities in the probability table; determining, for each of the gaming terminals 10, bonus awarding frequencies indicating how many times a bonus type is awarded; determining ranks of bonus awarding frequencies of the participating gaming terminals 10 and determining a ranking payout amount based on each of the ranks; when the awarded bonus type is a specific type, determining a special payout amount based on that bonus type; and transmitting payout amount including the ranking payout amount and the special payout amount to the terminal controller 630.

According to the arrangement above, the gaming terminals 10 participating in the common game may receive the total sum of a ranking payout amount based on the ranking of the winning frequencies of bonus types and a special payout amount which is awarded when the bonus type that the player wins is a specific type. This increases the player's expectations and improves the entertainment characteristics.

In addition to the above, the gaming machine 300 has the eleventh feature of including: a plurality of gaming terminals 10 each having a terminal controller 630; and a center controller 200 which includes a center-side bonus type storage unit 6219 storing bonus types in association with unit payout amounts and a center-side probability table storage unit 6220 storing a probability table in which combinations of the bonus types are associated with probabilities of winning the bonus types, the terminal controller 630 executing, by using the functions of components such as the basic game running unit 605 and the common game running unit 607, steps of: running a basic game independently from the other gaming terminals 10; and awarding a payout based on payout information transmitted from the center controller 200, and the center controller 200 executing, by using the functions of components such as the common game running unit 6211, steps of: determining whether a predetermined common game condition is established; if the common game condition is established, running a common game for a predetermined time; in the common game, repeatedly determining which one of the bonus types is awarded for each of the gaming terminals 10 participating in the common game, based on the probabilities in the probability table; completing the repeating step when any one of the gaming terminals 10 wins a specific bonus type among the bonus types; determining a bonus payout amount for each of the gaming terminals 10 based on the bonus type having been won; and transmitting payout information including the bonus payout amount to the terminal controller 200.

According to this arrangement, in a common game, the gaming terminal 10 which wins a specific bonus type first receives the payout based on that bonus type. This increases the player's expectations and improves the entertainment characteristics.

In addition to the above. the gaming machine 300 having the ninth to eleventh features may be arranged so that, the center-side probability table storage unit 6220 stores different probability tables as many as the gaming terminals, and the center controller 200 allocates the different probability tables to the respective gaming terminals 10 when the common game starts.

This arrangement makes it possible to differentiate the probabilities between the gaming terminals 10 participating the common game, thereby improving the entertainment characteristics.

In addition to the above, the gaming machine 300 has the twelfth feature of including: a plurality of gaming terminals 10 each including a terminal display 614 on which a plurality of symbols 501 including a specific symbol 510 are provided and a terminal controller 630; a plurality of upper displays 700 which are arranged in a parallel manner independently from the gaming terminals 10 so as to form a single common effect display screen constituted by gaming terminal areas 703 corresponding to the respective gaming terminals 10; and a center controller 200 which includes a center-side bonus type storage unit 6219 in which bonus types and unit payout amounts are stored in association with one another and a center-side probability table storage unit 6220 which stores a plurality of probability tables in which combinations of the bonus types are associated with probabilities of the combinations and are different for bet amounts, the terminal controller 630 executing, by using the functions of components such as the basic game running unit 605 and the common game running unit 607, the steps of: determining the symbols 501 to be rearranged on the terminal display 614, based on betting; when the symbols 501 to be rearranged includes a predetermined number or more of the specific symbol 510, transmitting an independent special game start signal including a bet amount to the center controller 200; and awarding a payout based on independent special game payout information transmitted from the center controller 200, and the center controller 200 executing, by using the functions of components such as the common game running unit 6211, the steps of: selecting one of the probability tables based on the independent special game start signal transmitted from the terminal controller 200; based on the probabilities in the selected probability table, selecting a combination of the bonus types; determining whether a common game in which a plurality of gaming terminals 10 are able to participate is being run, and displaying, when the common game is not being run, an effect image on the gaming terminal area 703 of the common effect display screen, which corresponds to the gaming terminal 10 which has transmitted the independent special game start signal; determining an independent special game payout amount based on the selected combination of the bonus types; and transmitting payout information including the independent special game payout amount to the terminal controller 630.

According to the arrangement above, a payout is awarded based on a basic game to the gaming terminal 10 which has won an independent special game. When a common game is being run, no effect display is conducted to avoid confusion. This increases the player's expectations and improves the entertainment characteristics.

In addition to the above, the gaming machine 300 has the thirteenth feature of including: a plurality of gaming terminals 10 each including a terminal display which has symbol display regions 614*a* in which a plurality of symbols 501 including a specific symbol 510 is provided and a terminal controller 630 including a terminal-side bonus type storage device 609 storing bonus types and unit payout amounts in association with one another, and a terminal-side probability table storage device 610 storing a probability table in which the bonus types, probabilities of winning the bonus types, and bet amounts are stored in association with one another; a plurality of upper displays 700 which are arranged in a parallel manner independently from the gaming terminals 10 so as to form a single common effect display screen constituted by gaming terminal areas 703 corresponding to the respective gaming terminals 10; and a center controller 200, the terminal controller 630 executing, by using the functions of components such as the basic game running unit 605 and the common game running unit 607, the steps of: determining symbols to be rearranged on the terminal display, based on betting; when the specific symbol is not provided in a specific one of the symbol display regions, determining whether to award one of the bonus types based on the probability table; when it is determined that said one of the bonus types is awarded, transmitting a bonus type signal including said one of the bonus type to the center controller 200; and awarding a payout corresponding to the bonus type, based on a completion signal transmitted from the center controller 200, and the center controller 200 executing, by using the functions of components such as the common game running unit 6211, the steps of: determining, based on a bonus type signal from the terminal controller 630, whether a common game in which a plurality of gaming terminals are able to participate is being run, and displaying, when the common game is not being run, an effect image on the gaming terminal area 703 of the common effect display screen, which corresponds to the gaming terminal 10 which has transmitted the bonus type signal; and after displaying the effect image, transmitting a completion signal to the terminal controller 630.

According to the arrangement above, when in a basic game a specific symbol 510 is not provided in a specific symbol display region 614*a*, a payout may be awarded as a result of random selection. When a common game is being run, no effect display is conducted to avoid confusion. This increases the player's expectations and improves the entertainment characteristics.

The gaming machine 300 having the twelfth and thirteenth features may be arranged so that, when a starting condition of the common game is established, the center controller 200 starts the common game after the terminal controller 630 of each of the gaming terminals 10 finishes execution of the steps and the center controller 200 finishes execution of the steps.

This arrangement prevents the effect display of the payout independently awarded on each gaming terminal 10 is interrupted midway. Furthermore, it is possible to show an independent effect display to each of the player at the other gaming terminals 10 waiting for the participation to a common game, thereby increasing the motivation of the players at the other gaming terminals 10 to continue playing.

In addition to the above, the gaming machine 300 has the fourteenth feature of including: a plurality of gaming terminals 10 each having a terminal controller 630; and a center controller 200, the terminal controller 630 executing, by using the functions of components such as the basic game running unit 605 and the common game running unit 607, the steps of: running a basic game independently from the other gaming terminals 10; and awarding a fixed payout based on fixed payout information from the center controller 200, and the center controller 200 executing, by using the functions of components such as the common game running unit 6211, the steps of: based on the basic game, determining whether any one of the gaming terminals satisfies a predetermined common game qualification condition; when any one of the gaming terminals satisfies the common game qualification condition, awarding a common game qualification to said one of the gaming terminals; determining whether a predetermined common game condition is established at predetermined intervals; if the common game is not being run when the common game condition is established, running a common game in which the gaming terminal each having the common game qualification are synchronized with one another; and if the common game is being run when the common game condition is established, transmitting the fixed payout information to a gaming terminal which is not participating in the common game.

According to the arrangement above, if a common game has already been started when the common game condition is established, a fixed payout is awarded to the gaming terminal 10 which do not participate in the common game. This encourages the players to continue basic games, thereby improving the entertainment characteristics.

Note that the connection between the gaming terminals 10 and the center controller 200 may be wireless, wired, or a combination of these. Note that a unit of the bet amount may be a national or regional currency such as dollar, yen, and Euro. The unit of the bet amount may also be a game point used only at a hall where the gaming machine 300 is provided, or in the related industry.

The expression "rearrange" means dismissing an arrangement of symbols 501, and once again arranging symbols 501. An "arrangement" in this specification means a state of symbols 501, which can be visually confirmed by a player.

Note that a unit game includes a series of operations performed within a period between a start of receiving a bet to a point where a winning may be resulted. In the present embodiment, a unit game is repeatable in the base game, and contains one each of the following: a bet time where a bet is accepted; a game time where symbols 501 having been stopped are rearranged; and a payout time where a payout process is performed to award a payout. Note that the "base game" is a game runnable on condition that a game value is bet, which base game awards an amount of game media based on symbols 501 rearranged. In other words, the "base game" is a unit game which starts on the premise that a game value is consumed. The "unit game" in the present embodiment is so-called slot game which is run in each gaming terminal 10 independently of the other gaming terminals 10.

Note that the gaming machine 300 of the present embodiment is structured so that each gaming terminal 10 is able to run a bonus game (terminal bonus game) independently of the other gaming terminals 10. Another bonus game may be adopted in combination, provided that the player is given a more advantageous gaming state than the base game. For example, in the bonus game, various states such as a state in which a larger amount of game values than in the base game is obtainable, a state in which the probability of obtaining a game value is higher than in the base game, and a state in which the amount of consumed game values is smaller than in the base game such as a free game may be realized independently or in combination.

A game runnable with a bet of less game values than the base game is referred to as "free game". Note that "bet of fewer amounts of game values" encompasses a bet of zero game value. The "free game" therefore may be a game runnable without a bet of game value, which awards an amount of game values according to symbols 501 having been rearranged. In other words, the "free game" may be a game which is started without the premise that a game value is consumed. To the contrary, a later-mentioned "base game" is a game runnable on condition that a game value is bet, which awards an amount of game values according to symbols 501 rearranged. In other words, the "base game" is a game which starts on the premise that a game value is consumed.

The gaming machine 300 of the present embodiment has a state in which the base game or the bonus game is runnable, and a state in which the common game is runnable. The base game and/or the bonus game (terminal bonus game) are also referred to as basic game. Thus, in the present embodiment, the basic game includes a base game and/or a bonus game. Further, the common game or the period during which the common game is run is referred to as "event time".

The "game value" is a coin, bill, or electronic information corresponding to them. Note that the game value in the present invention is not particularly limited. Examples of the game value include game media such as medals, tokens, electronic money, tickets, and the like. Further, the ticket is not particularly limited and may be a later-described ticket with a barcode or the like ticket.

Although the present embodiment describes a gaming machine 300 which has a center controller 200 in addition to the gaming terminals 10, the invention is not limited to this. The gaming machine 300 may be arranged so that one or more gaming terminal 10 has the function of the center controller 200 and the gaming terminals 10 are connected with each other to be able to exchange data therebetween.

(Internal Connection Layout of Gaming Machine 300)

Figure 4:
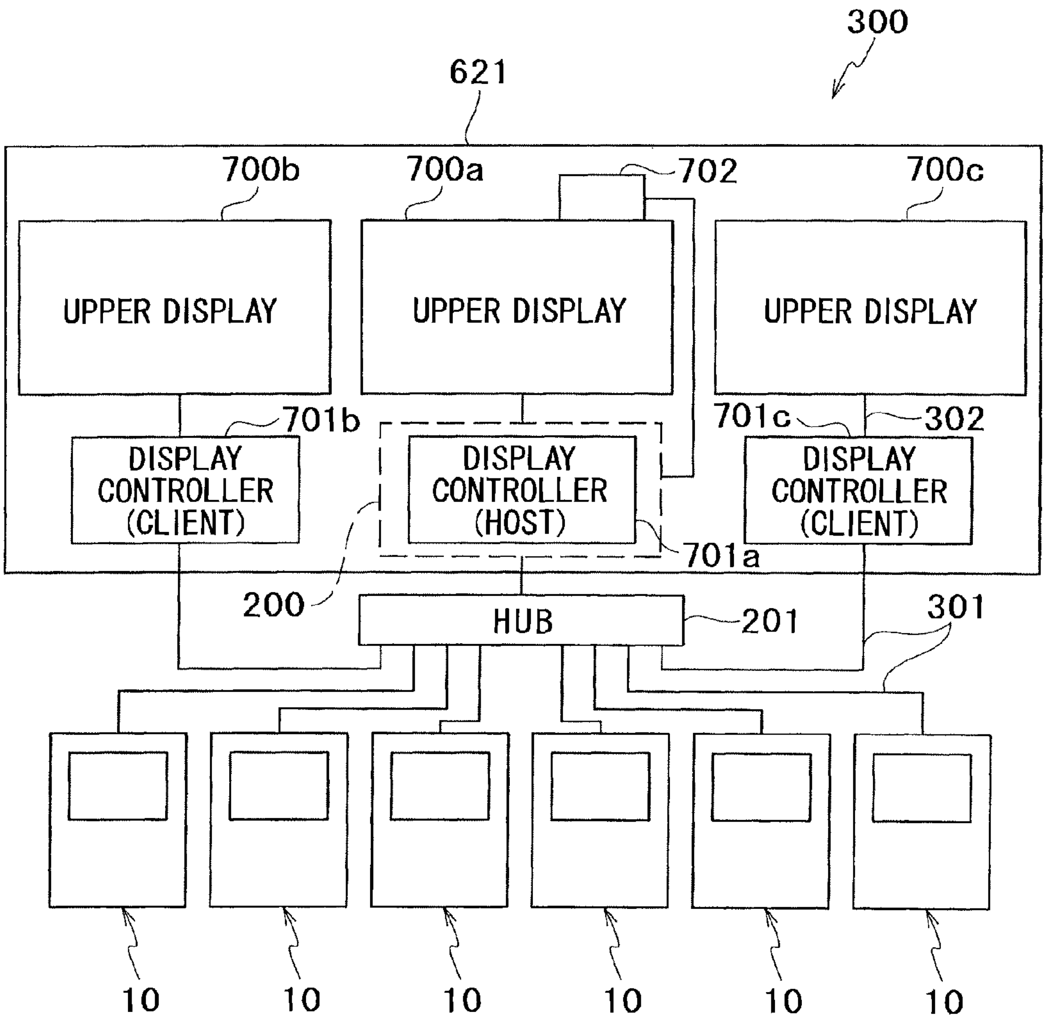
FIG. 4 shows an internal connection layout of the gaming machine.

Now, referring to FIG. 4, the internal connection layout of the gaming machine 300 including the gaming terminals 10 will be described. FIG. 4 shows the gaming machine 300 including the gaming terminals 10 according to First Embodiment of the present invention.

The gaming machine 300 includes six gaming terminals and an external controller 621. The external controller 621 includes three upper displays 700 (700*a*, 700*b*, and 700*c*) and three display controllers 701 (701*a*, 701*b*, and 701*c*). The display controller 701*a* is a component of the center controller 200 and hosts the other display controllers 701*b* and 701*c*. In other words, the display controllers 701*b* and 701*c* are clients of the display controller 701*a*. The display controllers 701*a*, 701*b*, and 701*c* are connected with the respective upper displays 700*a*, 700*b*, and 700*c* via monitor cables 302, so as to function as system controllers controlling the respective upper displays 700.

In addition to the above, the gaming machine 300 is provided with a hub 201. Upstream of the hub 201, the display controller 701*a* (center controller 200) is connected via a LAN cable 301. On the other hand, downstream of the hub 201, the gaming terminals 10 and the display controllers 701*b* and 701*c* are connected via the LAN cable 301. That is to say, the center controller 200 is connected with the gaming terminals 10 to be able to conduct data communications therebetween, and the center controller 200 (display controller 701*a*) is connected to be able to control the display controllers 701*b* and 701*c*. This makes it possible to control the display controllers 701*a*, 701*b*, and 701*c* to cause the upper displays 700 to display images as a single common effect display screen.

In addition to the above, the upper display 700*a* is provided with an illuminance sensor 702 to detect the brightness of disturbance light applied to the upper display 700*a*. The illuminance sensor 702 transmits a brightness signal always or at regular intervals to the center controller 200. This brightness signal indicates the brightness of the disturbance light applied onto the upper display 700*a*. Receiving the brightness signal, the center controller 200 determines whether the currently-set brightness is appropriate by conducting comparison with a predetermined standard. If inappropriate, the center controller 200 controls the display controllers 701*a*, 701*b*, and 701*c* to change the brightness to a suitable level.

(Mechanical Structure of Gaming Machine 300)

Next, the following describes a specific example of mechanical and electrical structures of the gaming machine 300 thus structured.

Figure 5:
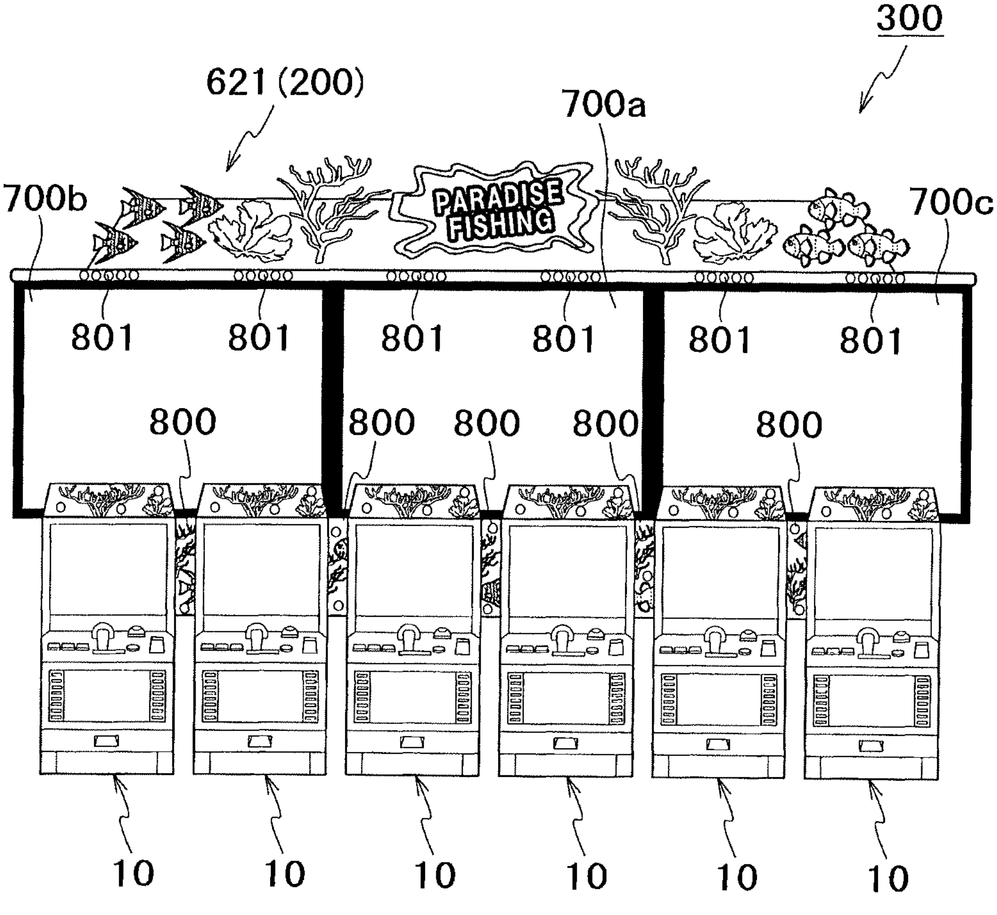
FIG. 5 is a front elevation of the entirety of the gaming machine.

As shown in FIG. 5, the gaming machine 300 includes six gaming terminals 10 which are provided in a parallel manner and each independently runs a basic game and an external controller 621 (center controller 200) which is connected with the gaming terminals 10 to be able to communicate therewith and runs a common game. The external controller 621 has three parallel upper displays 700*a*, 700*b*, and 700*c* forming a single common effect display screen, independently from the gaming terminals 10.

Between neighboring gaming terminals 10, an inter-terminal panel 800 is provided. Each inter-terminal panel 800 has at least one LED to light the panel itself. The inter-terminal panel 800 is decorated with pictures indicating the theme of the games playable by the gaming machine 300, giving integrity to the gaming terminals 10. This makes the entirety of the gaming machine 300 look larger than the actual size.

In addition to the above, the upper displays 700 are provided with LED units 801 corresponding to the respective gaming terminals 10. More specifically, the LED units 801 are provided at the upper parts of the frame of each upper display 700 to be immediately above the respective gaming terminals 10. That is to say, the LED units 801 are provided to enclose an upper part of the upper displays 700. For example, when a later-described independent special game starts at the corresponding gaming terminal 10, the LED unit 801 produces an effect such as flickering for the corresponding gaming terminal 10. This makes it possible to notify which gaming terminal 10 wins an independent special game.

In addition to the above, above the external controller 621 and above each gaming terminal 10, decoration panels decorated with pictures indicating the theme of the games playable by the gaming machine 300 are provided. It is noted that, except FIG. 5, the inter-terminal panel 800, the LED units 801, and the decoration panels are omitted from the figures.

Figure 6:
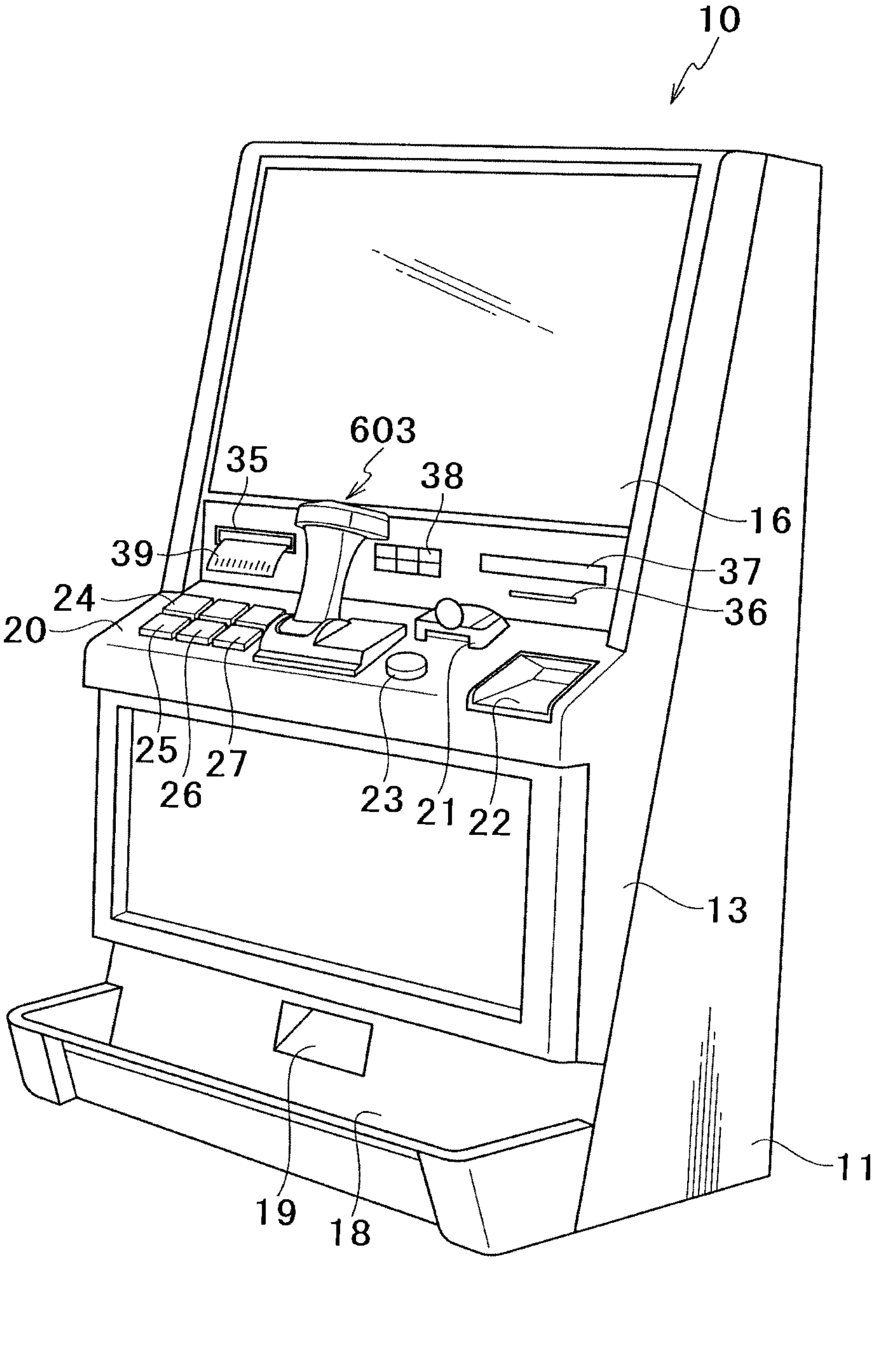
FIG. 6 is a perspective view of the gaming terminal.

As shown in FIG. 6, the gaming terminal 10 includes a cabinet 11 and a main door 13 provided on the front surface of the cabinet 11. The main door 13 has a terminal image display panel 16. The terminal image display panel 16 has a transparent liquid crystal panel for displaying various kinds of information. The terminal image display panel 16 displays display windows 150 (display video reels 151 to 155) for scroll-displaying and arranging a plurality of symbols 501 (see FIG. 11). Further, the terminal image display panel 16 displays various information and effect images related to a game.

The present embodiment deals with a case where the terminal image display panel 16 electrically displays symbols 501 arranged in five columns and three rows. However, the present invention is not limited to this.

Note that the terminal image display panel 16 may have a credit amount display unit and a payout amount display unit. The credit amount display unit displays a total value (hereinafter also referred to as total credit value) which a gaming terminal 10 ca payout to a player. When symbols stopped along a payline form a winning combination, the payout amount display unit displays the number of coins to be paid out.

Below the terminal image display panel 16 provided are a control panel 20, a coin receiving slot 21, and a bill validator 22. The control panel 20 is provided with buttons 23 to 27 and a control lever 603 as a movable unit. These buttons 23 to 27 and the control lever 603 allows the player to input instructions concerning the progress of a game. Through the coin receiving slot 21, a coin is received in the cabinet 11.

The control panel 20 has: a spin button 23, a change button 24, a cashout button 25, a 1-bet button 26, and a maximum bet button 27. The spin button 23 is for inputting an instruction to start symbol scrolling. The change button 24 is used to ask a staff person in the gaming facility for exchange of money. The cashout button 25 is for inputting an instruction to payout coins corresponding to the total credit value into the coin tray 18.

The 1-bet button 26 is used for betting one coin out of those corresponding to the total credit value. The maximum bet button 27 is used for betting, out of those corresponding to the total credit value, a maximum number of coins (e.g., 50 coins) which can be bet in one game.

The bill validator 22 validates whether a bill is genuine or not and receives the genuine bill into the cabinet 11. Note that the bill validator 22 is capable of reading a barcode attached to a later-mentioned barcoded ticket 39. When the bill validator 22 reads the barcoded ticket 39, it outputs to the main CPU 41 a read signal representing information having read from the barcode.

On the lower front surface of the main door 13, that is, below the control panel 20, a belly glass 34 is provided. On the belly glass 34, a character of the gaming terminal 10, or the like is drawn.

Below the terminal image display panel 16 are provided a ticket printer 35, a card reader 36, a data displayer 37, and a keypad 38. The ticket printer 35 prints on a ticket a barcode and outputs the ticket as a barcoded ticket 39. A barcode is encoded data containing a credit amount, date and time, an identification number of the gaming terminal 10, or the like. A player can play a game in another gaming terminal 10 using the barcoded ticket 39 having the barcode, or can exchange the barcoded ticket 39 having the barcode with a bill or the like at a change booth of the gaming facility.

The card reader 36 reads/writes data from/into a smart card. The smart card is carried by a player, and stores therein data for identifying the player, data relating to a history of games played by the player, or the like.

The data displayer 37 includes a fluorescent display or the like, and displays the data read by the card reader 36 and the data input by the player through the keypad 38. The keypad 38 is for entering instructions or data relating to issuing of a ticket or the like.

Figure 7:
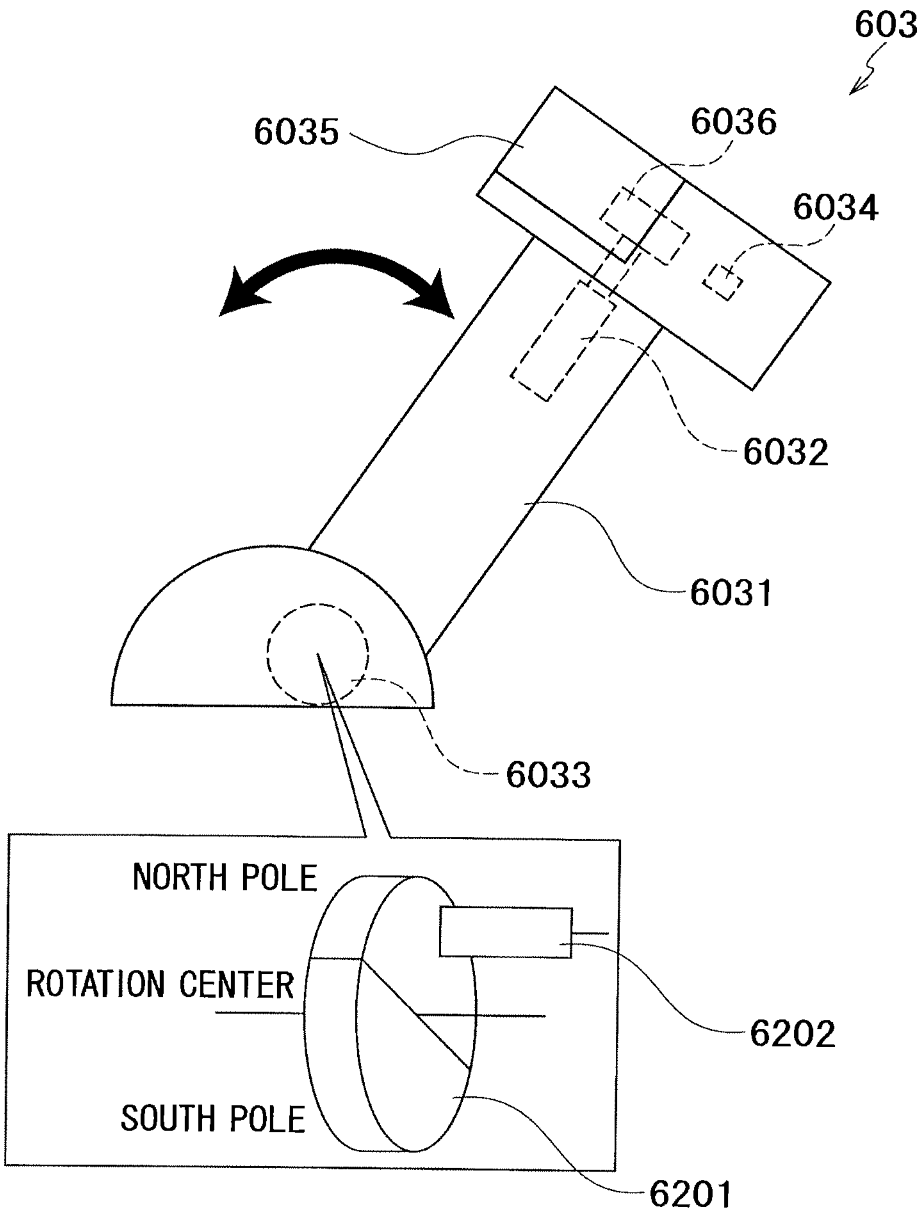
FIG. 7 is a schematic drawing of a control lever.
Figure 8:
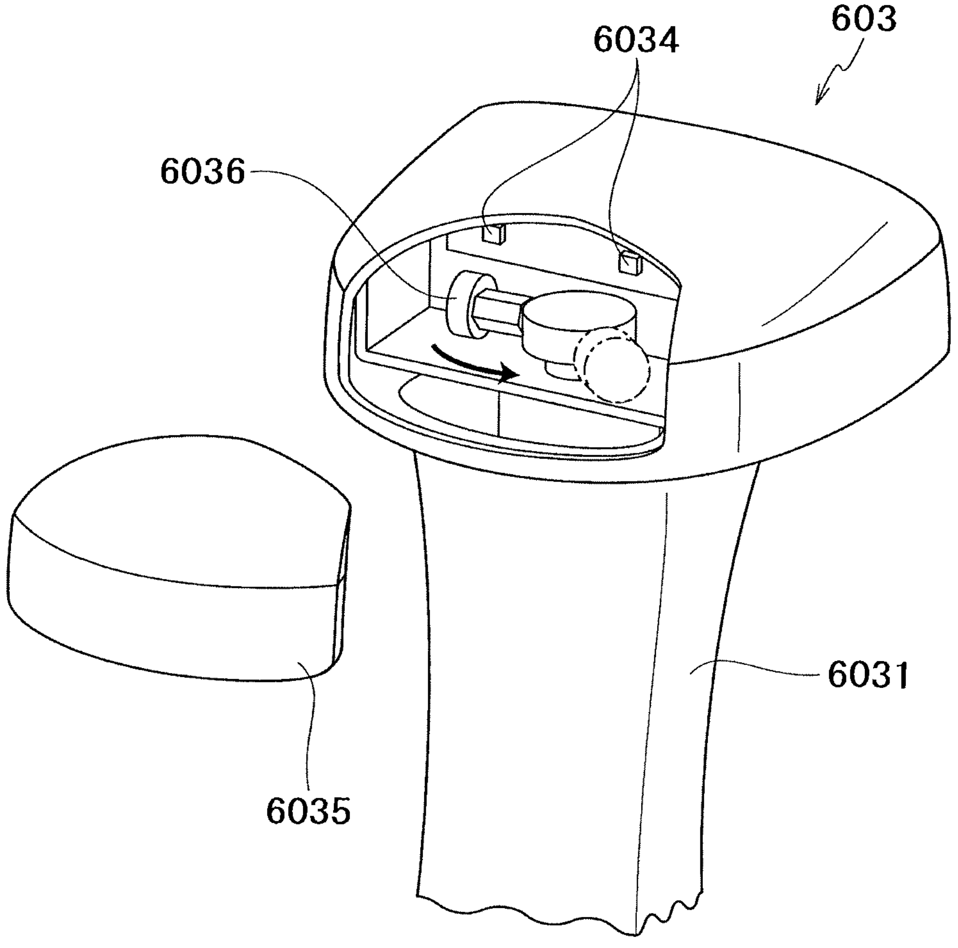
FIG. 8 is a partial exploded perspective view showing the control lever.

Now, referring to FIG. 7 and FIG. 8, the control lever 603 will be described. FIG. 7 is a schematic drawing showing the control lever 603 crosswise. As shown in FIG. 7, the control lever 603 includes a lever body (lever) 6031 that the player can grip, a vibration motor (first motor) 6032 which is provided in the lever body 6031 to vibrate the lever, a rotation motor (second motor) 6033 which is provided in the lever body 6031 to bias the lever 6031 in a predetermined rotation direction, and an LED (light emission unit) 6034 provided at an upper part of the lever body 6031.

The lever body 6031 is substantially T-shaped in cross section, and has at an upper part a light emitting portion in which the LED 6034 is stored and a gripped portion to be gripped by the player. The light emitting portion of the lever body 6031 is provided with a light-transmissive cover 6035 which allows light from the LED 6034 to pass through. At an upper part of the gripped portion, the vibration motor 6032 is stored. This vibration motor 6032 vibrates under the control of an unillustrated driver. Furthermore, the lever body 6031 is arranged to be rotatable in forward and backward directions in the elevation view of the gaming terminal 10 (i.e. the directions indicated by the arrows in FIG. 7). The control lever 603 is provided with the rotation motor 6033 at a part inside the cabinet 11 below the gripped portion. The rotation motor 6033 provides torque in a rotation direction to the lever body 6031 in a rotatable state, by an unillustrated driver.

In addition to the above, at the light emitting portion of the control lever 603, a pendulum component 6036 is provided to be coaxial with the vibration motor 6032 and rotate with the vibration motor 6032. FIG. 8 is a partial exploded perspective view of the control lever 603. As shown in FIG. 8, the pendulum component 6036 is formed to partly protrude in a radial direction. The pendulum component 6036 is positioned to block at least a part of light emitted from the LED 6034 to the light-transmissive cover 6035. With this, rotating with the vibration motor 6032, the pendulum component 6036 changes the light emitted from the LED 6034 and running out through the light-transmissive cover 6035 in synchronization with the vibration motor 6032. In other words, as the protrusion of the pendulum component 6036 blocks or do not block the light from the LED 6034, the light viewed from the outside through the light-transmissive cover 6035 is changed.

As shown in FIG. 7, the control lever 603 is connected to a magnet 6201. The magnet 6201 rotates with the lever body 6031 because is connected to the rotation axis of the lever body 6031. With this, the magnet 6201 changes an external magnetic field in accordance with the rotation of the lever body 6031. Furthermore, as shown in FIG. 7, a magnetic force detecting mechanism 6202 is fixed to the vicinity of the magnet 6201. This magnetic force detecting mechanism 6202 includes a magnetic force sensor which outputs a magnetic force detection signal indicating the output intensity of the magnetic force and a sensor fixing mechanism which fixes the magnetic force sensor at a predetermined position. The magnetic force detecting mechanism 6202 is arranged to detect the magnetic force of the magnetic field generated by the magnet 6201 and changing in accordance with the rotation of the lever body 6031.

(Lever Position Determining Table)

FIG. 9 shows a lever position determining table used for associating the lever positions with detected magnetic forces. lever position determining table has a lever position field and a detected magnetic force field. Each type the gaming terminal 10 is activated, the table is updated in a later-described RAM 43. More specifically, the lever position field stores lever positions indicating the angles of the lever body 6031. The detected magnetic force field stores the magnetic forces detected by the magnetic force detecting mechanism 6202, when the lever body 6031 is at the respective lever positions.

More specifically, when the gaming terminal 10 is activated, the lever body 6031 of the control lever 603 is rotated by the rotation motor 6033 from the starting point to the ending point, while the magnetic force detecting mechanism 6202 detects the magnetic forces at the respective positions. As such, the magnetic forces of the lever body 6031 at the respective positions are detected, and the lever position determining table in which the positions are associated with the magnetic forces at the respective positions is updated. For example, in the case of FIG. 9, the detected magnetic force at the starting point is "ND78", whereas the detected magnetic force at the ending point is "ND126". Therefore, in the movable range of the lever body 6031, the magnetic force varies within the range of "ND78" to "ND126". In other words, it is possible to specify the position (angle) of the lever body 6031 by reading out a detected magnetic force.

(Electric Configuration of Gaming Machine 300)

Figure 10:
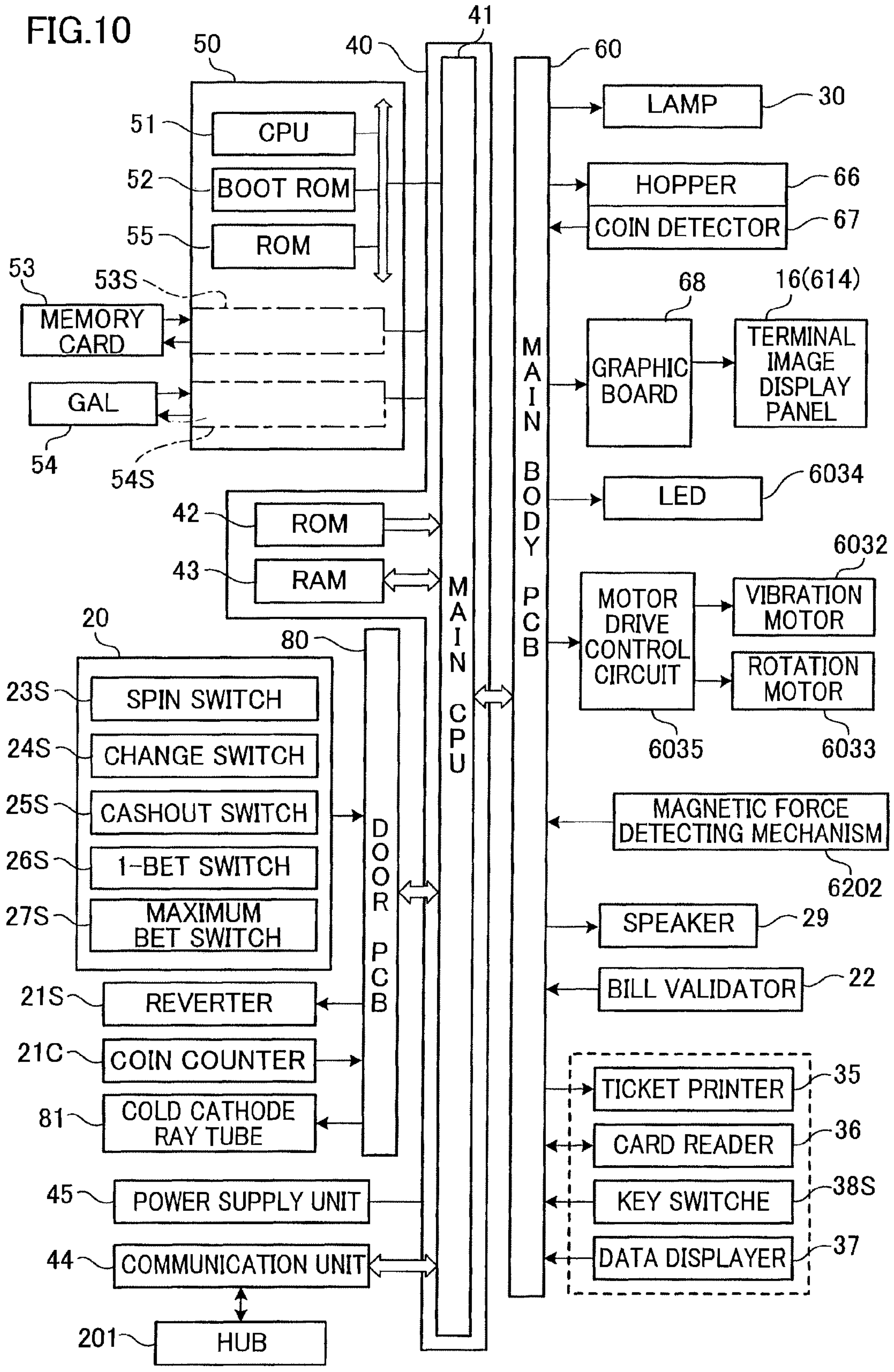
FIG. 10 is a block diagram of a control circuit of the terminal controller.
Figure 11:
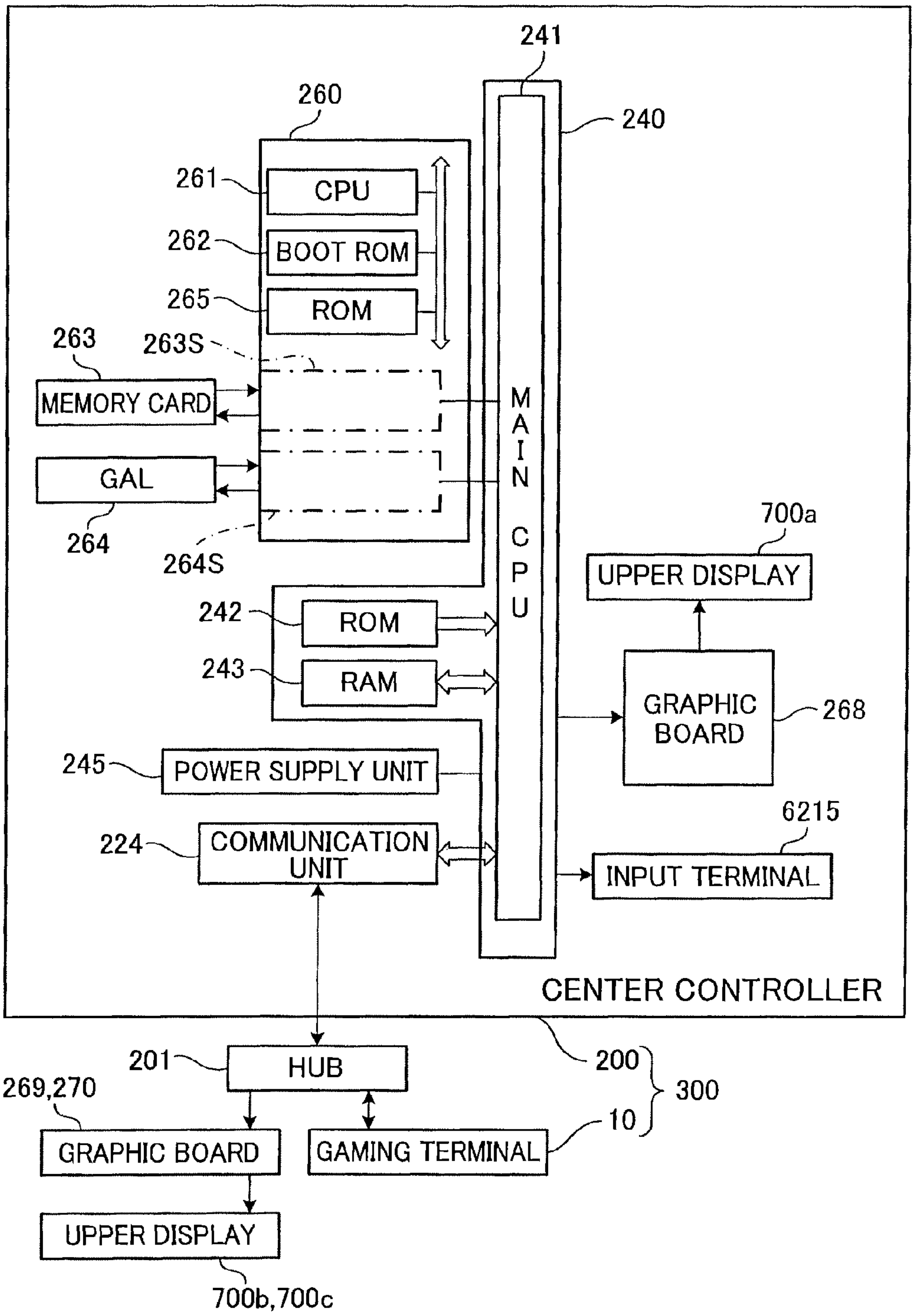
FIG. 11 is a block diagram of a control circuit of the center controller.

FIGS. 10 and 11 are block diagrams each illustrating an electric configuration of the entire gaming machine 300.

(Electric Configuration of Gaming Terminal 10)

FIG. 10 is a block diagram illustrating an electric configuration of each of the gaming terminals 10. As illustrated in FIG. 10, the cabinet 11 includes a control unit having a terminal controller 630. The control unit includes a motherboard 40, a main body PCB (Printed Circuit Board) 60, a gaming board 50, a door PCB 80, various switches, sensors, or the like, as shown in FIG. 10.

The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 stores therein a game program and a game system program. The game program contains a stop symbol determining program. The stop symbol determining program determines symbols (code number corresponding to the symbol) to be stopped in the display windows 150. This stop symbol determining program contains sets of symbol weighting data respectively corresponding to various payout ratios (e.g., 80%, 84%, 88%). Each set of the symbol weighting data indicates, for each of the video reels 151 to 155, a code number of each symbol and at least one random number allotted to the code number. The numerical value is a value within a predetermined range of 0 to 256 for example.

The payout ratio is determined based on payout ratio setting data output from the GAL 54. Based on a set of the symbol weighting data corresponding to the payout ratio determined, a symbol to be stopped is determined.

The memory card 53 stores therein various types of data for use in the game programs and the game system programs. For example, the memory card 53 stores a table listing combinations of a symbol 501 to be displayed on the video reels 151 to 155 and an associated range of random numbers. This data is transferred to the RAM 43 of the motherboard 40, at the time of running a game program.

The card slot 53S is structured so as to allow the memory card 53 to be attached/detached to/from the card slot 53S. This card slot 53S is connected to the motherboard 40 through an IDE bus. Thus, a type and contents of a game run at the gaming terminal 10 can be changed by detaching the memory card 53 from the card slot 53S, writing a different game program and a different game system program into the memory card 53, and inserting the memory card 53 back into the card slot 53S.

Each of the game programs includes a program related to the progress of the game and/or a program for causing a transition to a common game. Each of the game programs includes image data and audio data output during the game.

The GAL 54 has input ports and output ports. When the GAL 54 receives data via an input port, it outputs data corresponding to the input data from its output port. This data from the output port is the payout ratio setting data described above.

IC socket 54S is structured so as to allow the GAL 54 to be attached/detached to/from the IC socket 54S. The IC socket 54S is connected to the motherboard 40, via a PCI bus. Thus, the payout ratio setting data to be output from GAL 54 can be modified by: detaching the GAL 54 from the IC socket 54S, overwriting the program stored in the GAL 54, and attaching the GAL 54 back to the IC socket 54S.

The CPU 51, the ROM 55 and the boot ROM 52 connected through an internal bus are connected to the motherboard 40 through the PCI bus. The PCI bus communicates signals between the motherboard 40 and the gaming board 50 and supplies power from the motherboard 40 to the gaming board 50. The ROM 55 stores country identification information and an authentication program. The boot ROM 52 stores a preliminary authentication program and a program (boot code) for enabling the CPU 51 to run the preliminary authentication program.

The authentication program is a program (falsification check program) for authenticating the game program and the game system program. The authentication program is a program for confirming and verifying that the game program and the game system program are not falsified. In other words, the authentication program is described in accordance with a procedure for authenticating the game program and the game system program. The preliminary authentication program is a program for authenticating the authentication program. The preliminary authentication program is described in accordance with a procedure for verifying that the authentication program to be authenticated is not falsified. In short, the preliminary authentication program authenticates the authentication program.

The motherboard 40 is provided with a main CPU 41 (terminal controller 630), a ROM (Read Only Memory) 42, a RAM (Random Access Memory) 43, and a communication unit 44.

The main CPU 41 serves as a terminal controller 630 and has a function of controlling the entire gaming terminal 10. In particular, the main CPU 41 controls the following operations: an operation of outputting an instruction signal instructing variable-displaying of symbols 501 to the graphic board 68, which is performed in response to pressing of the spin button 23 after betting of credit; an operation of determining symbols 501 to be stopped after the variable-displaying of symbols 501; and an operation of stopping the symbols 501 thus determined in the video reels 151 to 155.

In other words, the main CPU 41 serves as an arrangement controller which arranges symbols to form a new symbol matrix through scrolling of symbols displayed on the terminal image display panel 16. This main CPU 41 therefore determines symbols to be arranged in a symbol matrix by selecting symbols to be arranged from various kinds of symbols. Then, the main CPU 41 executes arrangement control to stop scrolling the symbols to present the symbols thus determined.

The ROM 42 stores a program such as BIOS (Basic Input/Output System) run by the main CPU 41, and permanently-used data. When the BIOS is run by the main CPU 41, each of peripheral devices is initialized and the game program and the game system program stored in the memory card 53 are read out through the gaming board 50. The RAM 43 stores data or a program used for the main CPU 41 to perform a process.

The communication unit 44 is provided to communicate with a host computer or the like equipped in the gaming facility, through a communication line. The communication unit 44 is also for communicating with the center controller 200 through a hub 201 and a communication line. Further, a main body PCB (Printed Circuit Board) 60 and a door PCB 80 are connected to the motherboard 40, through USB (Universal Serial Bus). Further, the motherboard 40 is connected to a power supply unit 45. The power supply unit 45 supplies power to the motherboard 40 to boot the main CPU 41 thereof. Meanwhile, the power unit 45 supplies power to the gaming board 50 through the PCI bus to boot the CPU 51 thereof.

The main body PCB 60 and door PCB 80 are connected to various devices or units which generate signals to be input to the main CPU 41, and various devices or units whose operations are controlled by control signals from the main CPU 41. Based on a signal input to the main CPU 41, the main CPU 41 runs the game program and the game system program stored in the RAM 43, to perform a calculation process. Then, the CPU 41 stores the result of the arithmetic process in the RAM 43, or transmits a control signal to the various devices and units to control them based on the result.

The main body PCB 60 is connected with the lamp 30, a hopper 66, a coin detector 67, the graphic board 68, the speaker 29, the bill validator 22, the ticket printer 35, the card reader 36, a key switch 38S, and the data displayer 37.

The lamp 30 is turned on/off on the basis of a control signal from the main CPU 41.

The hopper 66 is mounted in the cabinet 11 and pays out a predetermined number of coins from a coin outlet 19 to the coin tray 18, based on a control signal from the main CPU 41. The coin detector 67 is provided inside the coin outlet 19, and outputs a signal to be input to the main CPU 41 upon sensing that a predetermined number of coins have been delivered from the coin outlet 19.

The graphic board 68 controls image displaying of the terminal image display panel 16, based on a control signal from the main CPU 41. Further, the graphic board 68 is provided with a VDP (Video Display Processor) for generating image data on the basis of a control signal from the main CPU 41, a video RAM for temporarily storing the image data generated by the VDP, or the like. Note that image data used at the time of generating the image data by the VDP is in a game program which is read out from the memory card 53 and stored in the RAM 43.

The bill validator 22 reads an image on a bill and takes only those recognized as genuine into the cabinet 11. When taking in a genuine bill, the bill validator 22 outputs an input signal indicating the value of the bill to the main CPU 41. The main CPU 41 stores into the RAM 43 a credit amount corresponding to the value of the bill indicated by the signal.

Based on a control signal from the main CPU 41, the ticket printer 35 prints on a ticket a barcode and outputs the ticket as a barcoded ticket 39. The barcode is encoded data containing the credit amount stored in the RAM 43, date and time, and the identification number of the gaming terminal 10.

The card reader 36 reads out data from the smart card and transmits the data to the main CPU 41. Further, the card reader 36 writes data into the smart card based on the control signal output from the main CPU 41. The key switch 38S is mounted to the keypad 38, and outputs a signal to the main CPU 41 in response to an operation of the keypad 38 by the player. The data displayer 37 displays, based on a control signal from the main CPU 41, the data read by the card reader 36 or the data input by the player through the keypad 38.

The door PCB 80 is connected to the control panel 20, a reverter 21S, a coin counter 21C, and a cold cathode tube 81. The control panel 20 is provided with: a spin switch 23S associated with the spin button 23; a change switch 24S associated with the change button 24; a cashout switch 25S associated with the cashout button 25; a 1-bet switch 26S associated with the 1-bet button 26; and maximum bet switch 27S associated with the maximum bet button 27. Each of the switches 23S to 27S outputs an input signal to the main CPU 41 when corresponding one of the buttons 23 to 27 is operated by a player.

The coin counter 21C is provided within the coin receiving slot 21, and identifies whether the coin inserted into the coin receiving slot 21 by the player is genuine. A coin except the genuine coin is discharged from the coin outlet 19. In addition, the coin counter 21C outputs an input signal to the main CPU 41 upon detection of a genuine coin.

The reverter 21S operates based on a control signal from the main CPU 41, and delivers coins that are recognized as genuine by the coin counter 21C into a not-shown cash box or hopper 66 in the gaming terminal 10. In other words, when the hopper 66 is full of the coins, the genuine coin is distributed into the cash box by the reverter 21S. On the other hand, when the hopper 66 is not yet full of the coins, the genuine coin is distributed into the hopper 66. The cold cathode tube 81 functions as a backlight mounted to rear sides of the terminal image display panel 16 and the upper image display panel 33. This cold cathode tube 81 turns on according to a control signal from the main CPU 41.

In addition to the above, the main Body PCB 60 is connected to a motor drive control circuit 6035. The motor drive control circuit 6035 controls the rotation of the vibration motor 6032 and the rotation motor 6033. The main Body PCB 60 is connected to the LED 6034. The main Body PCB 60 controls light emission from the LED 6034. Furthermore, the main Body PCB 60 is connected to the magnetic force detecting mechanism 6202. This magnetic force detecting mechanism 6202 detects, as described above, a magnetic force indicating a position of the lever body 6031 of the control lever 603 and sends a magnetic force signal to the main Body PCB 60.

(Electric Configuration of Center Controller 200)

FIG. 11 is a block diagram illustrating an electric configuration of the center controller 200. The center controller 200 is provided therein with a control unit. As illustrated in FIG. 11, the control unit includes a motherboard 240, a gaming board 260, an actuator, or the like.

The gaming board 260 has the same structure as that of the gaming board 50. The motherboard 240 has the same structure as that of the motherboard 40. The communication unit 244 communicates with the terminal controller 630 through a communication line.

The graphic board 268 has the same structure as that of the graphic board 68, except in that the graphic board 268 controls displaying of the upper display 700*a* based on a control signal from the main CPU 241. In other words, the graphic board 268 functions as the display controller 701*a*. Furthermore, the graphic board 268 outputs a control signal to the graphic boards 269 and 270 controlling the upper displays 700*b* and 700*c*, via the communication unit 224, the hub 201, and the communication line. In other words, the graphic boards 269 and 270 function as the display controllers 701*b* and 701*c*.

(Basic Game)

Now, the basic game independently run by the gaming terminal 10 will be described. In the present embodiment, the basic game is constituted by a base game and a bonus game.

(Symbols, Combinations, and the Like)

Figure 12:
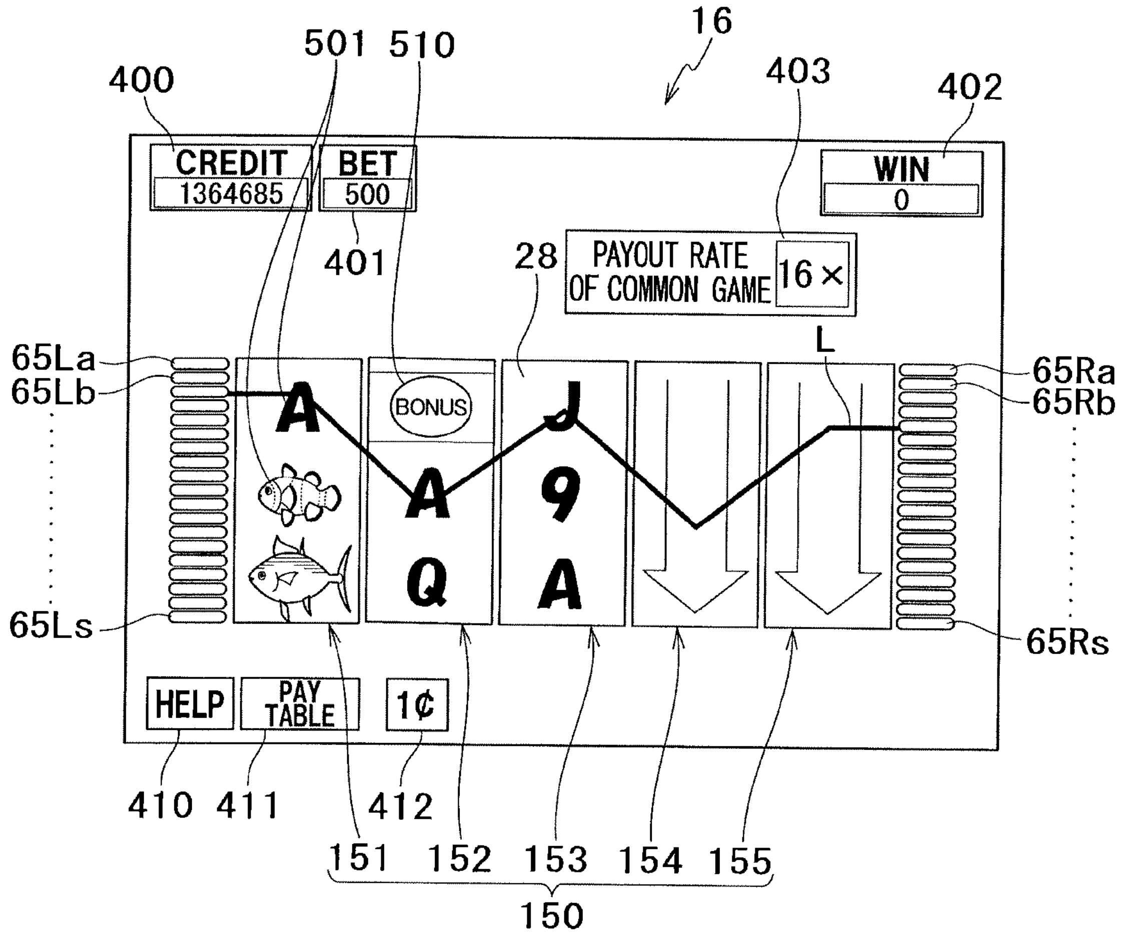
FIG. 12 shows an example of a display screen of a base game.

The symbols 501, which are displayed on video reels 151 to 155 of the terminal image display panel 16 on which a basic game is displayed, form a symbol column. As shown in FIG. 12, the terminal image display panel 16 displays a display window 150 which is constituted by video reels 151 to 155. The display window 150 is constituted by 15 display blocks 28 of 5 columns and 3 rows. Each of the video reels 151 to 155 is therefore constituted by three display blocks 28. Each of the video reels 151 to 155 rearranges the symbols 501 in such a way that three display blocks 28 are moved (scrolled) downward while changing the speed and the vertically moved symbols 501 are then stopped.

At the left and right edges of the display window 150, payline occurrence columns are provided in a symmetrical manner on the left and right. The left payline occurrence column on the left side when viewed from the player has, as shown in FIG. 12, 19 payline occurrence parts 65L (65La, 65Lb, 65Lc, 65Ld, 65Le, 65Lf, 65Lg, 65Lh, 65Li, 65Lj, 65Lk, 65Ll, 65Lm, 65Ln, 65Lo, 65Lp, 65Lq, 65Lr, and 65Ls).

The right payline occurrence column on the right side when viewed from the player has 19 payline occurrence parts 65R (65Ra, 65Rb, 65Rc, 65Rd, 65Re, 65Rf, 65Rg, 65Rh, 65Ri, 65Rj, 65Rk, 65Rl, 65Rm, 65Rn, 65Ro, 65Rp, 65Rq, 65Rr, and 65Rs).

The left payline occurrence parts 65L form pairs with the respective right payline occurrence parts 65R. From the left payline occurrence parts 65L to the right payline occurrence parts paired with the left payline occurrence parts 65L, paylines L are defined in advance. Note that, although FIG. 12 only shows one payline L for the sake of simplicity, there are ten paylines L in the present embodiment.

A payline L is activated when left and right payline occurrence parts 65L and 65R are connected with each other. In other cases, the paylines are inactive. The number of activated paylines L is determined based on a bet amount. When the bet amount is maximum, i.e., MAXBET, the maximum number of, i.e. 10 paylines are activated. An activated payline L allows the symbols 501 to establish various types of winning combinations. Details of the winning combinations will be described later.

The present embodiment presupposes that the gaming terminal 10 is a so-called video slot machine. The gaming terminal 10 of the present invention, however, may use so-called mechanical reels as some of the video reels 151 to 155.

As shown in FIG. 13, one of code numbers 0 to 19 or more is assigned to each of the symbols 501 constituting each symbol column. Each symbol column is a combination of symbols 501 which are "specific symbol 510", "A", "Q", "J", "K", "Angelfish", "Clownfish", "Tuna", and "Coelacanth".

Three successive symbols 501 in each of the symbol columns are, as shown in FIG. 12, respectively displayed (arranged) on an upper stage, a central stage, and a lower stage of each of the display region of each of the video reels 151 to 155, to form a symbol matrix of five columns and three rows on the display windows 150. When at least the start button 23 is pressed or the control lever 603 is pressed or moved to start a game, the symbols 501 forming a symbol matrix start scrolling. This scrolling of the symbols 501 stops (rearrangement) after a predetermined period elapses from the beginning of the scrolling (rearrangement).

Various kinds of winning combinations are set in advance for each symbol 501. The term "winning combination" indicates that a winning is established. A winning combination is a combination of stopped symbols 501 on the payline L which puts the player in an advantageous state. Examples of an advantageous state include: a state where coins according to a winning combination is paid out, a state where the number of coins to be paid out is added to a credit, a state where a bonus game is started.

A winning combinations in the present embodiment is established when a predetermined number or more of the symbols 501 of at least one type, namely "A", "Q", "K", "BAT", "Angelfish", "Clownfish", "Tuna", or "Coelacanth", are rearranged on an activated payline L. When a predetermined type of symbols 501 is set as scatter symbols, a winning combination is established when a predetermined number or more of scattered symbols are rearranged, no matter whether a payline L is active.

For example, in a base game, when "BAT" symbols 501 forms a winning combination on a payline L, coins (values) calculated by multiplying the basic payout amount of "BAT" by the bet amount.

(Symbol Table)

FIG. 13 shows a symbol table which is used for determining which symbols 501 are targets of rearrangement in a base game. In the symbol table, symbols 501 on the display blocks 28 in each symbol column are associated with code numbers, and 20 numerical ranges defined by dividing a numerical range of 0 to 65535 by 20 are associated with the respective code numbers.

The numerical range of 0 to 65535 may be equally or unequally divided. When unequally divided, it is possible to adjust the probabilities of wining for the respective types of the symbols 501 by determining the ranges of the random numbers. In this regard, the range corresponding to the specific symbol 510 may be arranged to be narrower than the ranges of the other types of the symbols 501. In this case, results of games can be easily adjusted in accordance of the progress of the games, by arranging valuable types of the symbols 501 to be less likely to be won.

For example, when a random number randomly selected for the first column is "10000", the symbol "J" having the code number 3 associated with the random number range including the selected random number is chosen as the target of rearrangement on the video reel 151 of the first column. On the other hand, when, for example, a random number for the fourth column is "40000", the specific symbol 510 having the code number 12 associated with the random number range including the selected random number is chosen as the target of rearrangement on the video reel 151 of the fourth column.

(Basic Game: Base Game Screen)

FIG. 12 shows an example of a base game screen which is a display screen in case of base game on the terminal image display panel 16.

More specifically, the base game screen has a display window 150 which is provided at the central portion and has 5 columns of video reels 151 to 155 and payline occurrence parts 65L and 65R which is symmetrically provided to the left and right of the display window 150. On the base game screen shown in FIG. 12, the video reels 151, 152, and 153 of the first to third columns are stopped whereas the video reels 154 and 155 of the fourth and fifth columns are scrolling.

At the upper parts of the terminal image display panel 16, a credit amount display unit 400 and a bet amount display unit 401 are provided on the left whereas a payout display unit 402 is provided on the right.

The credit amount display unit 400 displays credit amounts. The bet amount display unit 401 displays a bet amount on the currently-running unit game. The payout display unit 402 display the number of coins to be paid out when a winning combination is established.

In the meanwhile, below the display window 150, a help button 410, a pay-table button 411, and a unit-of-betting display unit 412 are provided. These sections 410, 411, and 412 are provided in this order from left to right for the player.

The help button 410 is pushed by the player so that a help mode is executed. The help mode is a mode for providing information to solve player's questions concerning games. The pay-table button 411 is pushed by the player so that a payout display mode for displaying the details of a payout is executed. The payout display mode is a mode for displaying an explanation screen explaining a relation between a winning combination and a payout rate for the player.

The unit-of-betting display unit 412 displays a current bet unit (payout unit). The unit-of-betting display unit 412 therefore allows the player to recognize that, for example, the unit of betting is one cent.

Above the display window 150 is provided a payout rate display unit 403. The payout rate display unit 403 is displayed when the player is qualified to participate in a common game, and is not displayed when the player is not qualified. That is to say, when a common game starts, the player can participate in the common game if the payout rate display unit 403 is displayed. T payout rate display unit 403 displays a payout rate by which a unit payout amount obtained in a common game is multiplied.

Now, the payout rate indicating that the player is qualified will be described. A qualification is awarded to a gaming terminal 10 as a time during which the player is allowed to participate in a common game (i.e., common game qualification time), in response to betting on a base game. Regarding the awarded common game qualification time, a payout rate corresponding to each unit time (1 second in the present embodiment) is determined in advance in the base game qualification time awarding table.

(Base Game Qualification Time Awarding Table)

FIG. 14 shows a base game qualification time awarding table which is referred to when a common game qualification time is awarded in a base game. The base game qualification time awarding table is stored in the RAM 243 of the center controller 200. In the base game qualification time awarding table, common game qualification times awarded in a base game and payout rates are determined for each of the number of paylines L activated in accordance with a bet amount.

For example, when the number of activated paylines L corresponding to the betting on a base game is one, six seconds are awarded as the common game qualification time. The payout rate is therefore one for six seconds of the common game qualification time. When the number of activated paylines L corresponding to the betting on a base game is five, eight seconds are awarded as the common game qualification time. The payout rate is one for one second, two for one second, three for one second, and four for one second of the common game qualification time, and is five for four seconds of the common game qualification time. As such, the number of activated paylines increases as the bet amount increases in a base game, and an awarded common game qualification time and a payout rate also increase. It is noted that the maximum payout rate in the present embodiment is ten.

(Common Game Qualification Time Management Table)

The common game qualification times of the respective gaming terminals 10 are managed by a common game qualification time management table which is temporarily stored in the RAM 243. FIG. 15 shows a common game qualification time management table which is updated when a common game qualification time is awarded. In the common game qualification time management table, an awarded common game qualification time and a payout rate are accumulatively stored for each gaming terminal 10.

For example, the common game qualification time of the gaming terminal 10*a* is six seconds for the payout rate of one, 12 seconds for the payout rate of two, 18 seconds for the payout rate of three, and six seconds for the payout rate of four. When the gaming terminal 10*a* with this arrangement participates in a common game and a unit payout amount is awarded, the payout is calculated by multiplying the unit payout amount by the highest payout rate, i.e. four. The payout rate display unit 403 of the gaming terminal 10*a* therefore displays “4×” which indicates that the payout rate is four.

It is noted that, from the common game qualification time corresponding to the highest payout rate, a unit time is subtracted each time a predetermined time (one second in the present embodiment) elapses. Therefore, when no common game qualification time is awarded to the gaming terminal 10*a* within the first six seconds corresponding to the payout rate of four, the maximum payout rate becomes three.

(Maximum Qualification Time Table)

In addition to the above, the upper limit of the common game qualification times that the gaming terminal 10 can accumulatively store is defined in the maximum qualification time table in advance. The maximum qualification time table is stored in the RAM 243 of the center controller 200. As shown in FIG. 16, in the maximum qualification time table, a payout rate N is associated with the upper limit $X_N$ of the accumulation of the common game qualification times of the payout rate N or higher.

More specifically, the upper limit of the accumulation is set for the payout rate of one. In other words, the total sum of the common game qualification times is set to be 45 seconds or shorter. The upper limit is not limited to this. For example, the upper limit may be 60 seconds.

(Accumulation Calculation Table)

When a common game qualification time is awarded, with reference to the above-described maximum qualification time table, a calculation for updating the common game qualification time management table is carried out by using the accumulation calculation table. The accumulation calculation table is stored in the RAM 243 of the center controller 200. As shown in FIG. 17, the accumulation calculation table stores the following matters for each payout rate. That is to say, "before-awarded common game qualification time" of the common game qualification time management table, "to-be-awarded common game qualification time" of the base game qualification time awarding table in accordance with an activated payline, "awarded common game qualification time" calculated by adding the before-awarded common game qualification time to the to-be-awarded common game qualification time, "accumulation $Y_N$ of awarded common game qualification time" of a payout rate of N or higher, "accumulation upper limit $X_N$ of qualification times" of payout rate of N or higher set in the maximum qualification time table, "calculated accumulation $Y_N$", and new "common game qualification time $Z_N$" updating the common game qualification time management table.

For example, when a bet is made so that the before-awarded common game qualification time is 0 second for the payout rate of five or more, six seconds for the payout rate of four, 18 seconds for the payout rate of three, 12 seconds for the payout rate of two, and six seconds for the payout rate of one, and the number of paylines L is three, in the common game qualification time one second is added to the time for the payout rate of four, 18 seconds are added to three, 12 seconds are added for two, and six seconds are added for one. In this case, the awarded common game qualification time is arranged so that seven seconds for the payout rate of four, 21 seconds for three, 14 seconds for two, and seven seconds for one. As a result, the accumulation $Y_N$ of the qualification times of N or higher is arranged so that seven seconds for the payout rate of four or higher, 21 seconds for three or higher, 42 seconds for two or higher, and 49 seconds for one or higher.

However, the maximum qualification time table defines the upper limits to be 42 seconds for the payout rate of four or higher, 43 seconds for three or higher, 44 seconds for two or higher, and 45 seconds for one or higher, and hence "49 seconds" which are for the payout rate of one or higher exceed the upper limit $X_N$. For this reason, the upper limit, i.e. 45 seconds are chosen as accumulated time for one or higher, and the difference, i.e. four seconds, is added to the accumulated time for two. As a result, the accumulated time for two becomes 46 seconds, the upper limit, i.e. 44 seconds are chosen as accumulated time for two and the difference, i.e. two seconds, is added to the accumulated time for three. As a result, the accumulated time for three becomes 30 seconds. This time is shorter than the upper limit for three, i.e. 43 seconds, and hence the accumulated time for three is determined to be 30 seconds. Furthermore, the accumulated time for four is seven seconds. Since this is shorter than the upper limit for four, i.e. 42 seconds, the accumulated time for four is determined to be seven seconds. In summary, when $Y_N$ is higher than $X_N$, calculations of $Y_N=X_N$ and $Y_{N+1}=Y_{N+1}+Y_N-X_N$ are repeated from the lowest payout rate.

Then the common game qualification time $Z_N$ is calculated from $Y_N-Y_{N+1}$, and the common game qualification time management table is updated with the result of this calculation.

With such accumulation calculations, it is possible to keep the accumulation of the multiplication of the common game qualification time by the payout rate is unchanged before and after the accumulation calculations.

(Basic Game: Bonus Game Screen)

Figure 18:
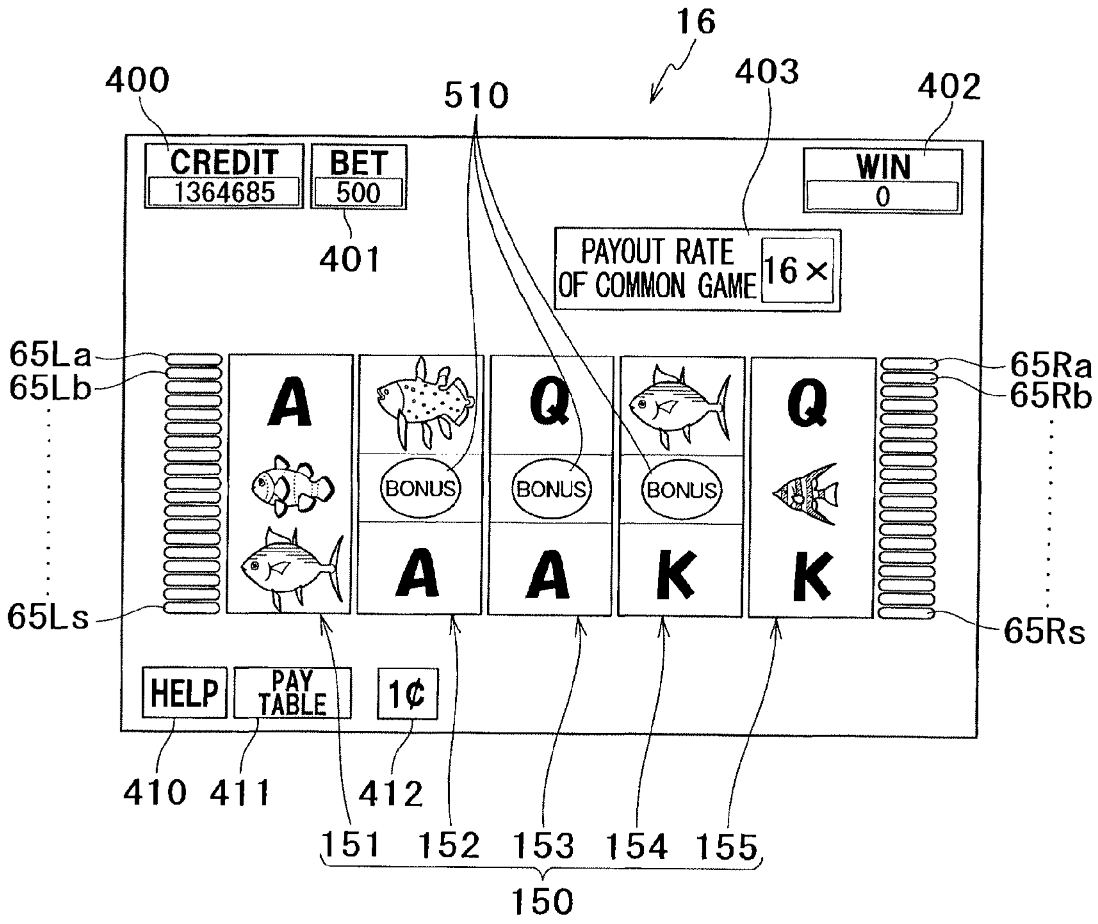
FIG. 18 illustrates an example of a display screen of a base game.

FIG. 18 shows an example of a base game screen on the terminal image display panel 16, when the start of an independent special game which is a bonus game is determined. In the base game screen shown in FIG. 18, all of the video reels 151 to 155 in the first to fifth columns are stopped, and three symbols 501 of "specific symbol 510" are stopped at the central stages of the video reels 152 to 154 of the second to fourth columns. This triggers the start of an independent special game which is independently run by the gaming terminal 10. The stop mode of the specific symbols 510 triggering an independent special game is not limited to this. The trigger may be a predetermined number or more of "specific symbols 510" on one of the paylines L. Furthermore, the "specific symbols 510" may not be stopped on a payline. For example, a game may be triggered on condition that a predetermined number or more of specific symbols 510 are provided on any display blocks 28, based on the scatter symbol method.

Figure 19:
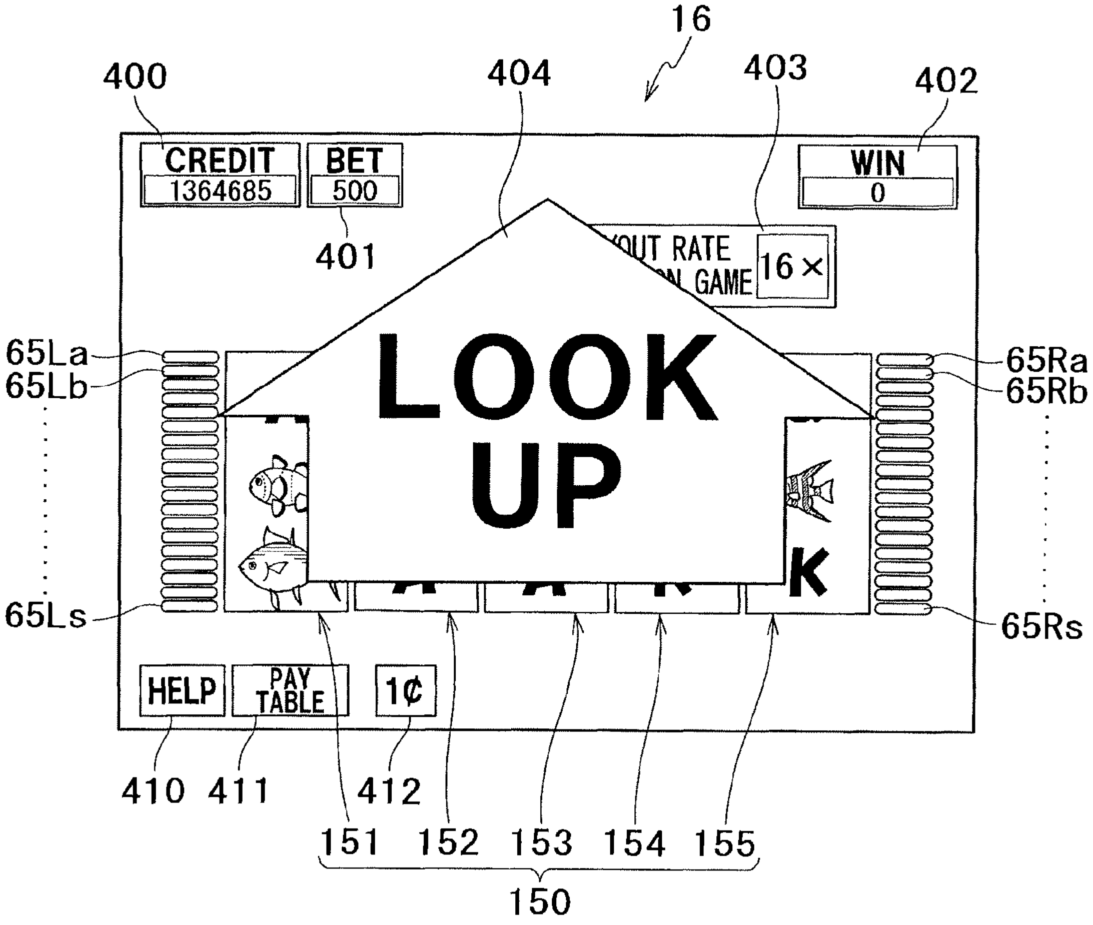
FIG. 19 illustrates a display state of a terminal image display panel and an upper display.

FIG. 19 illustrates the display states on the terminal image display panel 16 and the upper display 700 during the independent special game. During the independent special game, the terminal image display panel 16 displays a lookup display unit 404. As shown in FIG. 19, the lookup display unit 404 is displayed at the central part of the terminal image display panel 16, notifying the player that the terminal image display panel 16 is not used in the independent special game and the player is instructed to see the upper display 700.

In the present embodiment, the common game qualification time is awarded as soon as the independent special game is started. The common game qualification time awarded at the start of the independent special game is different from those defined in the base game qualification time awarding table (FIG. 14), the table used in this case is an independent special game qualification time awarding table shown in FIG. 20. According to the independent special game qualification time awarding table, the awarded common game qualification time is shortened but the payout rate is increased, as the number of activated paylines L is increased.

Figure 21:
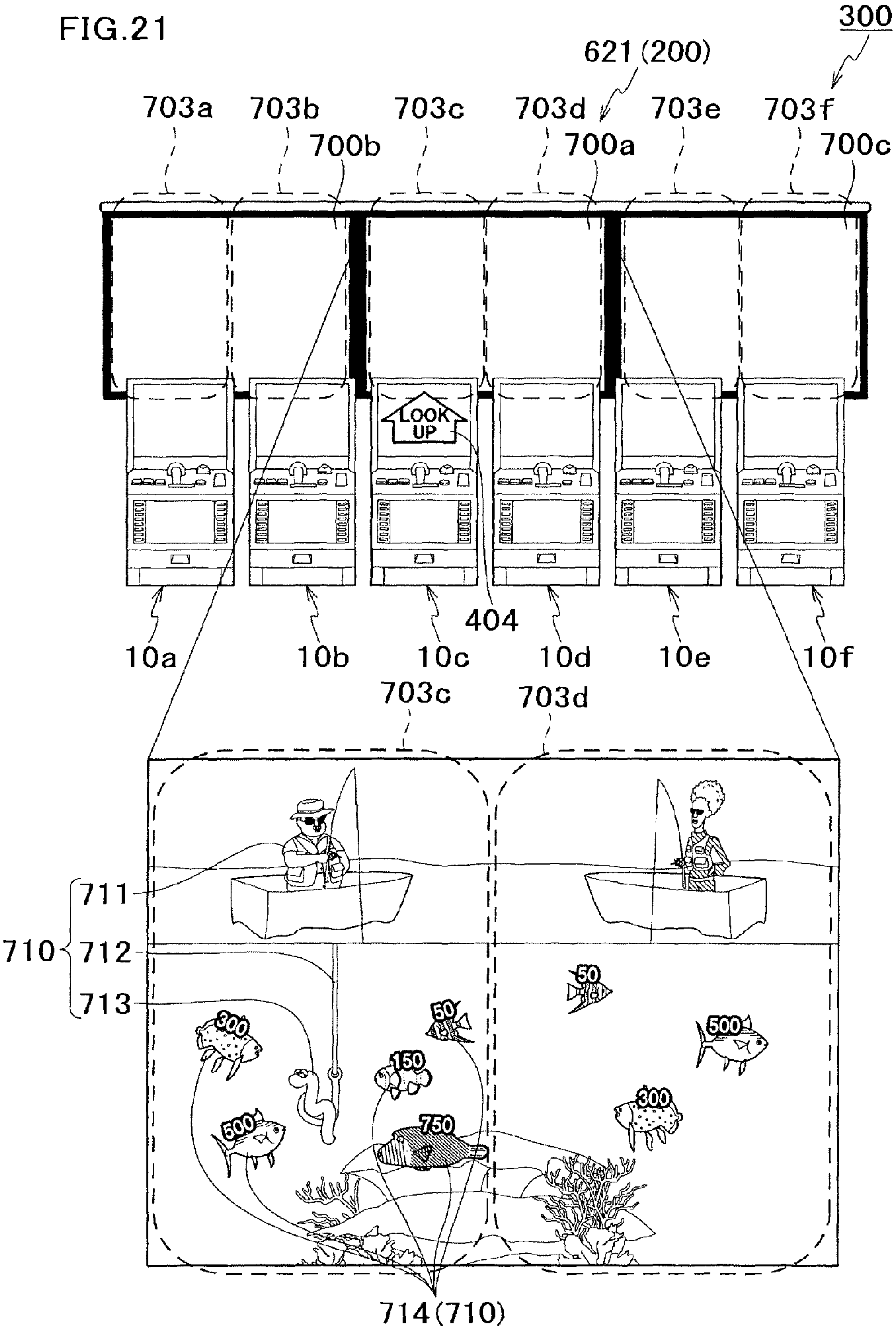
FIG. 21 illustrates a display state on the upper display during an independent special game.

FIG. 21 illustrates the display states on the upper display 700 during the independent special game. The upper display 700 constituted by three upper displays 700*a*, 700*b*, and 700*c* is arranged to display a single common effect display screen. The common effect display screen is constituted by gaming terminal area 703*a* to 703*f* corresponding to the six gaming terminals 10*a* to 10*f*, respectively.

In FIG. 21, the gaming terminal 10*c* is running an independent special game, and the terminal image display panel 16 of the gaming terminal 10*c* is displaying the lookup display unit 404. In the independent special game, the gaming terminal area 703*c* corresponding to the gaming terminal 10*c* displays an individual image 710 for the independent special game.

More specifically, the individual image 710 includes a fisherman image 711, a fishhook image 712, a fishing bait image 713, and a fish image 714. The fisherman image 711 is displayed at an upper part of each of the gaming terminal areas 702*a* to 700*f*. The fisherman image 711 is different in each gaming terminal 10, to make it possible to understand how the gaming terminals 10 correspond to the respective gaming terminal areas 703*a* to 703 on the common effect display screen.

The fishhook image 712 is displayed substantially at the center of each of the gaming terminal areas 703*a* to 703*f* running an independent special game. The fishhook image 712 is displayed with a display pattern in accordance with the changes in the lever body 6031 of the control lever 603.

The fishing bait image 713 is displayed at the lower end portion of the fishhook image 712. The fishing bait image 713 is enlarged when a bonus corresponding to a predetermined unit payout amount (3000 in the present embodiment) or higher is won in an independent special game.

The fish image 714 corresponds to a bonus awarded in a bonus game. The fish image 714 indicates, by the size of the fish, a unit payout amount in a bonus game, and also the unit payout amount is indicated by a number. In the gaming terminal area 703 in which an independent special game is run, a plurality of fish images 714 are displayed and these fish images 714 approach the fishing bait image 713 or swim beside the fishing bait image 713.

(Bonus Type Table)

Now, referring to a bonus type table shown in FIG. 22, bonuses corresponding to fish images 714 will be described. The bonus type table stores bonus types, unit payout amounts, and ranks in association with one another. It is noted that the bonus type table is stored in both the RAM 43 of the gaming terminal 10 and the RAM 243 of the center controller 200.

For example, "Blue Marlin" corresponds to the unit payout amount of 10000 and is ranked at number one. Therefore, when the Blue Marlin is displayed on the gaming terminal area 703 as a fish image 714, the number "10000" is displayed with the fish image. Furthermore, when the unit payout amount is not lower than the predetermined amount (3000), the fishing bait image 713 is enlarged when the Blue Marlin is won.

(Independent Special Game Probability Table)

The payout amount of the independent special game is determined based on an independent special game probability table shown in FIG. 23. Though not illustrated, plural types of independent special game probability tables are stored, and which table is used is determined based on the number of paylines L activated at the start of the independent special game. In the independent special game probability table, random number ranges defined by dividing the numerical range of 0 to 65535 are associated with winning bonus types. In the winning bonus type, at least one bonus is stored. For example, when a random number is 250, the winning bonus types to be awarded are Wahoo, Black Seabass, and Halibut.

Figure 24:
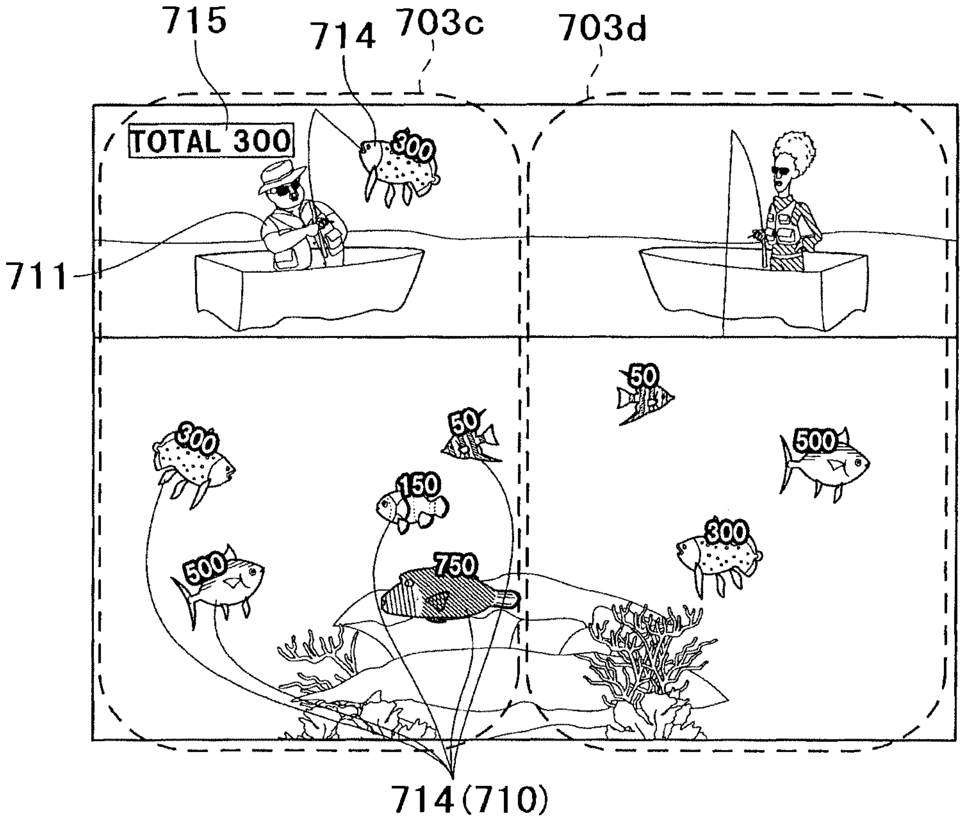
FIG. 24 shows an example of a display screen of an independent special game.

FIG. 24 shows an example of a winning screen displayed in an independent special game. On the winning screen, a display pattern in which a fisherman image 711 catches a fish image 714 is displayed. On the winning screen, moreover, a total display unit 715 is displayed at an upper part of the gaming terminal area 703. The total display unit 715 displays a total sum of bonuses having been won. The number displayed on the total display unit 715 in the end is the total amount of bonuses to be awarded. It is noted that the caught fish images 714 are displayed with sizes corresponding to the ranks defined in the bonus type table shown in FIG. 22. More specifically, a bonus type having a high rank is associated with a large unit payout amount, and the size of the caught fish image 714 is large.

In addition to the above, a mystery bonus is executed as a bonus game. The mystery bonus is not generated on condition that a predetermined number or more of specific symbols 510 are stopped as in the independent special game. The mystery bonus randomly starts when the specific symbol 510 is not stopped at the video reel 153 of the third column.

The random determination of the start of the mystery bonus is conducted based on a mystery bonus start random determination table shown in FIG. 25. In the mystery bonus start random determination table, random number ranges corresponding to "occurrence of mystery bonus", "effect only", and "non-occurrence of mystery bonus" are determined for each number of activated paylines L.

For example, when the number of paylines L is three and the determined random number is "2", an effect of mystery bonus is conducted and the mystery bonus is awarded as a payout. When the number of paylines L is three and the determined random number is "5", only an effect of mystery bonus is conducted. When the number of paylines L is three and the determined random number is "15", nothing is conducted and the base game is continued.

When the mystery bonus occurs, a bonus to be won is determined with reference to a mystery bonus probability table shown in FIG. 26. Though not illustrated, plural types of mystery bonus probability tables are stored, and the table to be used is determined in accordance with the number of paylines L activated when the mystery bonus starts. In the mystery bonus probability table, random number ranges defined by dividing a numerical range of 0 to 5000 are associated with winning bonus types. In the winning bonus type, one or more bonus is stored.

Figure 27:
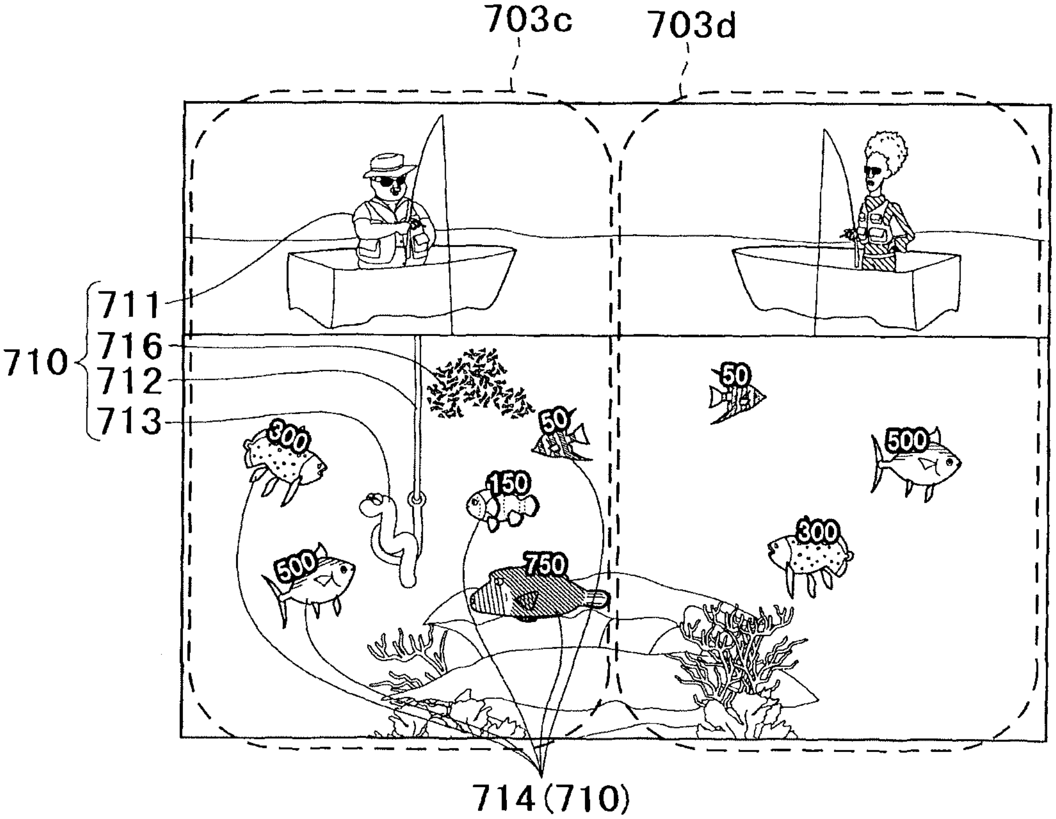
FIG. 27 shows an example of a display screen of a mystery bonus.

Whether the mystery bonus is started is determined with reference to the mystery bonus start random determination table and "occurrence" or "only effect" is selected, a mystery bonus effect screen shown in FIG. 27 is displayed. On the mystery bonus effect screen, a ground bait image 716 falling from an upper part to a lower part is displayed in the gaming terminal area 703 corresponding to the gaming terminal 10 which has been selected to display an effect screen. At the same time, in a similar manner as the independent special game, the terminal image display panel 16 displays a lookup display unit 404 shown in FIG. 19. Thereafter, if "occurrence" has been selected, a winning screen shown in FIG. 24 is displayed and the mystery bonus is finished.

Note that, when the condition to start a common game is established while the above-described independent special game and mystery bonus are being executed, the common game starts after the effect display, awarding of payout or the like of the independent special game and the mystery bonus are finished.

(Common Game)

Now, a common game run by a plurality of gaming terminals 10 in synchronization with one another will be described. In regard to a common game, random determination as to whether to start a common game is conducted at predetermined intervals (one second in the present embodiment), with reference to a common game start random determination table shown in FIG. 28.

(Common Game Start Random Determination Table)

As shown in FIG. 28, the common game start random determination table defines random number ranges corresponding to "occurrence of common game", "effect only", and "non-occurrence of common game", respectively. For example, when the determined random number is "1", a common game starts after an effect of the start of the common game. When the determined random number is "3", only the effect of the start of the common game is executed. When the determined random number is "15", nothing is carried out and the base game is continued.

When the common game starts, which one of common games is to be run is determined with reference to a common game type random determination table shown in FIG. 29. More specifically, one of the following common games is randomly selected: a first common game; a second common game; a third common game; first common game+third common game; and second common game+third common game.

(Common Game: Common Game Start Effect Image)

Figure 30:
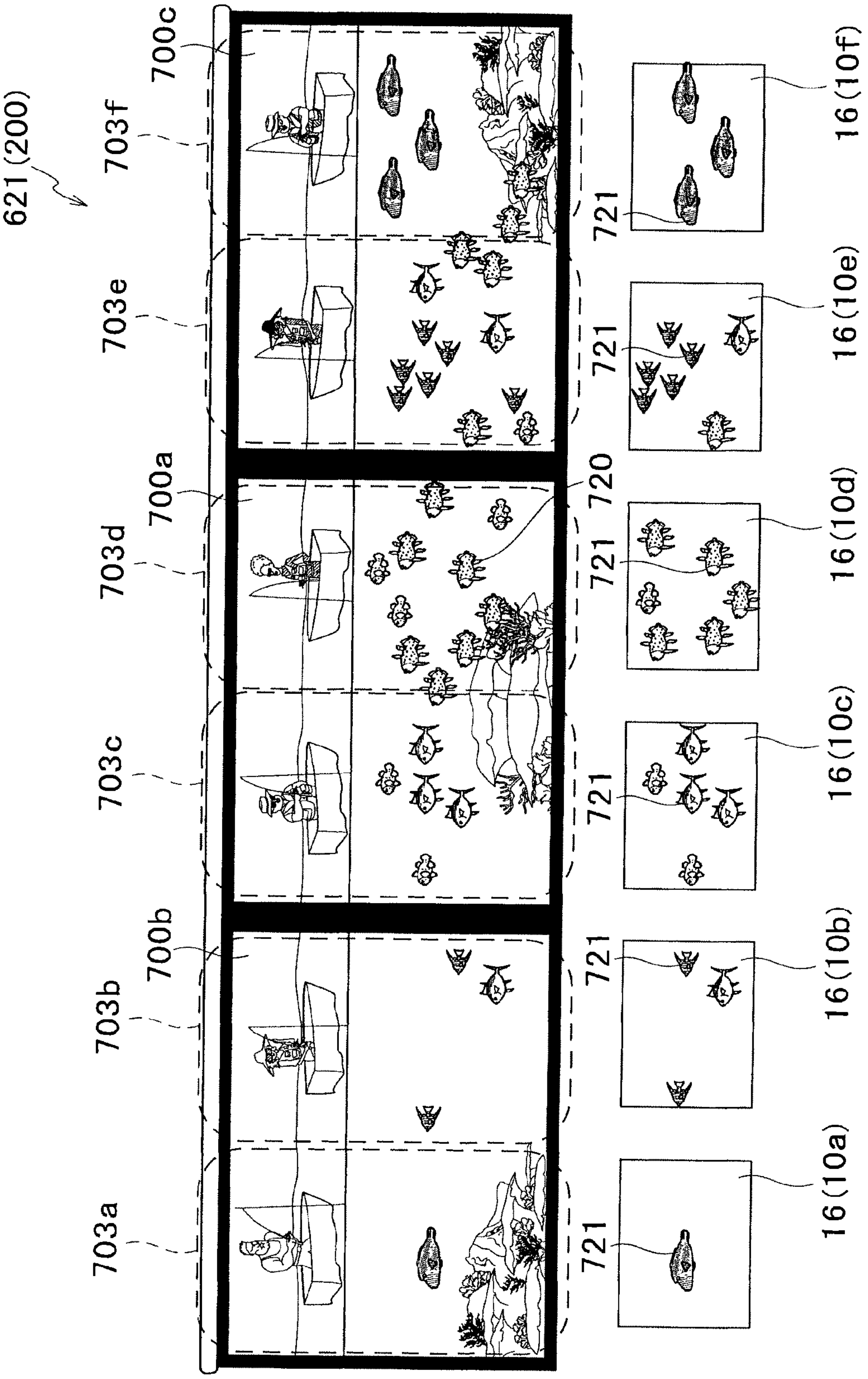
FIG. 30 illustrates an example of a common game start effect image.

After which one of the common games is to be run is determined, a common game start effect image corresponding to that common game is displayed. The common game start effect image is stored in the RAM 243 of the center controller 200. As shown in FIG. 30, the same common game start effect image is displayed on the upper display 700 and the terminal image display panel 16 of each of the six gaming terminals 10.

FIG. 30 shows the display states on the upper display 700 and the terminal image display panel 16 when the first common game starts. More specifically, the upper display 700 displays a game start effect image in which a fish school image 720 showing many fishes of plural types passing from left to right is displayed. On the upper display 700, furthermore, a fish school image 721 identical with those displayed on the respective gaming terminal areas 703*a* to 703*f* is displayed on the terminal image display panel 16 of each of the gaming terminals 10*a* to 10*f*.

For example, the game start effect image is divided to sets of data corresponding to the six gaming terminal areas 703, respectively. The center controller 200 distributes these sets of data to the respective gaming terminals 10, thereby allowing the upper display 700 and the terminal image display panels 16 to display the game start effect image in the same manner.

(Common Game: First Common Game Screen)

Figure 31:
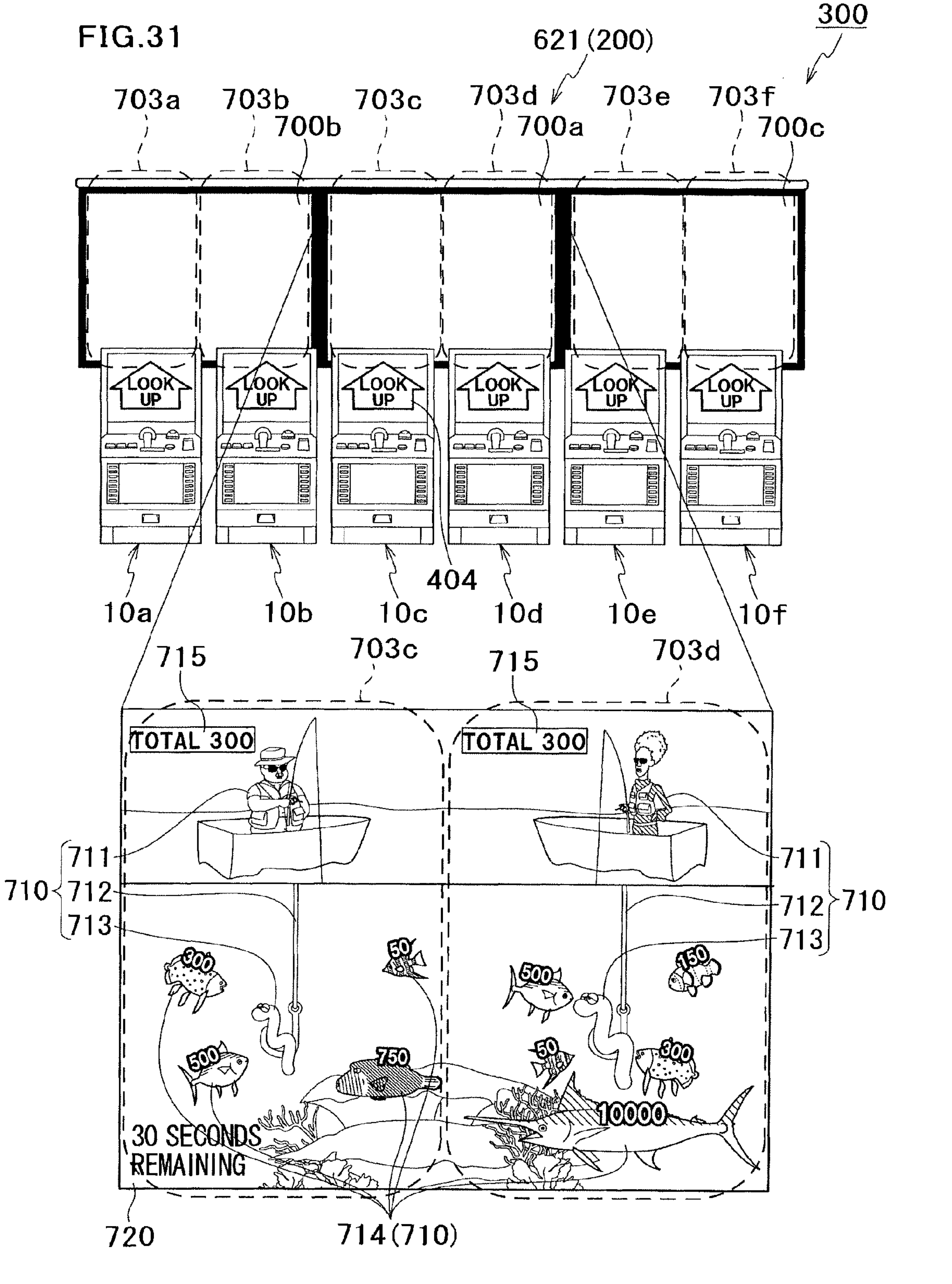
FIG. 31 shows an example of a display screen of a first common game.

Now, each common game will be described. FIG. 31 illustrates the display state on the upper display 700 during the first common game. The upper display 700 constituted by the three upper displays 700*a*, 700*b*, and 700*c* displays a single common effect display screen. The common effect display screen is constituted by gaming terminal areas 703*a* to 703*f* corresponding to the six gaming terminals 10*a*-10*f*, respectively.

In FIG. 31, all gaming terminals 10 are running the common game, and the terminal image display panels 16 of all gaming terminals 10 display the lookup display unit 404. In the first common game, the gaming terminal area 703 corresponding to each gaming terminal 10 participating in the first common game displays the lookup display unit 404 in a similar manner as the individual image 710 for the independent special game. More specifically, the gaming terminal area 703 corresponding to each gaming terminal 10 participating in the common game displays an individual image 710 including a fisherman image 711, a fishhook image 712, a fishing bait image 713, a fish image 714, and a total display unit 715.

The fishing bait image 713 is enlarged when a bonus corresponding to a predetermined unit payout amount (3000 in the present embodiment) or higher is won in an independent special game, as in the independent special game. For example, in FIG. 31, the bait image 713 in the gaming terminal area 703*d* is enlarged because the gaming terminal 10*d* has won a unit payout amount of 10000.

The first common game screen further displays a count display unit 720. This count display unit 720 displays a remaining time of the first common game. When the time indicated by the count display unit 720 reaches 0, a payout calculated by multiplying the payout amount shown in the total display unit 715 by the payout rate at the start of the first common game is awarded.

Figure 32:
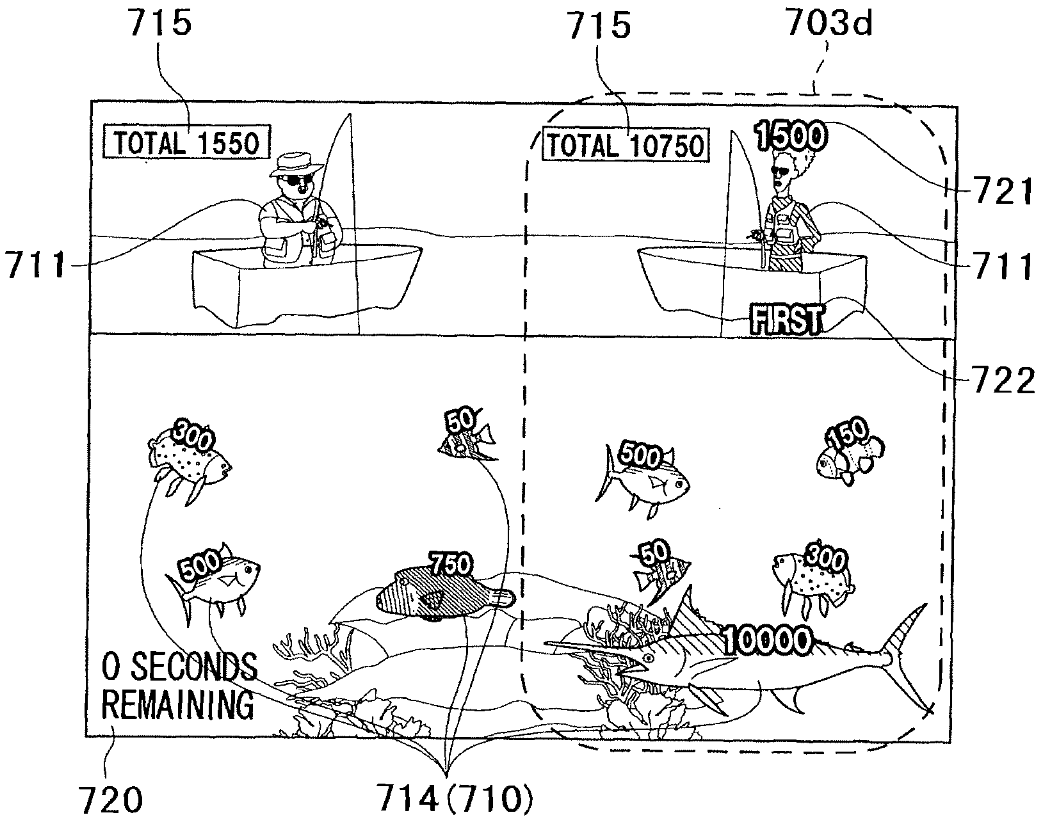
FIG. 32 shows an example of a display screen of a first common game.

When the time indicated by the count display unit 720 reaches 0, furthermore, the rank of the gaming terminal 10 is determined based on the sum total of the unit payout amounts of the awarded bonuses. The first to third ranks are determined in the present embodiment, and a payout corresponding to the rank is awarded to each of the first-ranked, second-ranked, and third-ranked gaming terminals 10. FIG. 32 displays a first common game ranking determination screen in which the gaming terminal 10*d* is ranked first as having the total unit payout amounts of 10750. In the first common game ranking determination screen, a ranking image 722 indicating the rank is displayed below the fisherman image 711, whereas a payout amount image 721 indicating the payout corresponding to the rank is displayed above the fisherman image 711.

(First Common Game Probability Table)

The determination of the payout amount of the first common game is carried out with reference to a first common game probability table shown in FIG. 33. Though not illustrated, a plurality of first common game probability tables are stored, and the number thereof is arranged to be identical with the number of gaming terminals 10. A different first common game probability table is associated with each gaming terminal 10. In the first common game probability table, random number ranges defined by dividing a numerical range of 0 to 65535 are associated with winning bonus types. A winning bonus type stores three or more bonuses. For example, when the determined random number is 30, the winning bonus types to be awarded are Yellow Fin Tuna, Wahoo, Halibut, and Halibut.

The winning screen of the first common game is identical with the winning screen displayed on the gaming terminal area 703*c* shown in FIG. 24 and is displayed on the gaming terminal area 703 corresponding to each gaming terminal 10 participating in the first common game. That is to say, when a random number selected from the first common game probability table shown in FIG. 32 is 30, winning screens of catching a Yellow Fin Tuna, a Wahoo, a Halibut, and a Halibut are serially displayed.

(Common Game: Second Common Game Screen)

Figure 34:
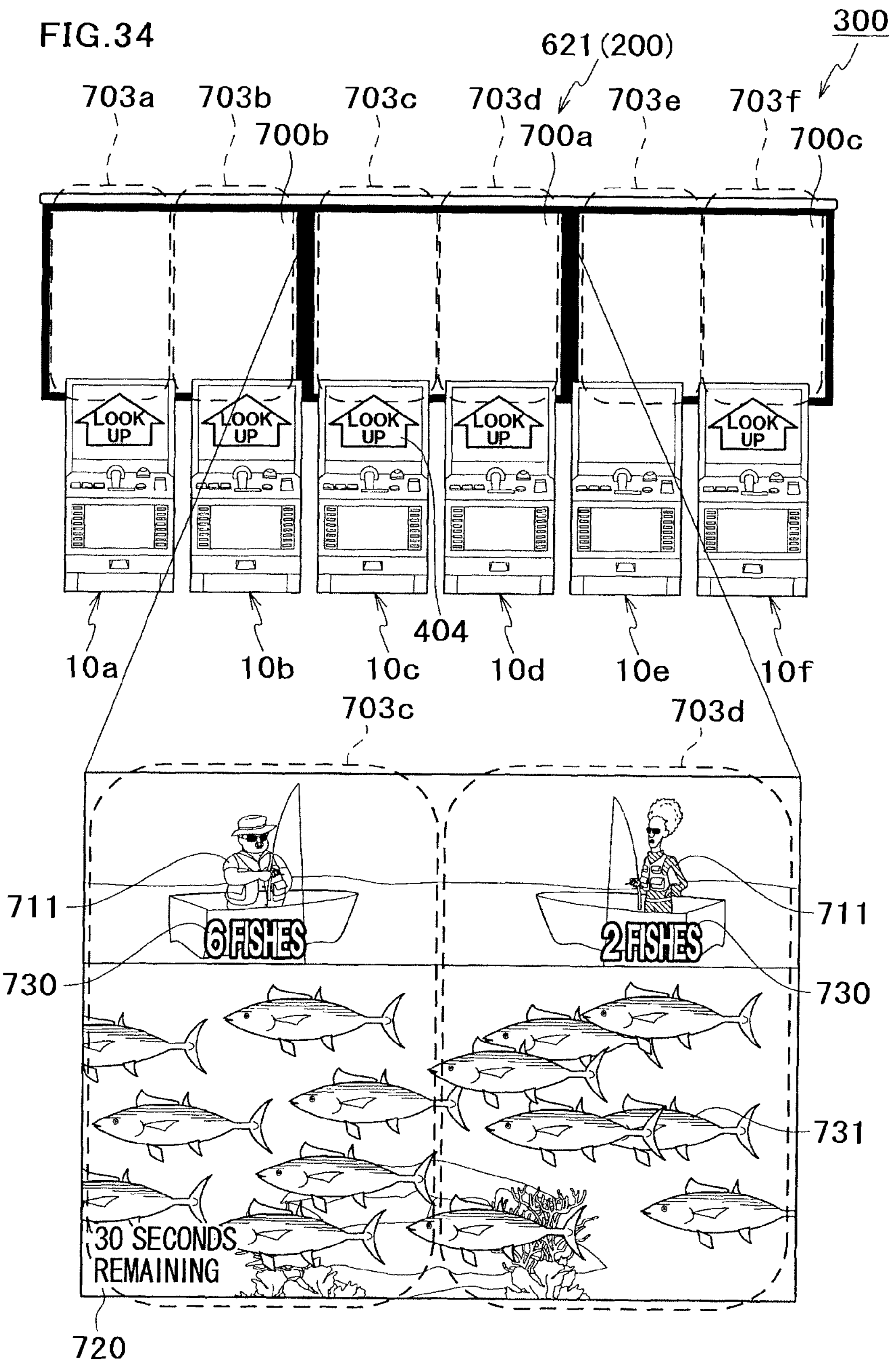
FIG. 34 shows an example of a display screen of a second common game.

FIG. 34 shows the display state on the upper display 700 during a second common game. In FIG. 34, the gaming terminals 10 except the gaming terminal 10*e* are running the common game, and the terminal image display panel 16 of the gaming terminals 10 except that of the gaming terminal 10*e* displays the lookup display unit 404. In the second common game, a fisherman image 711 and a count display unit 720 similar to those in the first common game are displayed, and also a fish school image 731 is displayed on the gaming terminal areas 702 corresponding to all gaming terminals 10.

Figure 35:
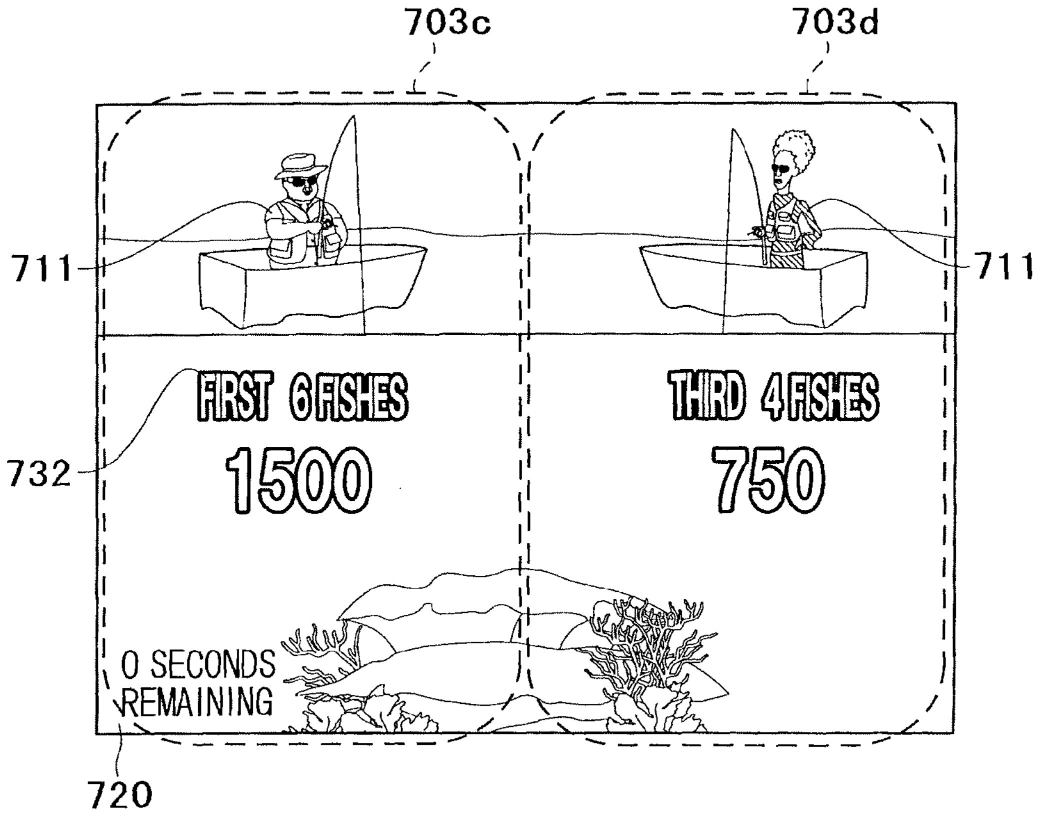
FIG. 35 shows an example of a display screen of a second common game.

When the time indicated by the count display unit 720 reaches 0, furthermore, the rank of the gaming terminal 10 is determined based on the sum total of the awarded winnings. In the second common game, the center controller 200 conducts winning determination with a predetermined winning probability for a predetermined number of times for each gaming terminal 10, and the number of these winnings is determined as the number of obtained winnings. In the present embodiment, terminals ranked first to third are determined. For the first-ranked to third-ranked gaming terminals 10, a payout is awarded according to the rank. FIG. 35 shows a second common game ranking determination screen. In the case of FIG. 35, the gaming terminal 10*c* is ranked first with six winnings in total. The gaming terminal 10*d* is ranked third with four winnings in total. On the second common game ranking determination screen, a ranking image 732 indicating the rank, the number of obtained winnings, and an obtained payout amount is displayed below the fisherman image 711.

(Common Game: Third Common Game Screen)

Figure 36:
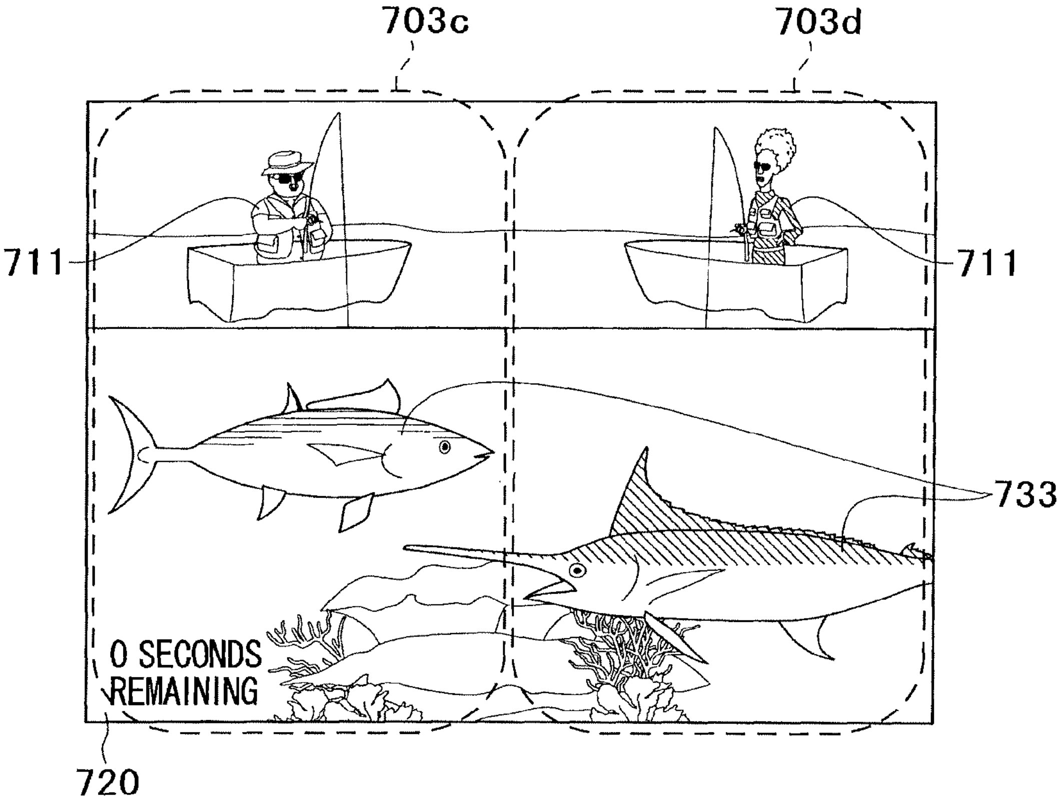
FIG. 36 shows an example of a display screen of a third common game.

When the third common game is run after the first common game or the second common game, a third common game start effect screen shown in FIG. 36 is displayed. As shown in FIG. 36, the third common game start effect screen displays a large fish image 733. Thereafter, the third common game starts.

Figure 37:
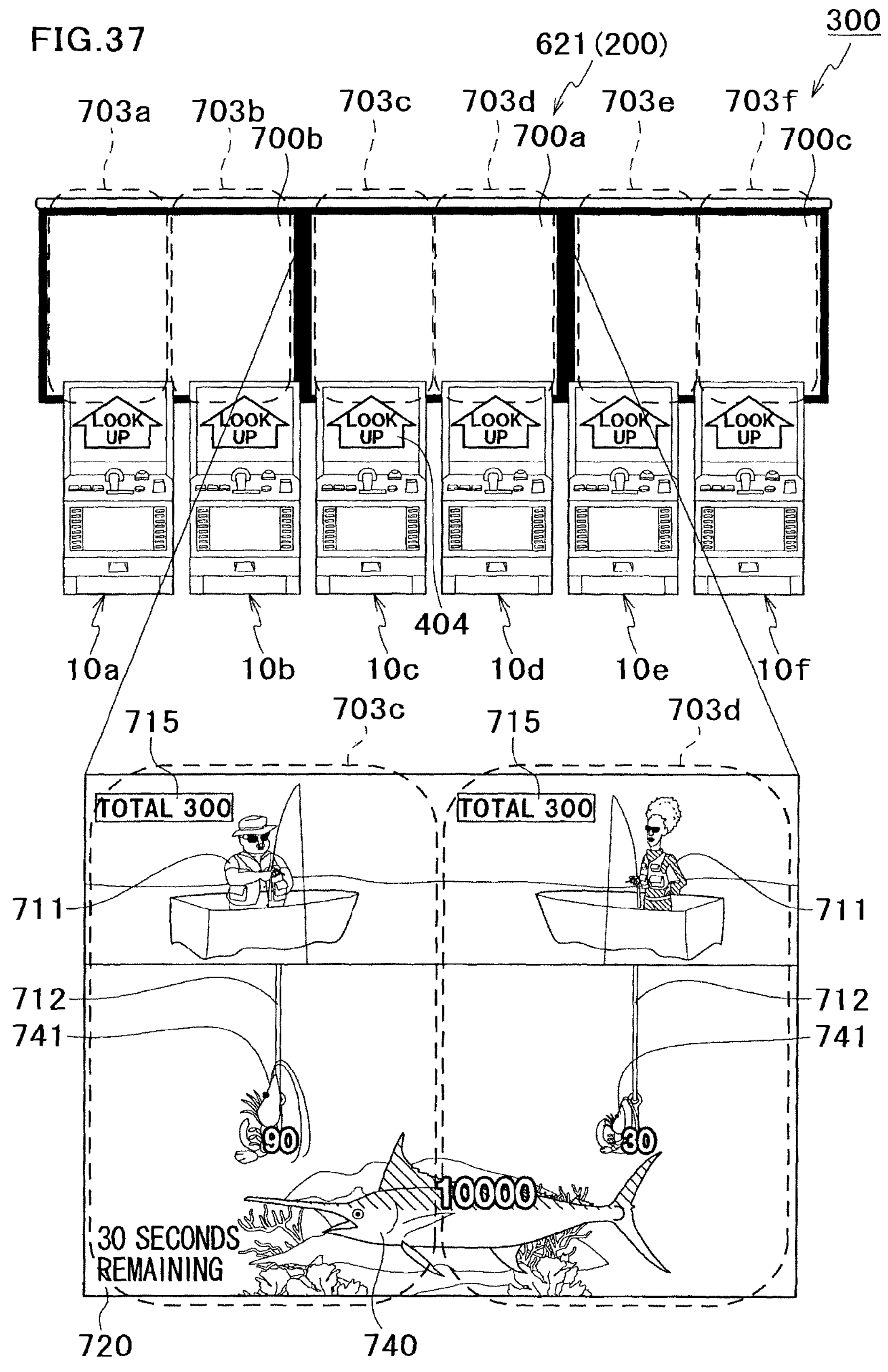
FIG. 37 shows an example of a display screen of a third common game.

FIG. 37 shows the display state on the upper display 700 during the third common game. In FIG. 37, all gaming terminals 10 are running the common game, and the terminal image display panels 16 of all gaming terminals 10 display the lookup display unit 404. In the third common game, the gaming terminal area 703 of each gaming terminal 10 participating in the third common game displays the lookup display unit 404 in the same manner as the individual image 710 for the independent special game. More specifically, gaming terminal area 703 corresponding to each gaming terminal 10 participating in the common game displays an individual image 710 including a fisherman image 711, a fishhook image 712, a large fish image 740, a prawn image 741, and a total display unit 715.

The prawn image 741 is displayed instead of the fishing bait image 713 of the first common game, and shows a numerical value image corresponding to the size of the prawn image 741. In the present embodiment, the prawn image 741 is associated with one of the numerical values of "90", "60", and "30". When no winning is obtained in the third common game, a unit payout amount to be awarded is equal to the numerical value shown on the prawn image 741.

Furthermore, in the third common game is displayed a large fish image 740. The number of the large fish images 740 displayed in all gaming terminal areas 703 is smaller than the number of gaming terminals 10. In the gaming terminal area 703 corresponding to each gaming terminal 10 having obtained a winning, a winning image shown in FIG. 24 is displayed.

(Third Common Game Probability Table)

A payout amount of the third common game is determined based on a third common game probability table shown in FIG. 38. Though not illustrated, a plurality of third common game probability tables are stored to correspond to the number of gaming terminals 10, so that a different third common game probability table is associated with each gaming terminal 10. In the third common game probability table, random number ranged defined by dividing a numerical range of 0 to 399 are associated with winning bonus types. A winning bonus type stores a single bonus. For example, when the determined random number is 10, the winning bonus type to be awarded is Blue Marlin. However, when a bonus that a terminal 10 wins has already been awarded to another gaming terminal 10, no payout is awarded even if the terminal wins the bonus.

As described above, when the third common game is run after the first common game or the second common game, i.e., when the first common game or the second common game evolves into the third common game, bonus payouts of the both games are obtainable.

(Cooperation of Control Lever 603 and Individual Image 710)

In the bonus game and common game above, the movement pattern of the control lever 603 and the display pattern of the individual image 710 are cooperated with each other. The movement pattern of the control lever 603 is stored in a movement pattern table which is in the RAM 43 of the gaming terminal 10. In the meanwhile, the display pattern of the individual image 710 is stored in a display pattern table which is in the RAM 243 of the center controller 200. As shown in FIG. 39 and FIG. 40, a movement pattern and a display pattern are associated with a single set of identification information. As a set of identification information is selected in accordance with the situation, the control lever 603 is moved based on the movement pattern associated with the selected set of identification information and the individual image 710 is displayed based on the display pattern associated with the selected set of identification information.

(Operation of Gaming Machine 300: Boot Process)

The following describes a boot process routine which takes place in the gaming machine 300. Upon powering on the gaming machine 300, a boot process routine illustrated in FIG. 41 starts in: the motherboard 240 and gaming board 260 in the center controller 200, and in the motherboard 40 and the gaming board 50 in the terminal controller 630. The memory cards 53 and 263 are assumed to be inserted into the card slots 53S and 263S of the gaming boards 50 and 260, respectively. Further, the GAL 54 and 264 are assumed to be attached to the IC socket 54S and 264S, respectively.

First, turning on the power switch of (powering on) the power supply units 45 and 245 boots the motherboards 40 and 240, and the gaming boards 50 and 260. Booting the motherboards 40 and 240 and the gaming boards 50 and 260 starts separate processes in parallel. Specifically, in the gaming boards 50 and 260, the CPUs 51 and 261 read out preliminary authentication programs stored in the boot ROMs 52 and 262, respectively. Then, preliminary authentication is performed according to the read out programs so as to confirm and verify that no falsification is made to authentication programs, before reading them in the motherboards 40 and 240, respectively (S21). Meanwhile, the main CPUs 41 and 241 of the motherboards 40 and 240 run BIOS stored in the ROMs 42 and 242 to load into the RAMs 43 and 243 compressed data built in the BIOS, respectively (S22). Then, the main CPUs 41 and 241 run a procedure of the BIOS according to the data loaded into the RAMs 43 and 243 so as to diagnose and initialize various peripheral devices (S23).

The main CPUs 41 and 241, which are respectively connected to the ROMs 55 and 265 of the gaming boards 50 and 260 via PCI buses, read out authentication programs stored in the ROMs 55 and 265 and stores them in the RAMs 43 and 243 (S24). During this step, the main CPUs 41 and 241 each derives a checksum through ADDSUM method (a standard check function) which is adopted in a standard BIOS, and store the authentication programs into RAMs 43 and 243 while confirming if the operation of storing is carried out without an error.

Next, the main CPUs 41 and 241 each checks what connects to the IDE bus. Then, the main CPUs 41 and 241 access, via the IDE buses, to the memory cards 53 and 263 inserted into the card slots 53S and 263S, and read out game programs and game system programs from the memory cards 53 and 263, respectively. In this case, the main CPUs 41 and 241 each reads out four bytes of data constituting the game program and the game system program at one time. Next, the main CPUs 41 and 241 authenticate the game program and the game system program read out to confirm and verify that these programs are not falsified, using the authentication program stored in RAMs 43 and 243 (S25).

When the authentication properly ends, the main CPUs 41 and 241 write and store the authenticated game programs and game system programs in RAMs 43 and 243 (S26).

Next, the main CPUs 41 and 241 access, via the PCI buses, to the GALs 54 and 264 attached to the IC sockets 54S and 264S, and read out payout ratio setting data from the GALs 54 and 264, respectively. The payout ratio setting data read out is then written and stored in the RAMs 43 and 243 (S27).

Next, the main CPUs 41 and 241 read out, via the PCI buses, country identification information stored in the ROMs 55 and 265 of the gaming boards 50 and 260, respectively. The country identification information read out is then stored in the RAMs 43 and 243 (S28).

Figure 42:
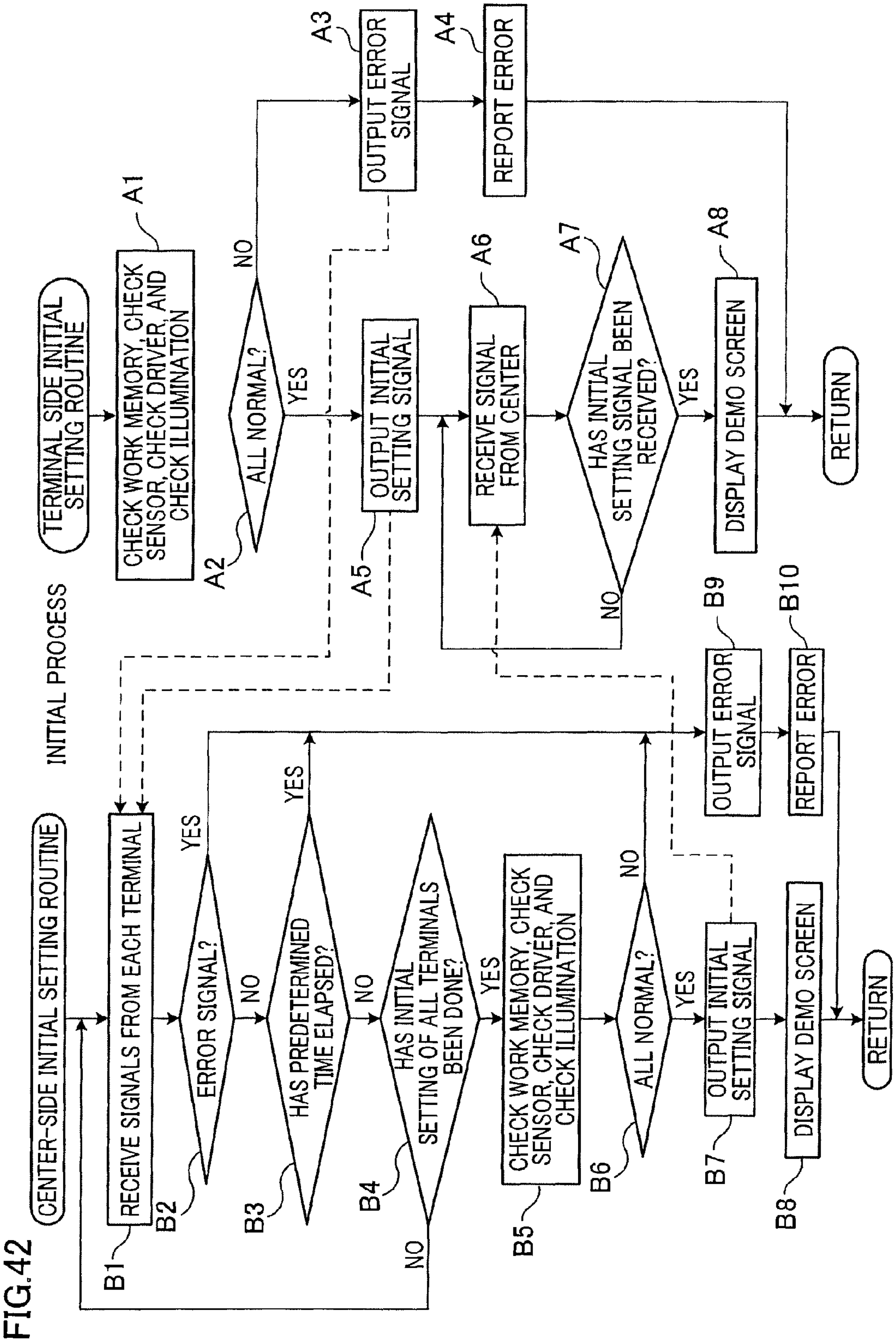
FIG. 42 is a flowchart of an initial process.

After this, the main CPUs 41 and 241 each perform an initial process of FIG. 42.

(Operation of Gaming Machine 300: Initial Process)

Figure 41:
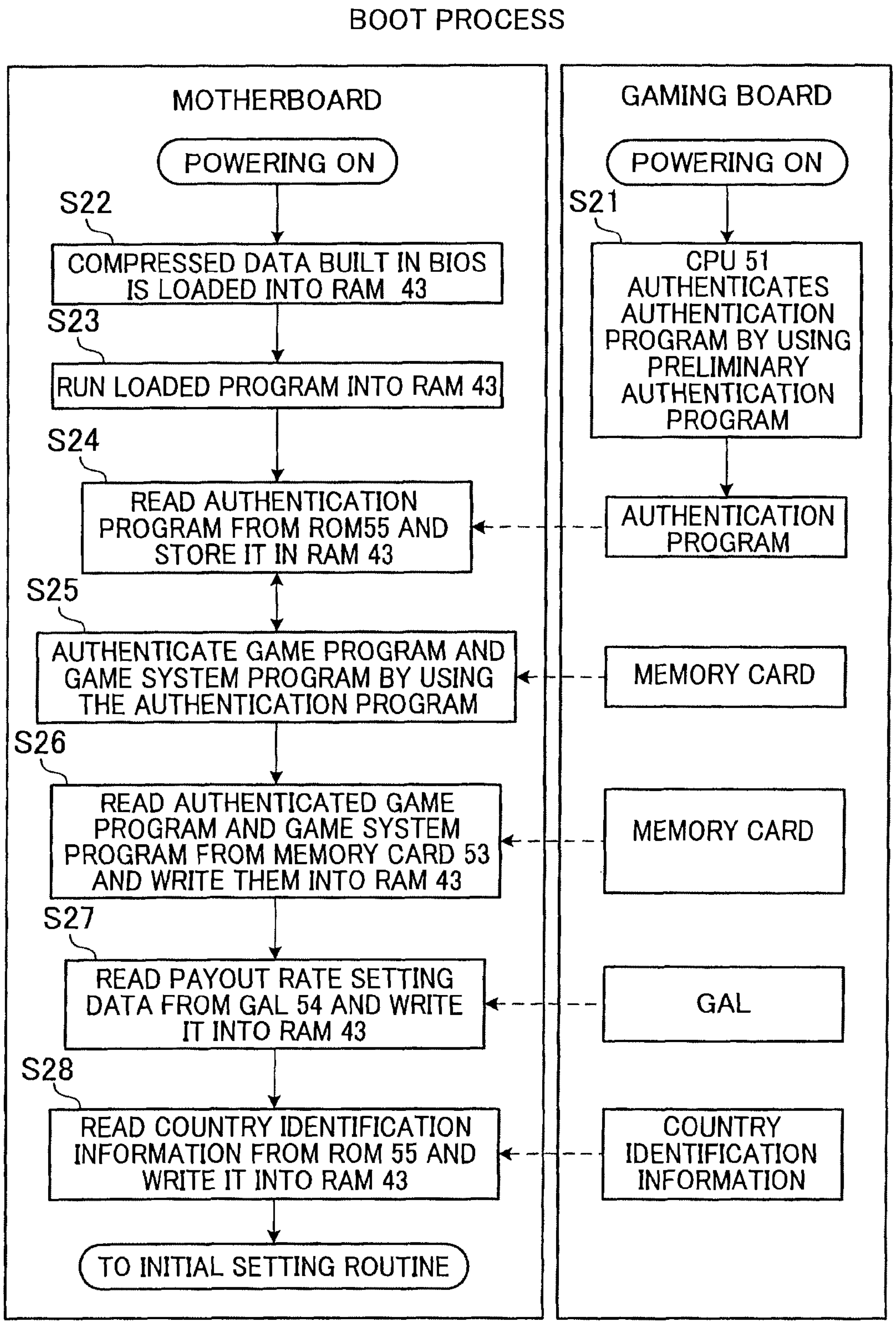
FIG. 41 is a flowchart of a boot process.

The following describes an initial process which takes place in the gaming machine 300. When the boot process of FIG. 41 is completed, the center controller 200 reads out from the RAM 243 a center-side initial setting routine shown in FIG. 42 and executes the routine. Meanwhile, when the boot process of FIG. 41 is completed, the gaming terminal 10 reads out from the RAM 43 a terminal side initial setting routine shown in FIG. 42 and executes the routine. The center-side and terminal side initial setting routines are executed in parallel.

First, the main CPU 41 of each of the gaming terminals 10 checks operations of work memories such as the RAM 43, various sensors, various driving mechanisms, and various decorative illuminations (A1). For example, to check the operation of the driving mechanism, a process is executed such that the lever body 6031 of the control lever 603 is rotated from the start position to the end position while the detected magnetic forces at the respective positions are detected, and then the lever position determining table in the RAM 43 is updated. Then, the main CPU 41 determines if all the check results are normal (A2). If the main CPU 41 determines that the check results contains an error (A2: NO), the main CPU 41 outputs a signal notifying the error (hereinafter, error signal) to the center controller 200 (A3). Further, the main CPU 41 reports the error in the form of illuminating the lamp 30 or the like (A4), and then ends the routine.

On the other hand in A2, if the main CPU 41 determines that all the check results are normal (A2: YES), an initial setting signal is output to the center controller 200 (A5). Then, the supply of an initial setting signal from the center controller 200 is waited for (A6, A7: NO).

The main CPU 241 of the center controller 200 receives signals from each of the terminals (B1). Then, the main CPU 241 determines whether a signal received is an error signal (B2). If the main CPU 241 determines that the signal is an error signal (B2: YES), the main CPU 241 outputs the error signal to a server of an unillustrated host computer or the like (B9) to report the error (B10), and ends the routine.

On the other hand in B2, if the main CPU 241 determines that the signal is not an error signal (B2: NO), the main CPU 241 determines whether a predetermined time (check time) has elapsed from the time of powering on (B3). If the main CPU 241 determines that the check time has elapsed (B3: YES), B9 is executed. On the other hand, if the main CPU 241 determines that the check time has not yet elapsed (B3: NO), it is determined whether an initial setting signal is received from each of the gaming terminals 10 (B4). If the main CPU 241 determines that an initial setting signal from any one of the gaming terminals 10 is not received (B4: NO), the process returns to B1. On the other hand, if it is determined that initial setting signals from all the gaming terminals 10 are received (B4: YES), the main CPU 241 checks operations of work memories such as RAM 243 or the like, various sensors, various driving mechanisms, and various decorative illuminations (B5). Then, the main CPU 241 determines whether all the check results are normal (B6). If the main CPU 241 determines the check results contain an error (B6: NO), the main CPU 241 executes B9.

On the other hand in B6, if the main CPU 241 determines that all the check results are normal (B6: YES), the main CPU 241 outputs an initial setting signal to all the gaming terminals 10 (B7), and causes the shared display 102 to display a demo-screen (B8). Then, the main CPU 241 ends the routine.

In A7, the main CPU 41 of each of the gaming terminals 10 determines that an initial setting signal is received from the center controller 200 (A7: YES), and causes the terminal image display panel 16 to display a demo-screen (A7). The main CPU 41 then ends the routine.

(Operation of Gaming Terminal 10: Terminal-Side Basic Game Process Routine)

Figure 43:
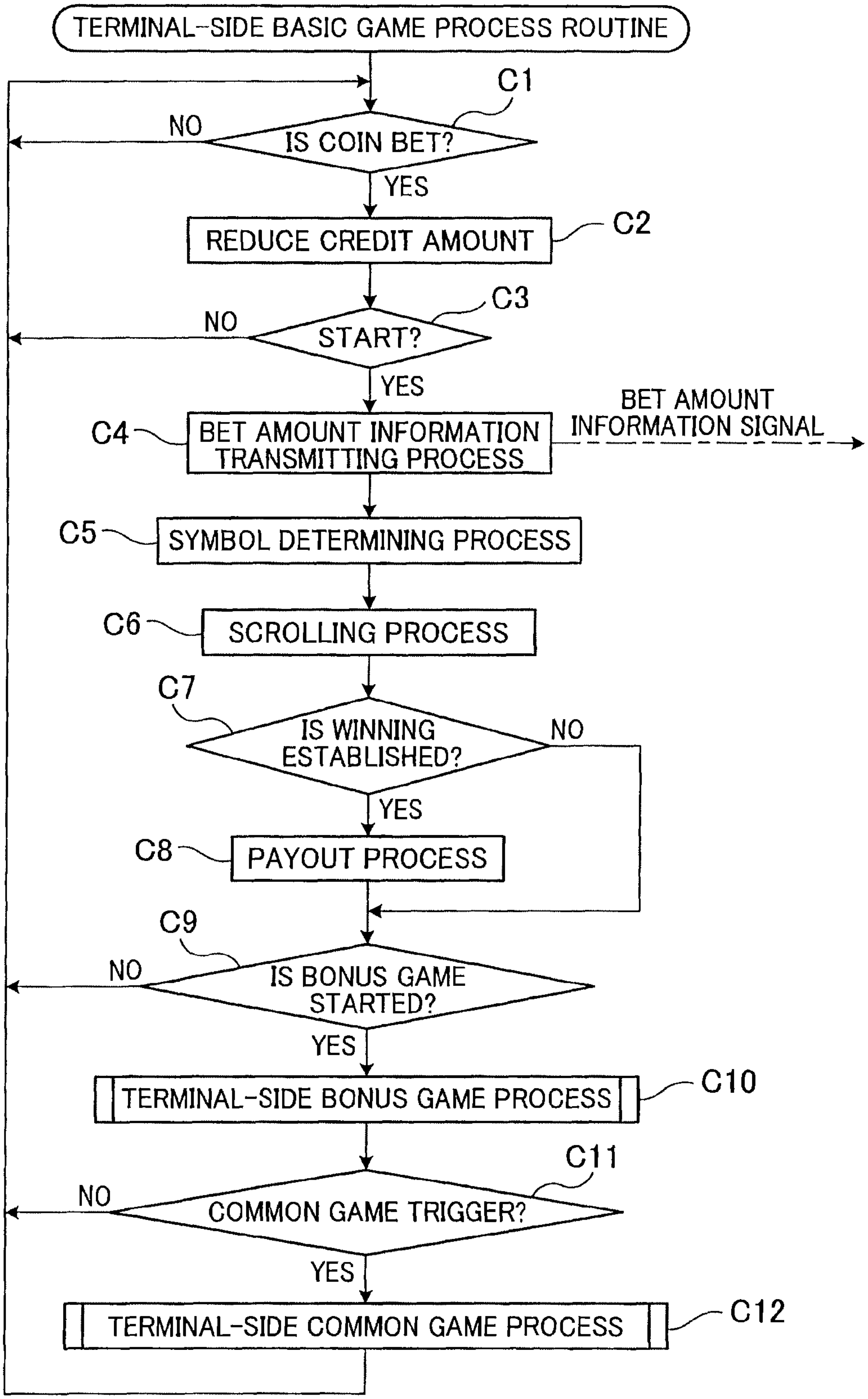
FIG. 43 is a flowchart of a terminal-side basic game process.

After the terminal side initial setting routine of FIG. 42, the main CPU 41 of the gaming terminal 10 performs a terminal-side basic game process routine of FIG. 43. Through this terminal-side basic game process routine executed by the main CPU 41, a basic game is run.

As shown in FIG. 43, in the gaming terminal process routine, it is determined whether a coin is bet (C1). In this step, it is determined whether a signal from the 1-bet switch 26S entered by pressing of the 1-bet button 26 is received. Meanwhile, it is determined whether a signal from the maximum bet switch 27S entered by pressing of the maximum bet button 27 is received. If no coin is bet (C1: NO), C1 is repeated until a coin is bet.

On the other hand, if a coin is bet (C1: YES), the credit amount stored in the RAM 43 is reduced according to the number of coins bet (C2). When the number of coins bet surpasses the credit amount stored in the RAM 43, C3 is repeated without the reduction of the credit amount. When the number of coins bet exceeds the maximum number of coins bettable for one game (50 pieces in this embodiment), the process goes to a later-described step C3 without the reduction of the credit amount.

Then, it is determined whether a spin button 23 or a control lever 603 is pressed for the start (C3). If not started (C3: NO), the process returns to C1. Here, if not started (for example, a command to end the game is input before the start), the reduction of the credit amount in C2 is canceled.

On the other hand, if started (C3: YES), a bet amount information transmitting process is executed (C4). In other words, a bet amount information signal indicating the game value bet is transmitted to the center controller 200. Note that, although the present embodiment is arranged so that the information of the number of paylines L activated in response to betting is transmitted, the disclosure is not limited to this.

Next executed is a symbol determining process (C5). That is, the stop symbol determining program stored in the RAM 43 is run to determine symbols 501 to be arranged in the display windows 150. Through this, a symbol combination to be formed along the payline L is determined.

Then, the scrolling process is executed to scroll display symbols 501 on the terminal image display panel 16 (C6). The scrolling process is a process in which the symbols 501 determined in C5 are stopped (rearranged) in the display windows 150 after scrolling of symbols 501 in a direction indicated by an arrow.

Next, it is determined whether a winning is resulted with the combination of symbols 501 rearranged in the display windows 150 (C7). When it is determined that a winning is resulted (C7: YES), a payout process is executed (C8). More specifically, when a winning is resulted, the number of coins according to the combination is calculated. On the other hand in C7, when it is determined that no winning is resulted (C7: NO), C9 is executed.

After the payout process of C8 is executed, the main CPU 41 determines whether to start a bonus game (C9). More specifically, the main CPU 41 starts a bonus game when a predetermined number or more specific symbols 510 are rearranged on a payline L or no specific symbol 510 is rearranged at the video reels 153 of the third column but a mystery bonus is won as a result of random selection. When the bonus game is not started (C9: NO), the process of C1 is executed.

On the other hand, when the bonus game is started (C9: YES), a terminal-side bonus game process is executed (C10). This terminal-side bonus game process will be described later with reference to FIG. 44. Thereafter, whether a common game trigger is established is determined (C11). More specifically, the main CPU 41 determines whether a common game start effect image display command has been received from the center controller 200. If the common game trigger is not established (C11: NO), the process of C1 is executed.

On the other hand, when the common game trigger is established (C11: YES), a terminal-side common game process is executed (C12). The terminal-side common game process will be described later with reference to FIG. 45. Then the process of C1 is executed.

(Operation of Gaming Terminal 10: Terminal-Side Bonus Game Process Routine)

Figure 44:
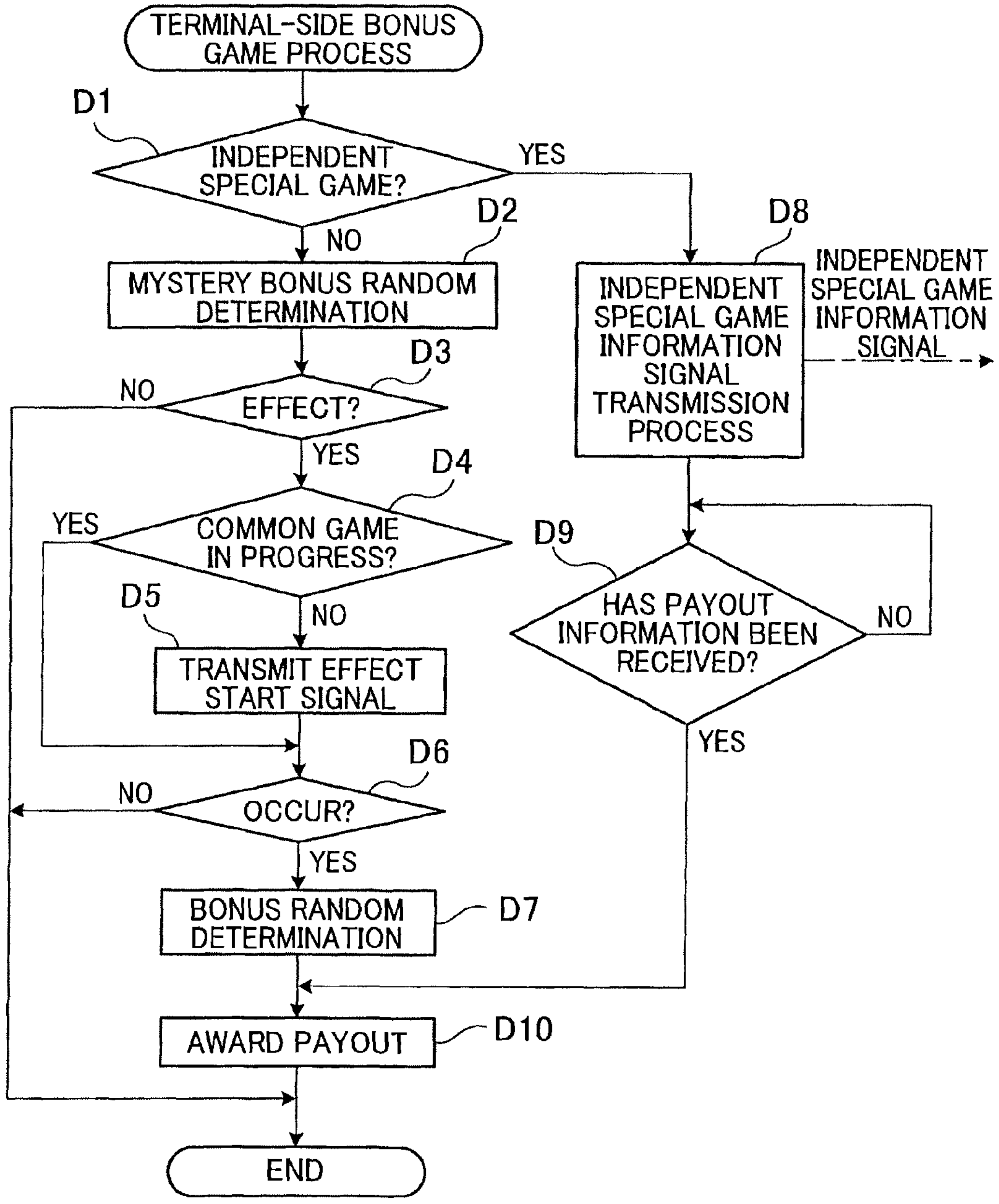
FIG. 44 is a flowchart of a terminal-side bonus game process.

The main CPU 41 of the gaming terminal 10 executes, in the terminal-side bonus game process (C10) shown in FIG. 43, a terminal-side bonus game process routine shown in FIG. 44.

As shown in FIG. 44, the main CPU 41 determines whether the bonus game is an independent special game (D1). If the bonus game is not the independent special game (D1: NO), i.e., when the bonus game is a mystery bonus, the main CPU 41 executes a mystery bonus random determination (D2). More specifically, the main CPU 41 determines, with reference to the mystery bonus start random determination table shown in FIG. 25, to which one of the ranges, “occurrence”, “effect only”, and “non-occurrence” the determined random number corresponds.

Now, the main CPU 41 determines whether to conduct an effect (D3). More specifically, the main CPU 41 determines to conduct an effect when the result of the mystery bonus random determination is “occurrence” or “effect only”. If no effect is conducted (D3: NO), i.e., when the result of the mystery bonus random determination is “non-occurrence”, the routine finishes.

On the other hand, if an effect is conducted (D3: YES), the main CPU 41 determines whether a common game is being run (D4). If no common game is being run, an effect start signal is transmitted to the center controller 200 (D5). Note that, receiving the effect start signal transmitted in the step D5, the center controller 200 conducts the effect shown in FIG. 27. If it is determined in the step D3 that no effect is conducted (D3) or after the transmission of the effect start signal, whether a mystery bonus is generated is determined (D6). More specifically, the mystery bonus is generated when the result of the mystery bonus random determination is “occurrence”.

If no mystery bonus is generated (D6: NO), the routine finishes. On the other hand, if the mystery bonus is generated (D6: YES), the main CPU 41 conducts a bonus random determination (D7). More specifically, with reference to the mystery bonus probability table shown in FIG. 26, to which range of the winning bonus types the determined random number corresponds is determined. Thereafter, a payout according to the bonus that has been won is awarded (D10), and the routine finishes.

On the other hand, if it is determined in the step D1 that the bonus game is an independent special game, the main CPU 41 transmits an independent special game information signal instructing to start an independent special game is transmitted to the center controller 200 (D8). In response to this, a lookup display unit 404 shown in FIG. 19 is displayed on the terminal image display panel 16. Though not illustrated, when the center controller 200 receives the independent special game information signal, whether a common game is being run is determined. If it is determined that no common game is being run, the center controller 200 conducts the effect shown in FIG. 21 and FIG. 24, turns on the LED unit 801 corresponding to the gaming terminal 10 that has transmitted the independent special game information signal, carries out only a random determination of a payout based on the independent special game probability table show in FIG. 23, and transmits payout information. On the other hand, when a common game is being run, the center controller 200 conducts only a random determination and transmits payout information.

Thereafter, whether payout information has been received from the center controller 200 is determined (D9). If no payout information has been received (D9: NO), the process is on standby and the step D9 is repeated. When the payout information has been received from the center controller 200 (D9: YES), a payout is awarded based on the payout information (D10) and the routine finishes.

(Operation of Gaming Terminal 10: Terminal-Side Common Game Process Routine)

Figure 45:
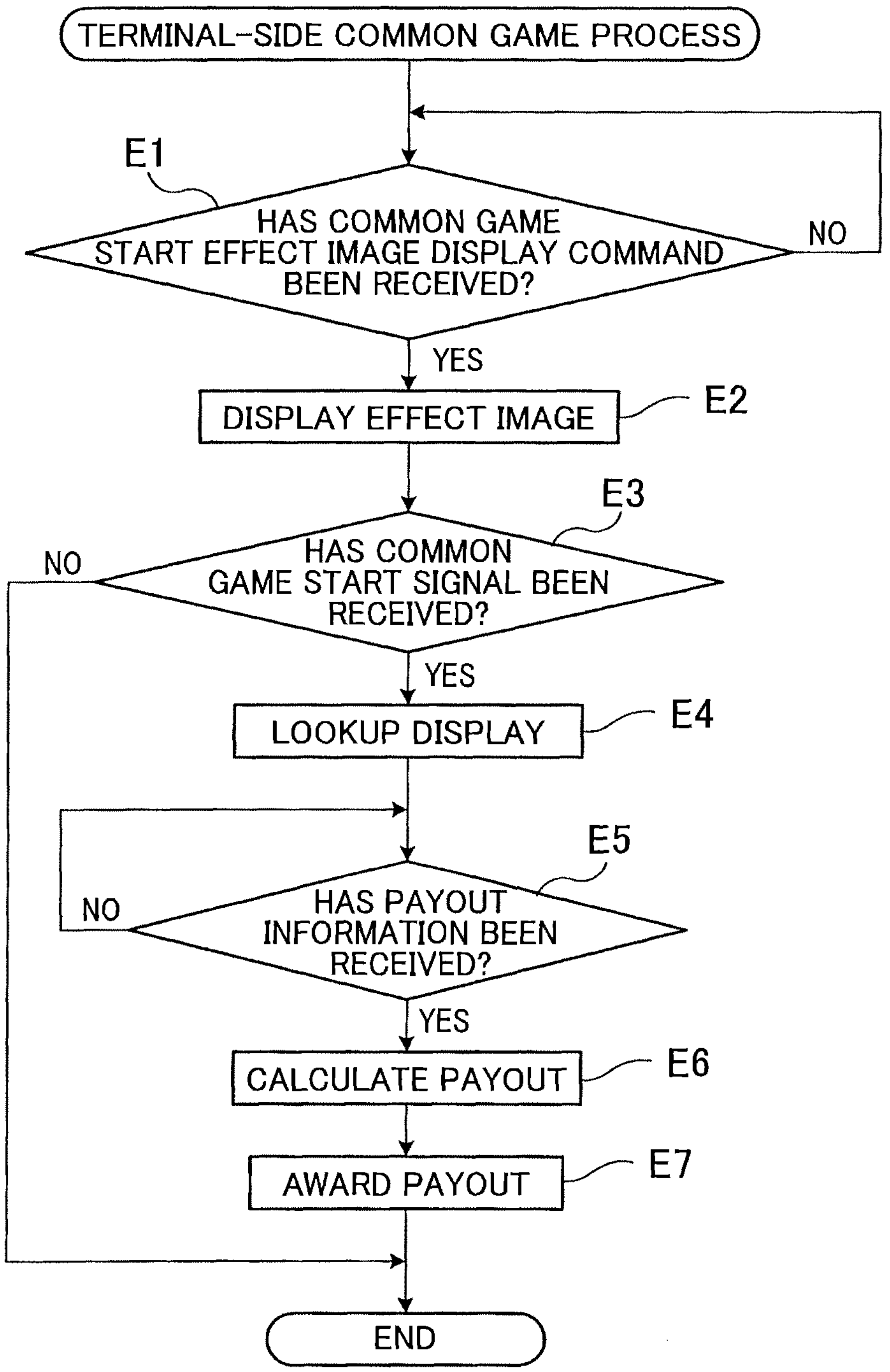
FIG. 45 is a flowchart or a terminal-side common game process.

The main CPU 41 of the gaming terminal 10 executes, in the terminal-side common game process (C12) shown in FIG. 43, a terminal-side common game process routine shown in FIG. 45.

As shown in FIG. 45, the main CPU 41 determines whether a common game start effect image display command has been received from the center controller 200 (E1). Thereafter, based on the received common game start effect image display command, a common game start effect image shown in FIG. 30 is displayed (E2). Then whether a common game start signal has been received is determined (E3). If no common game start signal has been received (E3: NO), the routine finishes.

On the other hand, if the common game start signal has been received (E3: YES), the lookup display shown in FIG. 19 is carried out (E4). Though not illustrated, when the common game start effect image display command includes an instruction to conduct only an effect, the routine finishes after the step E2.

Subsequently, the main CPU 41 determines whether payout information has been received from the center controller 200 (E5). If no payout information has been received, the routine is on standby (E5: NO). If the payout information has been received (E5: YES), the total sum of obtained unit payout amounts is multiplied by the payout rate, so as to calculate a payout to be awarded (E6). Then the calculated payout is awarded (E7) and the routine finishes.

(Operation of Center Controller 200: Common Game Process Routine)

Figure 46:
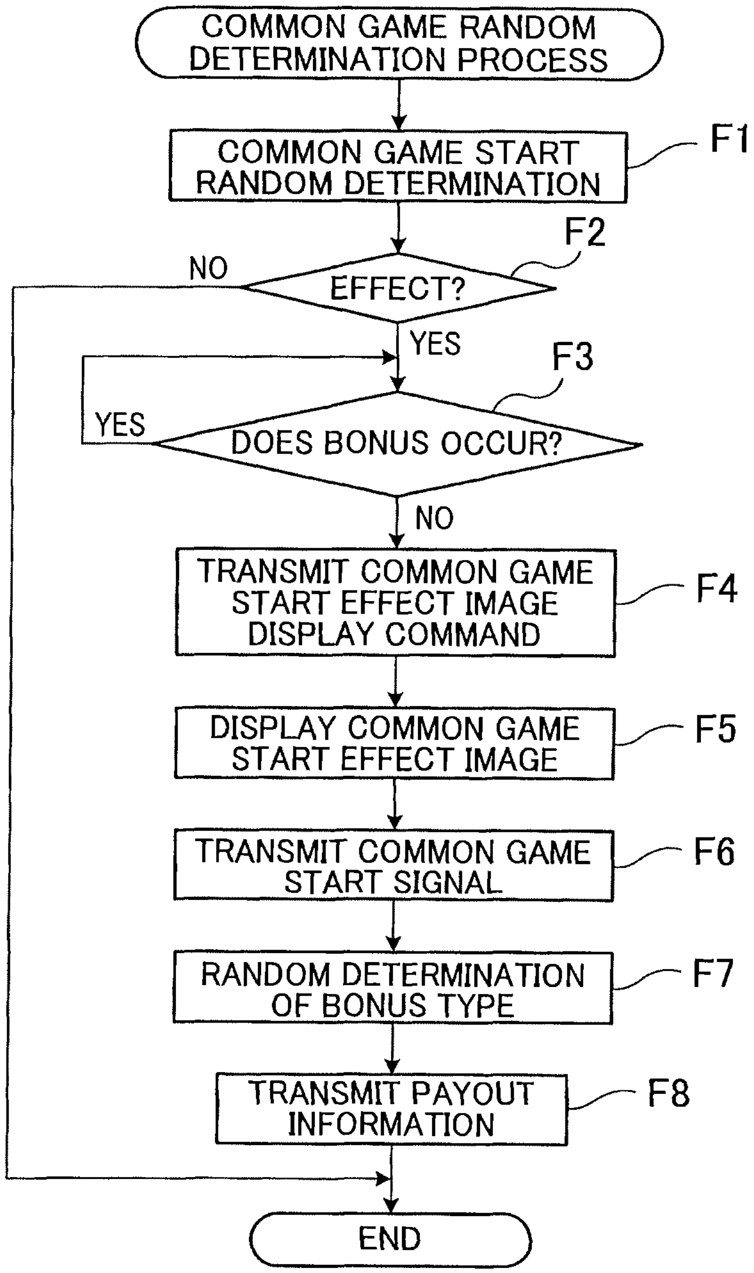
FIG. 46 is a flowchart of a common game random determination process.

The main CPU 241 of the center controller 200 executes, after the execution of the center-side initial setting routine shown in FIG. 42 is completed, a common game process routine shown in FIG. 46. Though not illustrated, the common game process routine is arranged to be executed at predetermined intervals (one second in the present embodiment).

As shown in FIG. 46, the main CPU 241 carries out a random determination of whether to start a common game (F1). More specifically, with reference to the common game start random determination table shown in FIG. 28, to which one of the ranges, "occurrence", "effect only", and "non-occurrence", the determined random number corresponds. Note that, in addition to the above, which one of common games is generated as a result of the determined random number is determined with reference to the common game type random determination table shown in FIG. 29.

Thereafter, the main CPU 241 determines whether to conduct an effect for the start of a common game (F2). More specifically, an effect is conducted when the result of the step F1 is "occurrence" or "effect only". If no effect for the start of a common game is conducted (F2: NO), the routine finishes.

On the other hand, if the effect for the start of a common game is conducted (F2: YES), the main CPU 241 determines whether a bonus game is being run on any one of the gaming terminal 10 (F3). If a bonus game is being run, the routine waits for the end of the bonus game (F3: YES). If no bonus game is being run (F3: NO), a common game start effect image display command corresponding to the selected type of the common game is transmitted to all gaming terminals 10 (F4) and a common game start effect image is displayed on the upper display 700 (F5).

Thereafter, the main CPU 241 transmits a common game start signal to each gaming terminal 10 qualified to participate in the common game (F6). More specifically, with reference to the common game qualification time management table shown in FIG. 15, the common game start signal is transmitted to each gaming terminal 10 having a qualification time. It is noted that the common game start signal has information regarding the highest payout rate among the common game qualification times of the gaming terminals 10 in the common game qualification time management table. In other words, the main CPU 241 notifies the gaming terminals 10 of the highest payout rate of each terminal.

The main CPU 241 then determines the winning bonus type of each participating gaming terminal 10 with reference to tables such as the first common game probability table shown in FIG. 33 and the third common game probability table shown in FIG. 38 (F7). Thereafter, the payout for each participating gaming terminal 10 is determined based on the determined winning bonus type of each participating gaming terminal 10, payout information is transmitted to each gaming terminal 10 (F8), and the routine finishes.

Note that the common game random determination process is being executed while the common game is being run. When the start of a common game is awarded while a common game is being run, a fixed payout is awarded to a gaming terminal 10 which is not participating in the common game but has a qualification time. More specifically, the center controller 200 transmits fixed payout information including information of the fixed payout to a gaming terminal 10 which is not participating in the common game but has a qualification time. Receiving the fixed payout information, the gaming terminal 10 executes a process of awarding a payout based on the fixed payout information.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

For example, the aspects, values, or the like concerning the effects are not limited to those recited in the embodiment above. Furthermore, the data or the like exchanged between the gaming terminals 10 and the center controller is not limited to the above. For example, the information of the number of paylines L activated in response to betting is transmitted in the present embodiment. Not limited to this, information indicating the bet amount may be transmitted. In this case, a table associated with the number of paylines may be associated with the bet amount or the range of the bet amount.

In addition to the above, while the present embodiment is arranged so that effects are conducted after the random determination of payouts of a base game, a bonus game, and a common game, the random determination may be carried out while the effect is being conducted. For example, as effects during a bonus game and a common game, a payout amount is indicated by using the fish image 714 and the fishing bait image 713. In this regard, the following effect may be carried out using the fishing bait image 713.

More specifically, when an effect of causing the fish image 714 to approach the fishing bait image 713 is conducted and the probability of winning a bonus corresponding to that fish image 714 is high (e.g., 73% or higher), the fishing bait image 713 is displayed in red. When the probability of winning a bonus corresponding to that fish image 714 is middle (e.g., 54% or higher), the fishing bait image 713 is displayed in orange. When the probability of winning a bonus corresponding to that fish image 714 is low (e.g., less than 53%), the color of the fishing bait image 713 is maintained to be green. In addition to the above, the fish image 714 may be arranged to open the mouth to attack the fishing bait image 713 displayed in red, and the fish image 714 may also be arranged to peck at the fishing bait image 713 by the mouth when the fishing bait image 713 is displayed in orange.

In addition to the above, the base game qualification time awarding table shown in FIG. 14 is arranged so that a plurality of payout rates are awarded for each number of activated paylines, but the disclosure is not limited to this. For example, as shown in FIG. 47, a payout rate is independently awarded for each number of activated paylines.

More specifically, in the case of FIG. 47, a qualification time of five seconds in which the payout rate is one is awarded when the number of activated paylines is one. When the number of activated paylines is two, a qualification time of five seconds in which the payout rate is two is awarded. When the number of activated paylines is three, a qualification time of five seconds in which the payout rate is three is awarded. When the number of activated paylines is five, a qualification time of five seconds in which the payout rate is five is awarded. When the number of activated paylines is ten, a qualification time of five seconds in which the payout rate is ten is awarded.

Because a payout rate is independently awarded for each number of activated paylines, for example, qualification times of the same payout rate are accumulated as the player repeatedly bets the same bet amount. In this case, because at least a qualification time of smaller than the payout rate above is not accumulated, the payout rate is kept to be equal to or higher than a predetermined value, until the qualification time reaches zero.

In addition to the above, the present embodiment is arranged so that, when any one of the gaming terminals 10 wins an independent special game or a mystery bonus and effect regarding the same is being conducted on any one of the gaming terminal area 703 of the upper display 700, a common game starts after the end of the effect even if the start of a common game is determined. the disclosure, however, is not limited to this. For example, when the start of a common game is determined, the effect concerning the independent special game or mystery bonus may be canceled and the common game may be stared. This allows the gaming terminal 10 qualified to participate in the common game to start the common game without waiting for the end of the common game which is being run.

Figure 48:
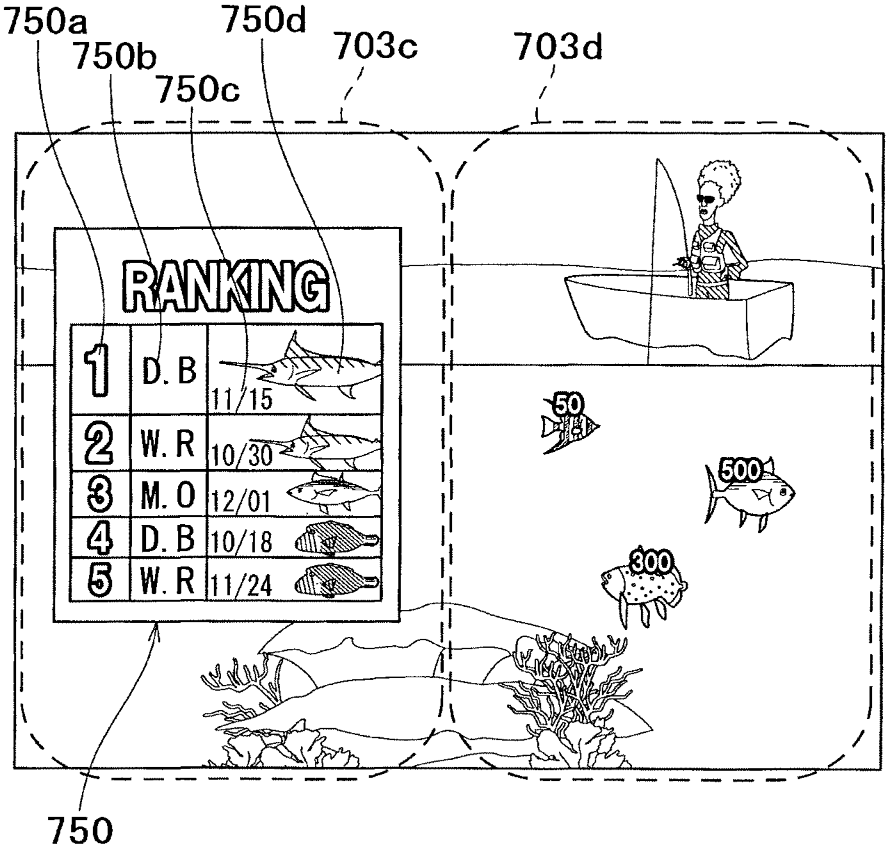
FIG. 48 shows an example of a display screen of a ranking.

In addition to the above, when no game is run by the gaming machine 300 or no game is run by any one of the gaming terminals 10, the ranking of bonus types which have been awarded as payouts may be displayed on the upper display 700 as shown in FIG. 48.

In FIG. 48, no game is being run at the gaming terminal 10*c*. More specifically, at the central part of the gaming terminal area 703*c* corresponding to the gaming terminal 10*c*, a ranking image 750 is displayed. The ranking image 750 has a ranking area 750*a*, a name area 750*b*, a date area 750*c*, and a fish area 750*d*. The ranking area 750*a* shows the ranking of amounts of awarded bonuses. The name area 750*b* shows the names of player who have obtained bonuses. If the gaming terminals 10 can store a membership card or the like storing an identification name of each player and a member ship number, the name, the membership number, or the like may be displayed. The date area 750*c* displays dates of obtaining bonuses. The fish area 750*d* displays images of fishes corresponding to obtained bonuses. It is noted that the fish area 750*d* may display texts indicating obtained bonuses, unit payout amounts of obtained bonuses, or one of them including the images of the fishes. The ranking may be determined based on unit payout amounts of obtained bonuses or based on a calculation of multiplying a unit payout amount by a payout rate.

(Modification)

A modification of the embodiment above will be described with reference to FIG. 49 to FIG. 51. It is noted that the arrangements identical with those in the embodiment above will be omitted.

As shown in FIG. 31, in the embodiment above the fishing bait image 713 has only one format. In the meanwhile, in the modification, a player is allowed to select one of a plurality of display formats of the fishing bait image 713. The modification is suitably used for bonus games and common games (e.g., the independent special game, the first common game or the like in the embodiment above) in which there is a possibility of receiving plural type of bonus. The application of the modification, however, is not limited to this.

Figure 49:
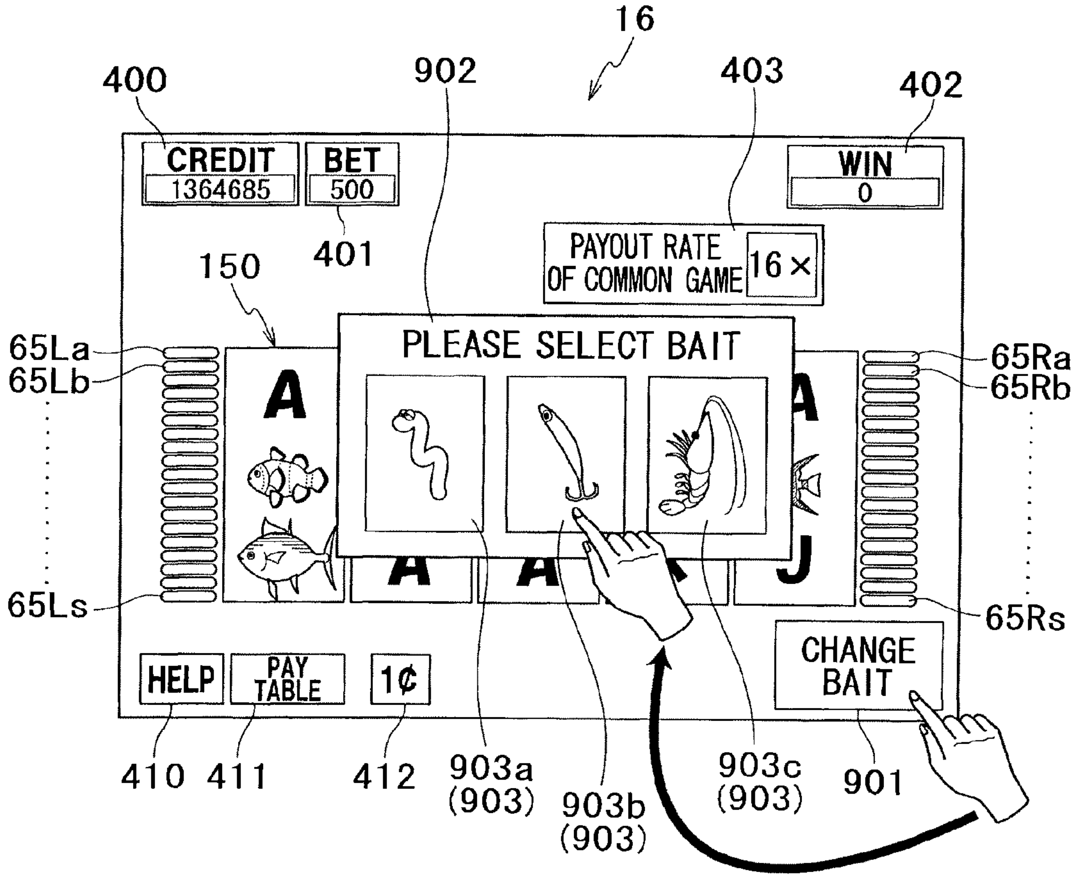
FIG. 49 illustrates an example of a display screen of a base game.

FIG. 49 shows an example of a display screen of a base game on a terminal image display panel 16. At a lower right part of the terminal image display panel 16 is provided a bait change button display unit 901. The bait change button display unit 901 is displayed when video reels 151 to 155 (see FIG. 12) are stopped in a display window 150. In other words, in the modification, the bait change button display unit 901 is not displayed while the video reels 151 to 155 are scrolling. The display state of the bait change button display unit 901, however, is not limited to this. For example, the bait change button display unit 901 may always be displayed. In such a case, the bait change button display unit 901 is preferably arranged to be non-operable while the video reels 151 to 155 are scrolling.

If the player touches and operates the bait change button display unit 901 while the bait change button display unit 901 is displayed, a bait selection window 902 shown in FIG. 49 is displayed at a central portion of the terminal image display panel 16. In the displayed bait selection window 902, a plurality of selectable bait images 903 are provided. In the modification, a selection can be made from an earthworm image 903*a*, a lure image 903*b*, and a prawn image 903*c*. By touching one of these selectable bait images 903, the player selects one of the fishing bait images 713. In short, in the bonus game, the common game, or the like, the selected selectable bait image 903 is displayed on the upper display 700 as the fishing bait image 713.

Bait image information by which the selected selectable bait image 903 is identified is temporarily stored in a storage device (e.g. the RAM 43) in the gaming terminal 10. This bait image information is transmitted to the center controller 200 when it is determined that the gaming terminal 10 runs the bonus game or the common game. The center controller 200 can identify which image is used as the fishing bait image 713 of each gaming terminal 10, with reference to the bait image information transmitted from each gaming terminal 10. It is noted that the color of the fishing bait image 713 may be changed in accordance with a payline (bet amount) which is active at the start of the bonus game or the common game. In other words, the fishing bait image 713 may have a format corresponding to the selectable bait image 903 selected by the player and have a color corresponding to an active payline (bet amount).

(Bait Change Probability Table)

In addition to the above, when determining the payout amount of the bonus game and the common game in the gaming terminal 10, the center controller 200 changes the way to refer to a probability table in accordance with the selectable bait image 903 selected by the player. More specifically, the determination of the payout amount by the center controller 200 is carried out with reference to a bait change probability table shown in FIG. 50. Alternatively, the bait change probability table may be changed in accordance with a payline (bet amount) which is active at the start of the bonus game or the common game. The table is not limited to the above, and may be divided for the respective baits.

In the bait change probability table shown in FIG. 50, random number ranges defined by dividing a numerical range of 0 to 65535 and winning bonus types of each bait are associated with one another. When the player selects the earthworm image 903*a*, the winning bonus type is selected from “Earthworm”. When the player selects the lure image 903*b*, the winning bonus type is selected from “Lure”. When the player selects the prawn image 903*c*, the winning bonus type is selected from “Prawn”. For easier understanding, the bait change probability table defines that fishes with high payout amounts are “Large”, fishes with middle payout amounts are “Middle”, and fishes with small payout amounts are “Small”, and the types are indicated by numbers. The magnitude of the payout amount is determined by the ranks shown in FIG. 22. For example, bonus types which are ranked first and second are “Large”, bonus types which are ranged third and fourth are “Medium”, and bonus types which are ranked fifth or lower are “Small”. It is noted that fishes with high payout amounts are associated with large fish images.

In the modification, the payout amounts corresponding to the same random number ranges are the same among the baits. For this reason, whichever bait is selected by the player, the payout amount awarded to the player remains same, even if the number of fish images 714 caught by the fisher image 711 increases in the order of prawn, lure, and earthworm. Although in the present modification the payout amounts corresponding to the same random number ranges are identical among the baits, the random number ranges and the winning bonus type of each random number range may be arbitrarily arranged on condition that "expectation value" is identical among the baits. This "expectation value" is calculated by multiplying the probability of a random number range by the payout amount of the winning bonus type corresponding to that random number range.

As such, the player can determine the tendencies of the winning bonus type by selecting a selectable bait image 903. In other words, the player can determine the tendencies of the number of times the fisher image 711 catches a fish image 714 and the payout amount corresponding to each fish image 714, in the bonus game, the common game, or the like. That is to say, when the player selects the earthworm image 903*a*, an effect in which a lot of small fishes associated with small payouts are caught is produced in the bonus game, the common game, or the like. On the other hand, when the player selects the prawn image 903*c*, an effect in which a small number of large fishes associated with high payouts are caught is produced in the bonus game, the common game, or the like.

When the player does not operate the bait change button display unit 901 and hence no selectable bait image 903 is selected, the gaming terminal 10 may randomly select a selectable bait image 903 or a predetermined selectable bait image 903 may be selected. Alternatively, when the player does not operate the bait change button display unit 901 and no selectable bait image 903 is selected, another probability table may be used as in the embodiment above.

(Operation of Gaming Machine 300)

Now, the operation of the gaming machine 300 will be described.

Figure 51:
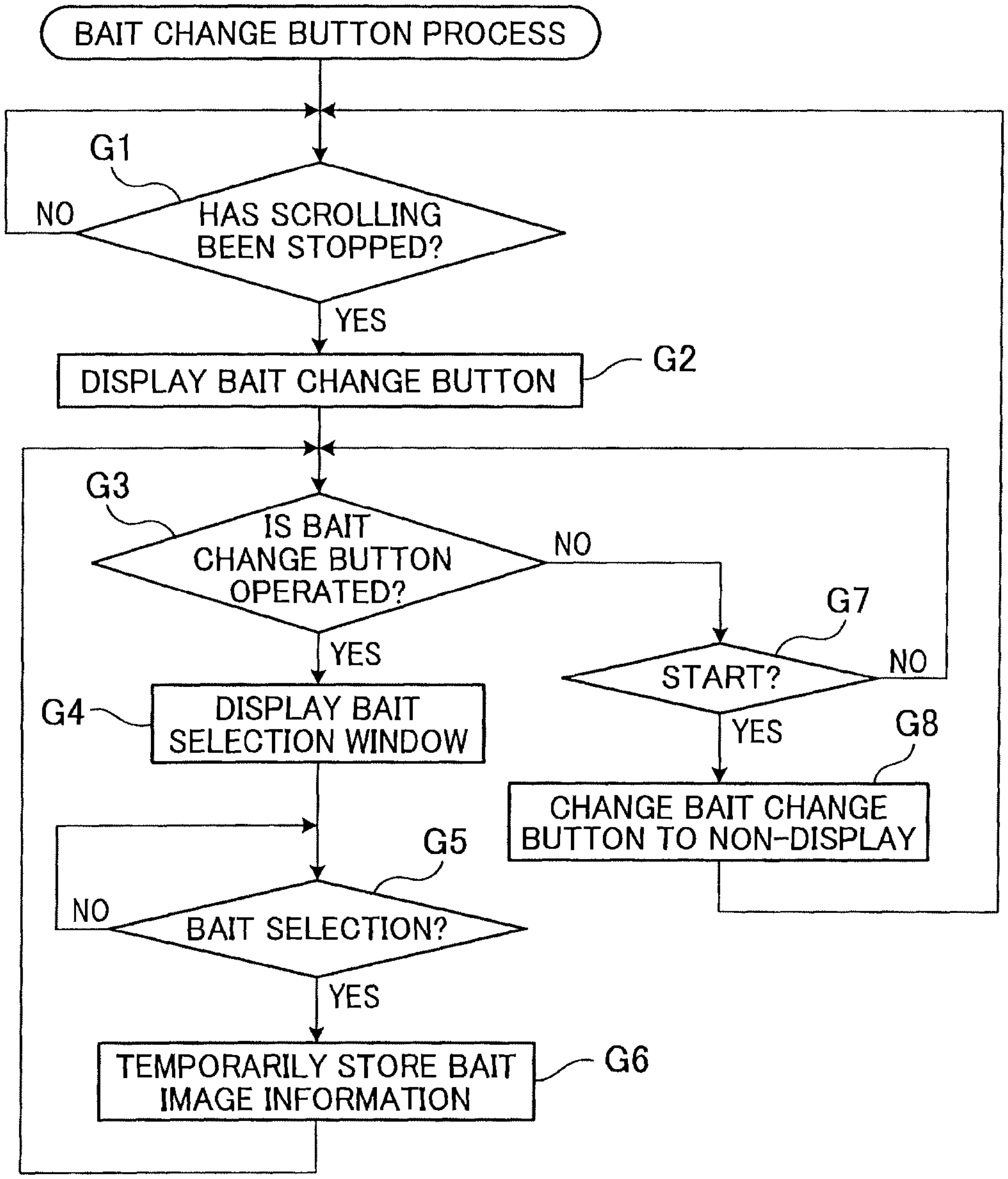
FIG. 51 illustrates a bait change button process.

The main CPU 41 of the gaming terminal 10 executes a bait change button process shown in FIG. 51.

First, the main CPU 41 determines whether symbols 501 have been stopped in the display window 150 in the step C6 (see FIG. 43) of the terminal-side basic game process (G1). When the symbols 501 have not been stopped in the display window 150 (G1: NO), the process is on standby while repeating the step G1.

On the other hand, when it is determined that the symbols 501 are stopped in the display window 150 (G1: YES), the state of the bait change button display unit 901 is changed from non-display to display (G2). Then whether the bait change button display unit 901 is operated is determined (G3). When the bait change button display unit 901 has been operated (G3: YES), a plurality of selectable bait images 903 are displayed in the bait selection window 902 (G4). Thereafter, which one of the selectable bait images 903 is selected in the bait selection window 902 is determined (G5). When no selectable bait image 903 is selected (G5: NO), the process is on standby while repeating the step G5. On the other hand, when one of the selectable bait images 903 is selected (G5: YES), bait image information by which the selected selectable bait image 903 is identified is temporarily stored in the RAM 43 and the process goes back to the step G3.

On the other hand, when the bait change button display unit 901 is not operated (G3: NO), whether it has been determined in the step C3 (see FIG. 43) in the terminal-side basic game process that the start has been instructed is determined (G7). If the start has not been not instructed (G7: NO), the process is on standby while repeating the step G7.

On the other hand, if it is determined that the start has been instructed (G7: YES), the state of the bait change button display unit 901 is changed to non-display (G8). Subsequently, the process goes back to the step G1 to display the bait change button display unit 901 on the terminal image display panel 16 after the scroll stops.

As such, the bait image information by which the selectable bait image 903 selected by the gaming terminal 10 is identified is temporarily stored, and then transmitted to the center controller 200 after it is determined that the bonus game and the common game are to be run. The main CPU 261 of the center controller 200 selects a fishing bait image 713 to be displayed on the upper display 700, in accordance with the bait image information. Furthermore, the center controller 200 determines the winning bonus type of each gaming terminal 10 with reference to the probability table corresponding to the bait image information.

It is noted that the bait image information which is temporarily stored may be deleted at a predetermined timing. For example, the temporarily-stored bait image information may be deleted when the player is changed. This prevents a player from being forced to use, as a default selection, a fishing bait image 713 which was selected by another player. Examples of the timing at which the player is changed are, when an ID card or the like storing individual identification information is inserted or removed, when the number of credits reaches 0, and when the bonus game or the common game finishes after the selection of the selectable bait image 903. Furthermore, the terminal image display panel 16 or the control panel 20 may be provided with a reset control panel by which the bait image information can be reset.

In addition to the above, while in the present modification the bait image information (information indicating which bait is selected by the player) is sent to the center controller 200 after the running of a bonus game and a common game is determined, the disclosure is not limited to this. For example, the bait image information may be sent to the center controller 200 at the timing of the player's selection of the bait. In this case, the center controller 200 may display, on the upper display 700, an image indicating the bait image information, at the timing of receiving the bait image information. More specifically, the center controller 200 may display an image indicating the bait image information on the gaming terminal area 703 corresponding to the gaming terminal 10 of the player who has selected the bait image. This allows the player to see the bait image selected by him/her, until the bonus game and the common game are run.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming machine comprising:

a plurality of gaming terminals provided in a parallel manner, each of the plurality of gaming terminals configured to individually run a basic game, and run a common game in which each of the plurality of gaming terminals is able to participate, the common game being different from the basic game;

a plurality of upper displays which are provided in a parallel manner independently from the plurality of gaming terminals so as to form a single common effect display screen configured to show a single common game image, the plurality of upper displays being fewer in number than the plurality of gaming terminals;

a plurality of display controllers which each control image display on a respective one of the plurality of upper displays; and a center controller which controls the plurality of display controllers so that the plurality of upper displays performs image display as the single common effect display screen;

wherein the plurality of upper displays is divided into a plurality of gaming terminal areas such that the plurality of gaming terminal areas is equal in number to the plurality of gaming terminals;

wherein each of the plurality of gaming terminal areas is fixedly associated with a respective one of the plurality of gaming terminals;

wherein the plurality of upper displays are gathered to form the single common game image;

wherein each of the upper displays in the plurality of upper displays has a front surface;

wherein the upper displays in the plurality of upper displays are arranged adjacent to each other so that the front surface of each upper display is directed in a common direction;

wherein only those gaming terminals of the plurality of gaming terminals having a common game qualification may participate in the common game, the common game qualification being based on a result of a basic game played on an individual gaming terminal;

wherein each gaming terminal area that is associated with a gaming terminal having the common game qualification displays an individual object image as part of the single common game image, the single common game image being displayed across the plurality of gaming terminal areas;

wherein the center controller is further configured to display a common object image as part of the single common game image, the common object image moving among the plurality of gaming terminal areas;

wherein, when the single common game image is displayed across the plurality of gaming terminal areas by displaying the individual object image as part of the single common game image on each gaming terminal area associated with a gaming terminal having the common game qualification, each gaming terminal area that is associated with a gaming terminal that does not have the common game qualification does not display the individual object image, but still performs image display as part of the single common effect display screen; and wherein, when a bonus is accrued for a particular gaming terminal having the common game qualification, the center controller alters the display of the individual object image of the gaming terminal area associated with the particular gaming terminal.

2. The gaming machine according to claim 1, further comprising:

an illuminance sensor which is provided in at least one of the plurality of upper displays to detect the brightness of disturbance light applied to said at least one of the plurality of upper displays, wherein the center controller is further configured to change the brightness of said at least one of the plurality of upper displays based on the brightness of the disturbance light detected by the illuminance sensor.

3. The gaming machine according to claim 1, wherein the center controller enlarges the display of the individual object image of the gaming terminal area associated with the particular gaming terminal when a bonus is accrued.

4. A gaming machine comprising:

a plurality of gaming terminals provided in a parallel manner, each of the plurality of gaming terminals configured to individually run a basic game, and run a common game in which each of the plurality of gaming terminals is able to participate, the common game being different from the basic game, and each of the plurality of gaming terminals including a movable unit which is movable, a movement pattern storage device which stores a plurality of movement patterns of the movable unit in association with sets of identification information for identifying the movement patterns, and a terminal controller programmed to execute a step (a1);

a plurality of upper displays which are provided in a parallel manner independently from the plurality of gaming terminals so as to form a single common effect display screen configured to show a single common game image and on which a plurality of individual images corresponding to the respective terminals are displayed, the plurality of upper displays being fewer in number than the plurality of gaming terminals;

a plurality of display controllers which each control image display on a respective one of the plurality of upper displays; and a center controller which includes a display pattern storage unit which stores the sets of identification information in association with a plurality of display patterns of the individual images and is programmed to execute steps (b1) to (b3), the terminal controller executing the step (a1) of, based on a movement pattern command including a set of identification information transmitted from the center controller, moving the movable unit based on the movement pattern corresponding to the set of identification information, and the center controller executing the steps (b1) of controlling the plurality of display controllers so that the plurality of upper displays perform effect display as the single common effect display screen, (b2) of running a common game in which the plurality of gaming terminals are synchronized with one another, and (b3) of displaying an individual image with a display pattern corresponding to a running state of the common game, and transmitting, to the gaming terminal corresponding to the individual image, the movement pattern command including the set of identification information corresponding to the display pattern;

wherein the plurality of upper displays is divided into a plurality of gaming terminal areas such that the plurality of gaming terminal areas is equal in number to the plurality of gaming terminals;

wherein each of the plurality of gaming terminal areas is fixedly associated with a respective one of the plurality of gaming terminals;

wherein the plurality of upper displays are gathered to form the single common game image;

wherein each of the plurality of upper displays has a front surface;

wherein the plurality of upper displays are arranged adjacent to each other so that the front surface of each one of the plurality of upper displays is directed in a common direction;

wherein only those gaming terminals of the plurality of gaming terminals having a common game qualification may participate in the common game, the common game qualification being based on a result of a basic game played on an individual gaming terminal;

wherein each gaming terminal area that is associated with a gaming terminal having the common game qualification displays an individual object image as part of the single common game image, the single common game image being displayed across the plurality of gaming terminal areas;

wherein the center controller is further configured to display a common object image as part of the single common game image, the common object image moving among the plurality of gaming terminal areas;

wherein, when the single common game image is displayed across the plurality of gaming terminal areas by displaying the individual object image as part of the single common game image on each of the gaming terminal areas associated with a gaming terminal having the common game qualification, each gaming terminal area that is associated with a gaming terminal that does not have the common game qualification does not display the individual object image, but still performs image display as part of the single common effect display screen; and wherein, when a bonus is accrued for a particular gaming terminal having the common game qualification, the center controller alters the display of the individual object image of the gaming terminal area associated with the particular gaming terminal.

5. The gaming machine according to claim 4, wherein the center controller displays, on the common effect display screen, the individual image with a display pattern corresponding to the movement of the movable unit which moves based on the movement pattern.

6. The gaming machine according to claim 4, wherein the center controller enlarges the display of the individual object image of the gaming terminal area associated with the particular gaming terminal when a bonus is accrued.

7. A gaming machine comprising:

a plurality of gaming terminals which are provided in a parallel manner, each of the plurality of gaming terminals configured to individually run a basic game, and run a common game in which each of the plurality of gaming terminals is able to participate, the common game being different from the basic game, and including a terminal display on which a plurality of symbols are provided, a plurality of upper displays which are provided in a parallel manner independently from the plurality of gaming terminals so as to form a single common effect display screen configured to show a single common game image, the upper displays being divided into a plurality of gaming terminal areas each of which is associated with a respective one of the plurality of gaming terminals, a single movable unit having an operating portion that is externally-operable, the movable unit being capable of both vibrating the operating portion and biasing the operating portion in a predetermined rotation direction, a movement pattern storage device which stores a table including a plurality of movement patterns corresponding to a plurality of identification information, each one of the movement patterns corresponding to one or a plurality of identification information, and a terminal controller which is programmed to execute steps (c1) and (c2); and a center controller which is programmed to execute steps (d1), (d2), (d3), (d4), and (d5), the terminal controller executing the steps (c1) of moving the movable unit in a movement pattern corresponding to the one or the plurality of identification information included in a movement pattern command transmitted from the center controller and (c2) of, in response to an input to the movable unit, running a base game of rearranging the symbols on the terminal display, independently from the terminal displays of the other terminals, and the center controller executing the steps (d1) of running, at those gaming terminals of the plurality of gaming terminals having a common game qualification, a common game in which the gaming terminals are synchronized with one another, (d2) transmitting the movement pattern command comprising the one or the plurality of identification information corresponding to a running state of the common game, to the gaming terminals synchronized with one another for the common game, (d3) displaying a common object image as part of the single common game image, the common object image moving among the plurality of gaming terminal areas, (d4) displaying an individual object image as part of the single common game image for each gaming terminal area that is associated with a gaming terminal having the common game qualification, and (d5) altering the display of the individual object image for a particular gaming terminal area that is associated with a gaming terminal having the common game qualification when a bonus is accrued for the particular gaming terminal.

8. The gaming machine according to claim 7, wherein step (d5) includes enlarging the display of the individual object image for the particular gaming terminal area that is associated with the gaming terminal having the common game qualification when a bonus is accrued for the particular gaming terminal.

9. A gaming machine comprising:

a plurality of gaming terminals which are provided in a parallel manner, each of the plurality of gaming terminals configured to individually run a basic game, and run a common game in which each of the plurality of gaming terminals is able to participate, the common game being different from the basic game, and each of the plurality of gaming terminals including (i) a movable unit including a lever that a player is able to grip, a first motor which is provided in the lever and vibrates the lever, a second motor which is provided in the lever and biases the lever in a predetermined rotation direction, and a light emission unit provided at an upper part of the lever, and (ii) a terminal controller programmed to execute a step (e1);

a plurality of upper displays which are provided in a parallel manner independently from the plurality of gaming terminals so as to form a single common effect display screen configured to show a single common game image, the upper displays being divided into a plurality of gaming terminal areas each of which is associated with a respective one of the plurality of gaming terminals; and a center controller programmed to execute steps (f1), (f2), (f3), and (f4), the terminal controller executing the step (e1) of controlling the driving of at least one of the first motor and the second motor based on a movement pattern command transmitted from the center controller so as to move the lever, and causing the light emission unit to emit light, and the center controller executing the steps (f1) of running, at those gaming terminals of the plurality of gaming terminals having a common game qualification, a common game in which the gaming terminals are synchronized with one another, (f2) transmitting the movement pattern command based on a running state of the common game, (f3) displaying a common object image as part of the single common game image, the common object image moving among the plurality of gaming terminal areas, (f4) displaying an individual object image as part of the single common game image for each gaming terminal area that is associated with a gaming terminal having the common game qualification, and (f5) altering the display of the individual object image for a particular gaming terminal area that is associated with a gaming terminal having the common game qualification when a bonus is accrued for the particular gaming terminal.

10. The gaming machine according to claim 9, wherein step (f5) includes enlarging the display of the individual object image for the particular gaming terminal area that is associated with the gaming terminal having the common game qualification when a bonus is accrued for the particular gaming terminal.

* * * * *